(12) United States Patent
Nozawa

(10) Patent No.: US 9,843,740 B2
(45) Date of Patent: Dec. 12, 2017

(54) MULTISPECTRAL IMAGING DEVICE AND MULTISPECTRAL IMAGING METHOD

(71) Applicant: Panasonic Intellectual Property Management Co., Ltd., Osaka (JP)

(72) Inventor: Katsuya Nozawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 28 days.

(21) Appl. No.: 14/391,310

(22) PCT Filed: Feb. 7, 2014

(86) PCT No.: PCT/JP2014/000660
§ 371 (c)(1),
(2) Date: Oct. 8, 2014

(87) PCT Pub. No.: WO2014/125804
PCT Pub. Date: Aug. 21, 2014

(65) Prior Publication Data
US 2015/0103229 A1   Apr. 16, 2015

(30) Foreign Application Priority Data

Feb. 13, 2013 (JP) ................................ 2013-026138

(51) Int. Cl.
*H04N 5/238* (2006.01)
*G02B 5/20* (2006.01)
(Continued)

(52) U.S. Cl.
CPC ............. *H04N 5/238* (2013.01); *G02B 5/201* (2013.01); *G02B 27/1013* (2013.01);
(Continued)

(58) Field of Classification Search
CPC ........................ G01J 3/2823; G01J 2003/2826
See application file for complete search history.

(56) References Cited

U.S. PATENT DOCUMENTS 6,007,996 A * 12/1999 McNamara .......... C12Q 1/6841
382/129
6,040,578 A    3/2000 Malin et al.
(Continued)

FOREIGN PATENT DOCUMENTS

JP        11-506206 A    6/1999
JP     2000-249661 A    9/2000
(Continued)

OTHER PUBLICATIONS

International Search Report issued in International Application No. PCT/JP2014/000660 dated May 13, 2014, with English Translation.
(Continued)

*Primary Examiner* — Kara E Geisel
*Assistant Examiner* — Shawn Decenzo
(74) *Attorney, Agent, or Firm* — McDermott Will & Emery LLP

(57) ABSTRACT

A multispectral imaging device includes: an illumination optical system; and an imaging optical system, wherein the illumination optical system includes a filter group disposed in an overlap region of bundles of illumination rays which reach points in an imaging area of a subject, and including at least a first filter and a second filter having different transmission properties, and the imaging optical system includes: an image sensor which includes at least first light receiving elements and second light receiving elements; and a separation optical element which guides light which has passed through the first filter to the first light receiving elements, and guides light which has passed through the second filter to the second light receiving elements.

10 Claims, 48 Drawing Sheets

(51) Int. Cl.
  *G01J 3/02* (2006.01)
  *G02B 27/10* (2006.01)
  *G02B 27/12* (2006.01)
  *H04N 5/235* (2006.01)
  *G01J 3/28* (2006.01)
  *G01J 3/12* (2006.01)

(52) U.S. Cl.
  CPC ......... *G02B 27/123* (2013.01); *H04N 5/2351* (2013.01); *G01J 3/0229* (2013.01); *G01J 2003/1213* (2013.01); *G01J 2003/2826* (2013.01)

(56) References Cited

U.S. PATENT DOCUMENTS

| | | | |
|---|---|---|---|
| 6,121,616 A * | 9/2000 | Trigg | G01J 3/2823 250/332 |
| 6,128,077 A * | 10/2000 | Jovin et al. | 356/310 |
| 6,172,743 B1 * | 1/2001 | Kley | A61B 5/14532 356/39 |
| 6,181,427 B1 * | 1/2001 | Yarussi | G01N 21/55 356/328 |
| 6,236,047 B1 | 5/2001 | Malin et al. | |
| 6,275,335 B1 | 8/2001 | Costales | |
| 6,546,208 B1 | 4/2003 | Costales | |
| 6,683,716 B1 | 1/2004 | Costales | |
| 6,747,280 B1 | 6/2004 | Weiss | |
| 6,906,859 B2 | 6/2005 | Nihoshi et al. | |
| 7,042,567 B2 * | 5/2006 | Balas et al. | 356/326 |
| 7,580,185 B2 | 8/2009 | Haisch et al. | |
| 7,835,002 B2 * | 11/2010 | Muhammed | G01J 3/02 250/226 |
| 8,143,565 B2 | 3/2012 | Berkner et al. | |
| 8,189,201 B2 | 5/2012 | Haisch et al. | |
| 8,300,309 B2 | 10/2012 | Haisch et al. | |
| 8,705,042 B2 | 4/2014 | Haisch et al. | |
| 8,717,483 B2 | 5/2014 | Imamura | |
| 2001/0021018 A1 * | 9/2001 | Basiji | G01J 3/2803 356/326 |
| 2001/0028458 A1 * | 10/2001 | Xiao | G01J 3/02 356/417 |
| 2001/0040724 A1 | 11/2001 | Costales | |
| 2002/0001080 A1 * | 1/2002 | Miller | G01J 1/08 356/326 |
| 2002/0173723 A1 * | 11/2002 | Lewis | A61B 5/0059 600/473 |
| 2003/0227674 A1 | 12/2003 | Nihoshi et al. | |
| 2004/0109231 A1 | 6/2004 | Haisch et al. | |
| 2008/0013166 A1 | 1/2008 | Haisch et al. | |
| 2010/0097618 A1 | 4/2010 | Haisch et al. | |
| 2011/0073752 A1 | 3/2011 | Berkner et al. | |
| 2011/0168914 A1 | 7/2011 | Haisch et al. | |
| 2011/0216315 A1 | 9/2011 | Uematsu et al. | |
| 2012/0182438 A1 | 7/2012 | Berkner et al. | |
| 2012/0194663 A1 | 8/2012 | Haisch et al. | |
| 2012/0226480 A1 * | 9/2012 | Berkner | G01J 1/0492 703/1 |
| 2012/0249771 A1 | 10/2012 | Haisch et al. | |
| 2012/0268643 A1 | 10/2012 | Imamura | |
| 2013/0235256 A1 | 9/2013 | Kodama | |
| 2013/0306880 A1 | 11/2013 | Yamano et al. | |
| 2014/0063298 A1 * | 3/2014 | Buehler et al. | 348/273 |
| 2014/0168490 A1 | 6/2014 | Imamura | |
| 2015/0288894 A1 * | 10/2015 | Geelen | G01J 3/0256 348/342 |
| 2016/0103019 A1 * | 4/2016 | Tisserand | G01J 3/02 356/451 |

FOREIGN PATENT DOCUMENTS

| | | |
|---|---|---|
| JP | 2002-532748 A | 10/2002 |
| JP | 2003-505715 A | 2/2003 |
| JP | 2004-012961 A | 1/2004 |
| JP | 2004-157059 A | 6/2004 |
| JP | 2009-257919 A | 11/2009 |
| JP | 2010-133969 A | 6/2010 |
| JP | 2011-075562 A | 4/2011 |
| JP | 2011-185634 A | 9/2011 |
| JP | 2012-150112 A | 8/2012 |
| JP | 5001471 B1 | 8/2012 |
| JP | 2013-003386 A | 1/2013 |
| WO | 97/28437 A1 | 8/1997 |
| WO | 00/36451 A1 | 6/2000 |
| WO | 01/06282 A1 | 1/2001 |
| WO | 2012/066741 A1 | 5/2012 |
| WO | 2012/098806 A1 | 7/2012 |
| WO | 2012/143983 A1 | 10/2012 |

OTHER PUBLICATIONS

Japanese Office Action dated Jun. 16, 2015 issued in corresponding Japanese Patent Application No. 2014-529736.

* cited by examiner

MULTISPECTRAL IMAGING DEVICE AND MULTISPECTRAL IMAGING METHOD

RELATED APPLICATIONS

This application is a national phase of International Application No. PCT/JP2014/000660, filed on Feb. 7, 2014, which in turn claims the benefit of Japanese Application No. 2013-026138, filed on Feb. 13, 2013, the disclosures of which Applications are incorporated by reference herein.

TECHNICAL FIELD

The present invention relates to a multispectral imaging device and a multispectral imaging method for obtaining a multispectral image in a microscope optical system.

BACKGROUND ART

A multispectral image is an image captured using light having at least two different wavelength spectra or an image captured using light having at least two different polarization states.

Examples of a multispectral image include images captured using light having three wavelength spectral characteristics, namely, an image captured using light having a first spectral characteristic that indicates a distribution of components at a wavelength of about 700 nm, an image captured using light having a second spectral characteristic that indicates a distribution of components at a wavelength of about 546 nm, and an image captured using light having a third spectral characteristic that indicates a distribution of components at a wavelength of about 435 nm. This multispectral image is a color image represented by so-called RGB three primary colors.

Other than the above, imaging with light having two or more spectral characteristics (infrared rays and visible light, for example) is now used in the industrial and medical fields, for instance.

Some methods have already been disclosed with the aim of capturing a multispectral image.

The first method is a method in which filters with different transmission properties are disposed immediately above and in one-to-one correspondence with light receiving elements in a two-dimensional light receiving element array. This method is widely used in, for instance, digital cameras which can capture color images.

The second method is a method in which a filter group including plural filters with different transmission properties and a separation optical element are disposed in an imaging optical system. The separation optical element has a function of distributing bundles of rays which have passed through the filters so that the distributed bundles of rays enter different light receiving elements in a two-dimensional light receiving element array.

Patent Literatures (PTLs) 1 and 2 disclose the second method in detail. The second method limits the position for disposing the filter group. The filter group is disposed at a stop position in PTL 1 and at a pupil position in PTL 2.

CITATION LIST

Patent Literature

[PTL 1] Japanese Patent No. 5001471
[PTL 2] International Patent Application Publication No. 2012/066741

SUMMARY OF INVENTION

Technical Problem

However, it is difficult to apply the above conventional method for capturing multispectral images to a microscope optical system.

In view of this, the present invention provides a multispectral imaging device which can capture a multispectral image in a microscope optical system.

Solution to Problem

A multispectral imaging device according to an aspect of the present invention is a multispectral imaging device which captures a multispectral image of a subject, the multispectral imaging device including: an illumination optical system which irradiates the subject with light; and an imaging optical system which images the subject, wherein the illumination optical system includes a filter group disposed in an overlap region of bundles of illumination rays which reach points in an imaging area of the subject, and including at least a first filter and a second filter having different transmission properties, and the imaging optical system includes: an image sensor which includes at least first light receiving elements and second light receiving elements; and a separation optical element which guides light which has passed through the first filter to the first light receiving elements, and guides light which has passed through the second filter to the second light receiving elements.

It should be noted that these general and specific aspects may be implemented using a system, a method, an integrated circuit, a computer program, a computer-readable recording medium such as a CD-ROM, or any combination of systems, methods, integrated circuits, computer programs, and recording media.

Advantageous Effects of Invention

A multispectral imaging device according to an aspect of the present invention allows capturing a multispectral image in a microscope optical system.

Figure 1:
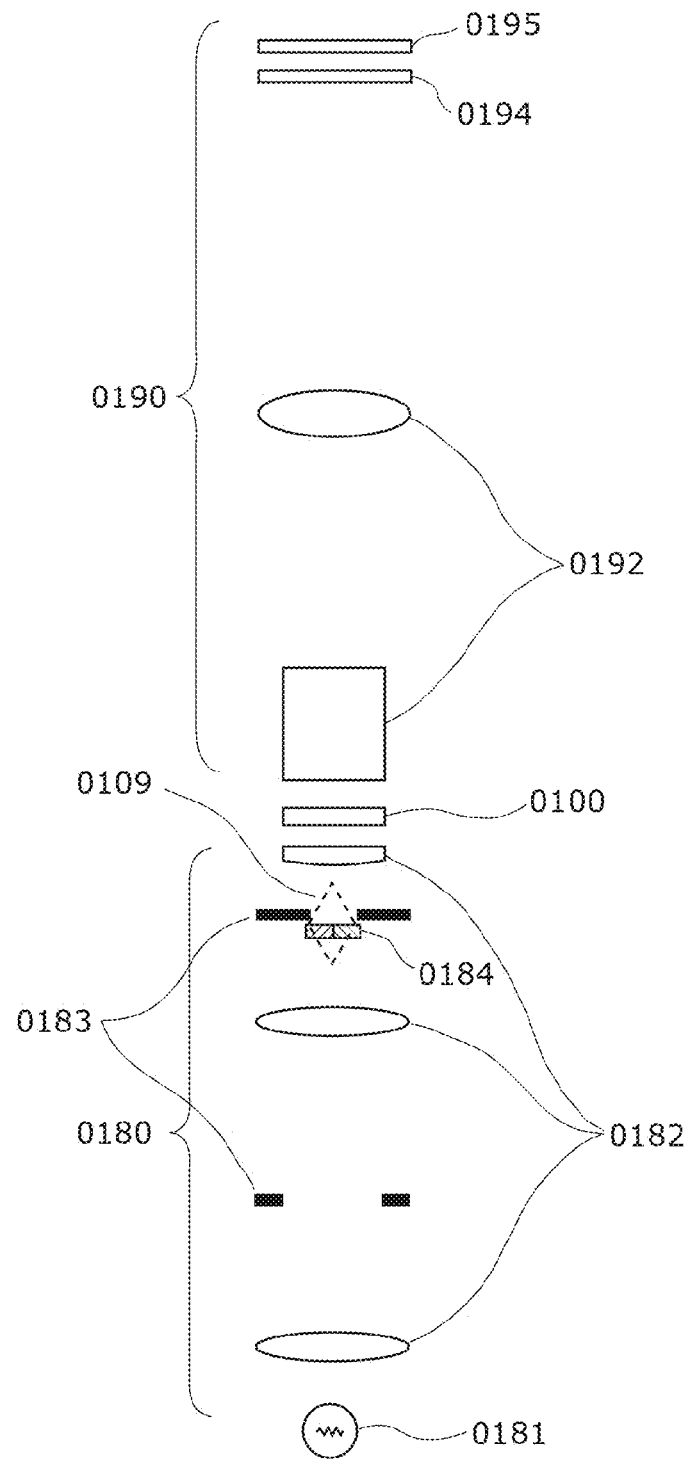
FIG. 1 illustrates an example of a configuration of a multispectral imaging device according to Embodiment 1.

DESCRIPTION OF EMBODIMENTS (Underlying Knowledge Forming Basis of the Present Invention)

The inventors of the present invention have found that capturing multispectral images in a microscope optical system has the following problems.

The first method, namely, a method in which a filter is disposed for each light receiving element, requires the accuracy of disposing filters at about light receiving element intervals. Consequently, it is necessary to manufacture filters as well when light receiving elements are manufactured, and thus it is extremely difficult to exchange the filters later on.

The second method, namely, a method for distributing light which has passed through a filter group by using a separation optical element limits a location where the filter group can be disposed. This limitation is a significant problem if the second method is applied to a microscope optical system, in particular. For example, in the case of an imaging optical system which includes plural lenses, positions which satisfy a condition for disposing a filter group are a position in front of a lens closest to a subject among the lenses included in the imaging optical system and a position between lenses included in the imaging optical system. However, in the case of a microscope optical system, the distance between a subject and the lens closest to the subject is short, and there is no sufficient space for disposing a filter in front of the lens closest to the subject.

In contrast, if a filter group is disposed between lenses included in an imaging optical system, it is usually necessary to dispose a filter group in an objective lens. Accordingly, in order to obtain a multispectral image using the second method, an objective lens including a filter group and dedicated for multispectral imaging needs to be prepared.

Further, an objective lens generally includes many lenses for aberration correction, and thus it is difficult to secure sufficient space for disposing a filter group in such an objective lens.

In view of this, a multispectral imaging device according to an aspect of the present invention is a multispectral imaging device which captures a multispectral image of a subject, the multispectral imaging device including: an illumination optical system which irradiates the subject with light; and an imaging optical system which images the subject, wherein the illumination optical system includes a filter group disposed in an overlap region of bundles of illumination rays which reach points in an imaging area of the subject, and including at least a first filter and a second filter having different transmission properties, and the imaging optical system includes: an image sensor which includes at least first light receiving elements and second light receiving elements; and a separation optical element which guides light which has passed through the first filter to the first light receiving elements, and guides light which has passed through the second filter to the second light receiving elements.

According to this, the illumination optical system includes the filter group, and thus a multispectral image can be captured in the microscope optical system. In other words, multispectral imaging is achieved by disposing the filter group in an overlap region of bundles of illumination rays which reach points in the imaging area of the subject in the illumination optical system. In addition, it is not necessary to dispose the filter group for multispectral imaging in the imaging optical system, and thus the flexibility of a design of the imaging optical system can be improved.

For example, the illumination optical system may be a Koehler illumination system which includes a field stop and an aperture stop, and the filter group may be disposed in vicinity of the aperture stop.

According to this, a multispectral image can be captured using a Koehler illumination system typically used in a microscope optical system.

For example, at least one of the first filter or the second filter may be exchangeably attached to the illumination optical system.

According to this, at least one of the first filter or the second filter is exchangeably attached to the illumination optical system. Thus, filters can be exchanged with ease, in accordance with the characteristic of a subject or the imaging purpose.

For example, the imaging optical system may further include an objective lens, and the filter group may be disposed at a position where the light which has passed through the first filter enters the first light receiving elements, and the light which has passed through the second filter enters the second light receiving elements, irrespective of a change of a numerical aperture of the objective lens.

According to this, the filter group is disposed at a position where the light which has passed through the first filter enters the first light receiving elements, and the light which has passed through the second filter enter enters the second light receiving elements, even if the numerical aperture of the objective lens is changed. Thus, a multispectral image can be captured irrespective of a change in the numerical aperture of the objective lens.

For example, the filter group may be disposed at a position where a boundary between the first filter and the second filter intersects an optical axis of the illumination optical system.

According to this, the filter group is disposed at a position where a boundary between the first filter and the second filter intersects an optical axis of the illumination optical system. Thus, a multispectral image can be captured irrespective of a change in the numerical aperture of the objective lens.

The filter group according to an aspect of the present invention is a filter group for use in the above multispectral imaging device.

This achieves similar effects to those achieved by the above multispectral imaging device.

In addition, a multispectral imaging method according to an aspect of the present invention is a multispectral imaging method for capturing a multispectral image of a subject using a multispectral imaging device which includes: an illumination optical system which irradiates the subject with light; and an imaging optical system which images the subject, the multispectral imaging method including: (a) disposing a filter group which includes at least a first filter and a second filter having different transmission properties, in an overlap region of bundles of illumination rays in the illumination optical system, the bundles of illumination rays reaching points in an imaging area of the subject; and (b) capturing the multispectral image of the subject, wherein the imaging optical system includes: an image sensor which includes at least first light receiving elements and second light receiving elements; and a separation optical element which guides light which has passed through the first filter to the first light receiving elements, and guides light which has passed through the second filter to the second light receiving elements.

This achieves similar effects to those achieved by the above multispectral imaging device.

For example, the subject may be stained using stains having absorption spectra, and the filter group may be disposed in the illumination optical system in step (a), the filter group including the first filter which transmits light having a first wavelength at which a first stain included in the stains shows a unique absorption spectrum, and the second filter which transmits light having a second wavelength at which a second stain included in the stains shows a unique absorption spectrum.

According to this, a multispectral image can be captured using light having wavelengths at which the stains show unique absorption spectra, and thus elements in the subject stained using the stains can be distinguished.

For example, the subject may have, on a surface, an oxide film having a reflection spectrum which differs depending on a thickness of the oxide film, and the filter group may be disposed in the illumination optical system in step (a), the filter group including the first filter which transmits light having a first wavelength at which the thickness and the reflection spectrum show first dependency, and the second filter which transmits light having a second wavelength at which the thickness and the reflection spectrum show second dependency.

According to this, a multispectral image can be captured using light having plural wavelengths at which the dependency of the film thicknesses and reflection spectra are different, and thus the thickness of an oxide film can be estimated.

For example, the subject may have a graphene layer on a surface, and the filter group may be disposed in the illumination optical system in step (a), the filter group including the first filter which transmits light having a first wavelength at which a reflection spectrum different from a reflection spectrum shown in an unwrinkled region of the graphene layer is shown in a wrinkled region of the graphene layer.

According to this, imaging can be performed using light having a reflection spectrum that differs depending on the presence of wrinkling of the graphene layer, and thus whether the graphene layer is wrinkled can be estimated.

The following describes embodiments, with reference to the drawings. It should be noted that all the drawings in this specification are referenced in order to describe the concept, and thus are made without consideration of the scale, the aspect ratio, and others at all. Further, many of the elements not necessarily required, and many of the elements generally and naturally included in a microscope imaging device such as a body tube and a focus adjusting mechanism are omitted. In addition, although lenses are each drawn as a single lens in the drawings in order to simplify those drawings, a lens group which includes plural lenses may be used for each of the lenses.

The embodiments described below each show a general and specific example. The numerical values, shapes, materials, constituent elements, the arrangement positions and connection of the constituent elements, steps, the processing order of the steps, and the like shown in the following embodiments are mere examples, and thus are not intended to limit the scope of the claims. Therefore, among the constituent elements in the following exemplary embodiments, constituent elements not recited in any of the independent claims defining the most generic part of the inventive concept are described as arbitrary constituent elements.

Embodiment 1

In Embodiment 1, a description is given of a trans-illumination multispectral imaging device used for imaging a light-transmissive sample such as a piece of a living body, with reference to FIGS. 1 to 17.

FIG. 1 illustrates an example of a configuration of a multispectral imaging device according to Embodiment 1.

A multispectral imaging device according to the present embodiment includes an illumination optical system 0180 and an imaging optical system 0190. The multispectral imaging device captures a multispectral image of a subject 0100.

The illumination optical system 0180 includes a light source 0181, a lens group 0182, a stop group 0183, and a filter group 0184. The imaging optical system 0190 includes a lens group 0192, a separation optical element 0194, and a two-dimensional light receiving element array (image sensor) 0195. The following describes constituent elements of the illumination optical system 0180 and the imaging optical system 0190.

The light source 0181 is a source for generating bundles of illumination rays. As the light source 0181, a light source is selected which generates light having an appropriate light emission characteristic, in accordance with a spectral characteristic to be used for imaging. If multispectral imaging is performed using light having different wavelength spectra, a light source which emits light including all the components of characteristics of the wavelength spectra to be used for imaging is selected as the light source 0181.

For example, if a multispectral imaging device captures an image in the range of visible light, a light source which generates light including wavelength components in the range of visible light (such as a halogen light source, a white LED, or a xenon light source, for example) can be used as the light source 0181. For example, if the multispectral imaging device captures a multispectral image in a range which includes an ultraviolet region, a xenon light source, a heavy hydrogen light source, or the like, for example, can be used as the light source 0181. It should be noted that the light source 0181 may generate light having a spectrum different from that of light originally emitted from the light source, using a fluorescent material, a nonlinear optical element, and the like.

The lens group 0182 bends a path of a bundle of illumination rays emitted by the light source 0181. The lens group 0182 may include a refractive lens made of, for instance, glass, a reflective lens made of a curved mirror, or even a combination of such lenses.

The stop group 0183 restricts the optical path of a bundle of illumination rays emitted by the light source 0181. The stop group 0183 may include aperture adjustable stops or fixed aperture stops.

The filter group 0184 is disposed in an overlap region 0109 of bundles of illumination rays which reach points in an imaging area of the subject 0100. In addition, the filter group 0184 includes plural filters having different transmission properties (a first filter and a second filter in the present embodiment). The filter group 0184 generates bundles of illumination rays having spectral characteristics necessary for multispectral imaging.

A transmission property indicates a relationship between an optical property of light which has not yet passed through a filter and an optical property of light which has passed through the filter. If the same light enters filters, the optical properties of the light differ which has passed through the filters with different transmission properties.

The filter group 0184 is exchanged if necessary. Specifically, the filter group 0184 is attached to the illumination optical system 0180 exchangeably. Accordingly, the filter group 0184 can be detached. It should be noted that plural filters included in the filter group 0184 may be individually exchangeable. In addition, the filter group 0184 does not necessarily need to be attached exchangeably, and may be fixed to the illumination optical system 0180 unexchangeably.

The lens group 0192 controls an optical path of a bundle of rays which has passed through the subject 0100, and forms a real image of the subject 0100 in the vicinity of the separation optical element 0194. The lens group 0192 may include a refractive lens made of, for instance, glass, a reflective lens made of a curved mirror, or even a combination of such lenses.

For each part of the real image of the subject 0100 formed by the lens group 0192, the separation optical element 0194 guides bundles of rays which have passed thorough filters 0709 of the filter group 0184 to different light receiving elements on the two-dimensional light receiving element array 0195. Specifically, the separation optical element 0194 guides light which has passed through the first filter to some of the plural light receiving elements (first light receiving elements), and guides light which has passed through the second filter to some (second light receiving elements) of the plural light receiving elements.

The two-dimensional light receiving element array 0195 includes, on its surface, light receiving pixels 1711 corresponding in number to spatial pixels for imaging. The light receiving pixels 1711 each include a first light receiving element 1701 for imaging with a first spectral characteristic and a second light receiving element 1702 for imaging with a second spectral characteristic. Specifically, the two-dimensional light receiving element array 0195 includes, in each of the light receiving pixels 1711, light receiving elements 1709 as many as or more than spectral images captured simultaneously.

The following describes specific examples of the configurations and functions of the illumination optical system 0180 and the imaging optical system 0190.

Figure 2:
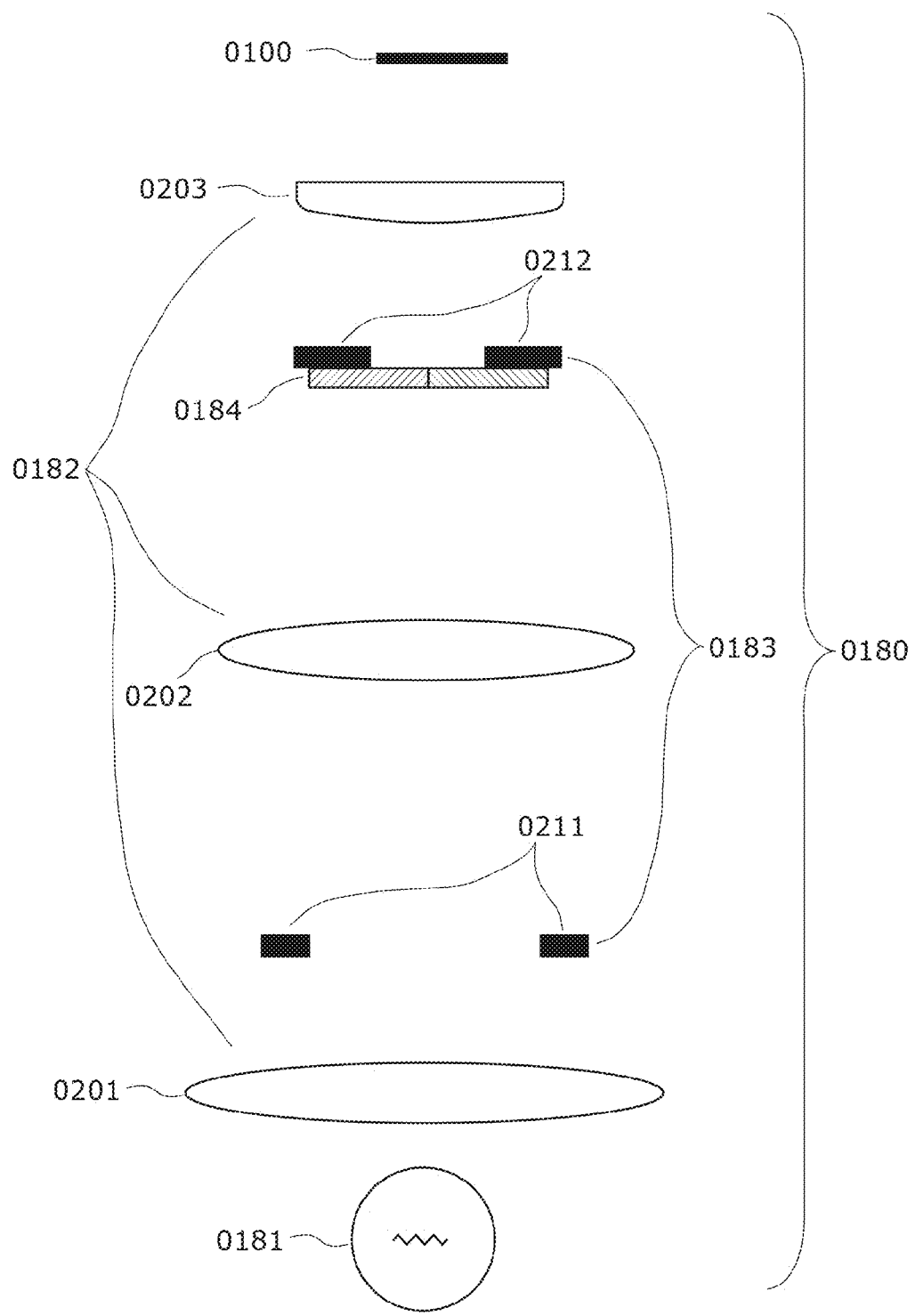
FIG. 2 illustrates an example of a configuration of an illumination optical system in Embodiment 1.

FIG. 2 illustrates an example of the configuration of the illumination optical system 0180. In the case of this configuration, the lens group 0182 includes a collector lens 0201, a field lens 0202, and a condensing lens 0203. In addition, the stop group 0183 includes a field stop 0211 and an aperture stop 0212.

The aperture stop 0212 is located conjugate to the light source 0181, and the field stop 0211 is located conjugate to the subject 0100. The illumination optical system in which stops are at such two conjugate locations is referred to as Koehler illumination or a Koehler illumination system, and is typically used in a microscope optical system. This Koehler illumination has, at and in the vicinity of the aperture stop 0212, the overlap region 0109 of bundles of illumination rays which reach points in an imaging area of the subject 0100. Thus, the filter group 0184 is disposed in the vicinity of the aperture stop 0212, herein. It should be noted that the illumination optical system 0180 is not limited to Koehler illumination as long as the illumination optical system has an overlap region of bundles of illumination rays which reach points in an imaging area of a subject.

A description is given of, with reference to FIGS. 3 to 6, the overlap region 0109 of bundles of illumination rays which reach points in the imaging area of the subject 0100 in the illumination optical system 0180 illustrated in FIG. 2.

Figure 3:
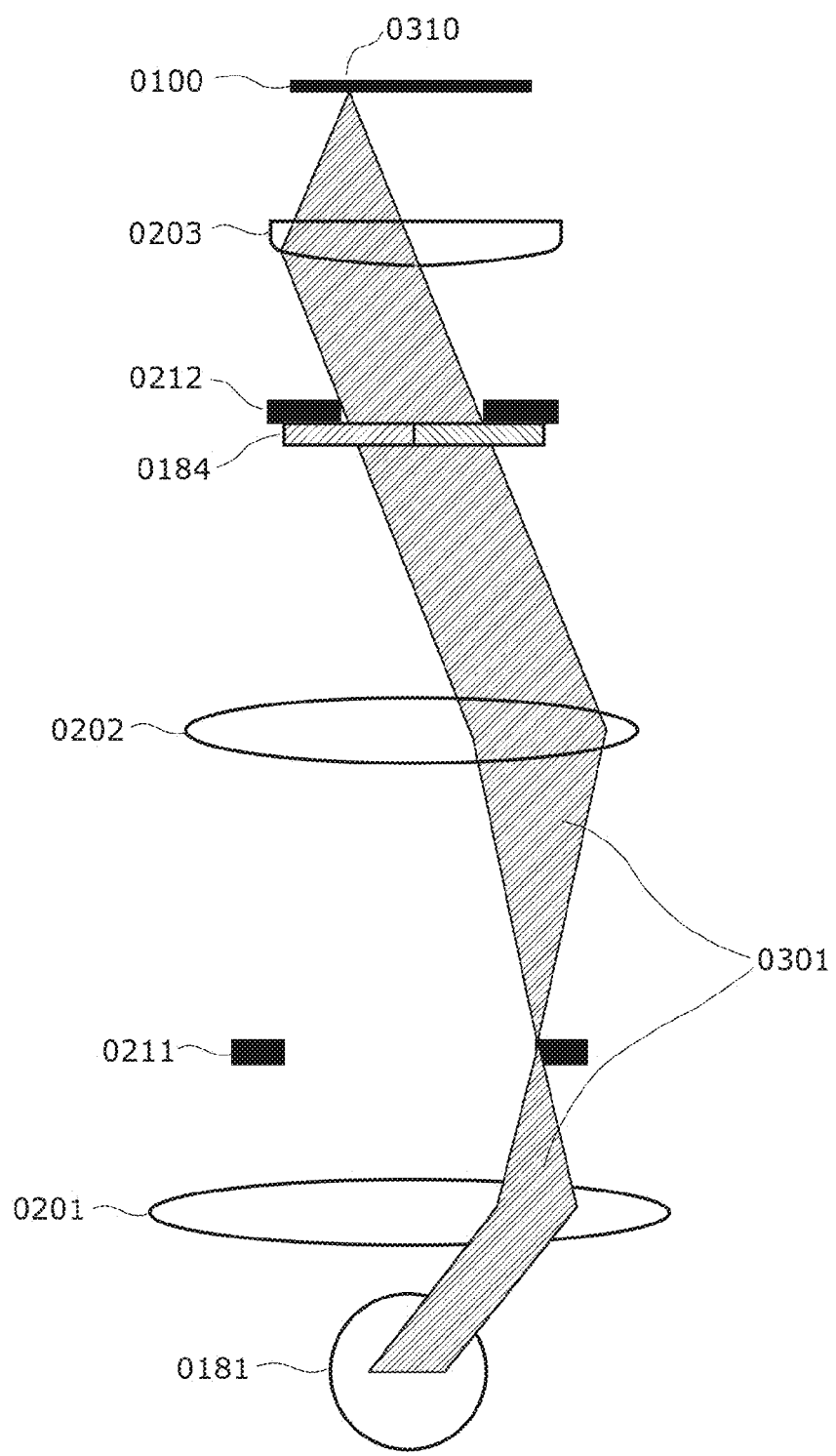
FIG. 3 illustrates an optical path of a bundle of rays condensed at a first point within a subject, in Embodiment 1.

FIG. 3 illustrates an optical path of a bundle of rays 0301 from the light source 0181 condensed at a first point 0310 within the subject 0100.

Figure 4:
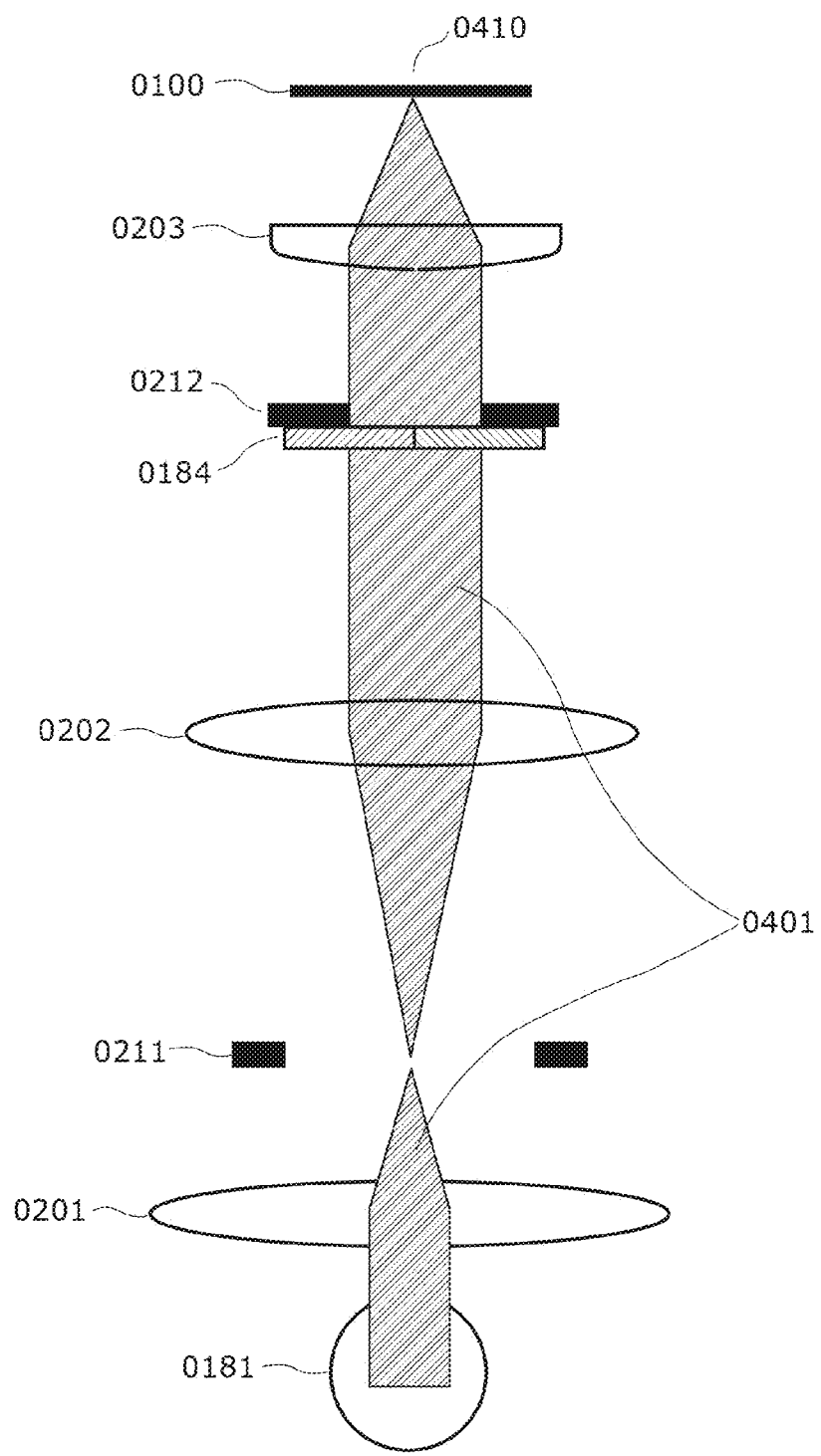
FIG. 4 illustrates an optical path of a bundle of rays condensed at a second point within the subject, in Embodiment 1.

FIG. 4 illustrates an optical path of a bundle of rays 0401 from the light source 0181 condensed at a second point 0410 within the subject 0100.

Figure 5:
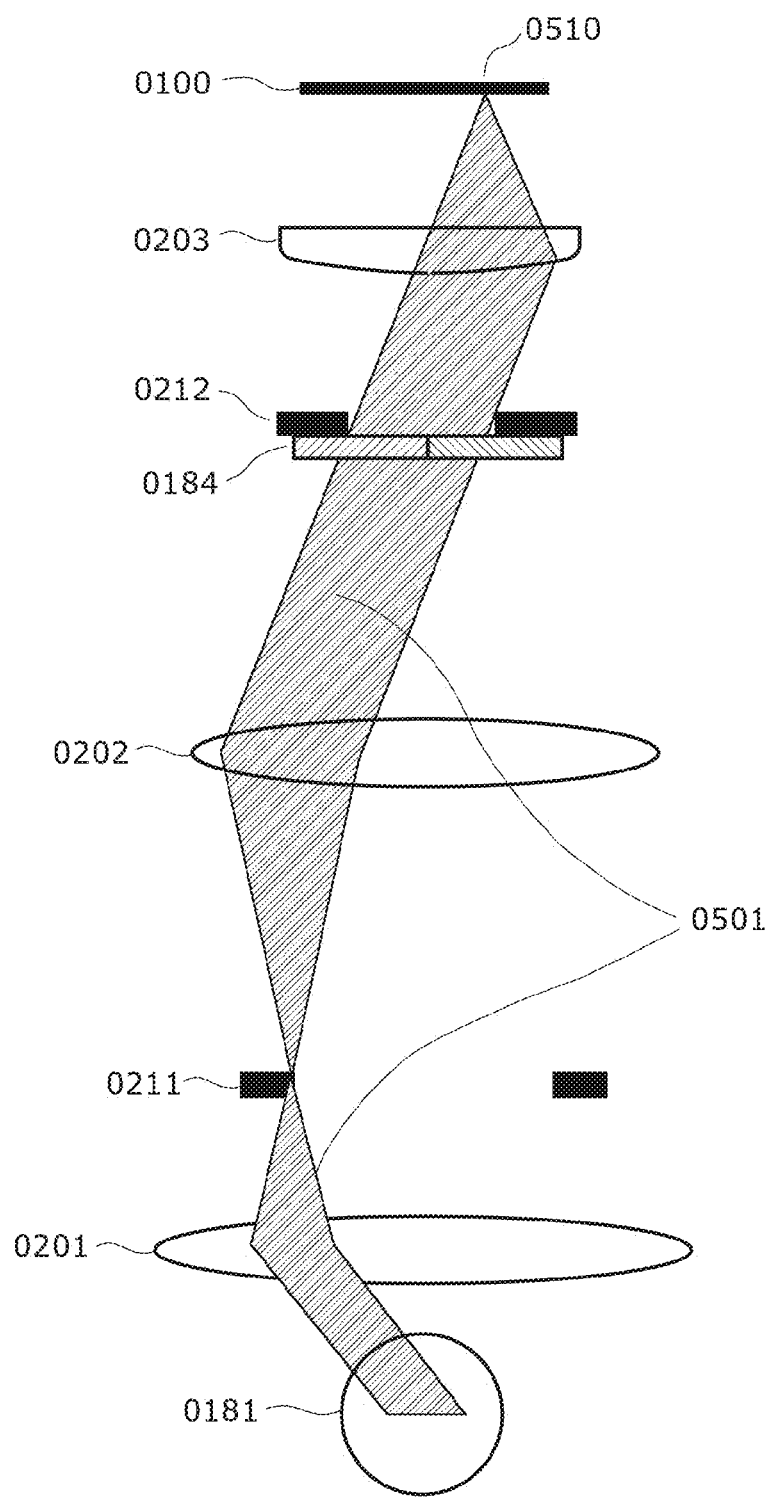
FIG. 5 illustrates an optical path of a bundle of rays condensed at a third point within the subject, in Embodiment 1.

FIG. 5 illustrates an optical path of a bundle of rays 0501 from the light source 0181 condensed at a third point 0510 within the subject 0100.

The first point 0310 is located on an edge of the imaging area of the subject 0100. In addition, the third point 0510 is located on the other edge of the imaging area of the subject 0100. It should be noted that if a bundle of rays passes through the filter group 0184, the spectral characteristic thereof changes, but the optical path thereof makes no significant change. Thus, FIGS. 3 to 6 give illustration in disregard of a change in spectral characteristics caused by the filter group 0184.

Figure 6:
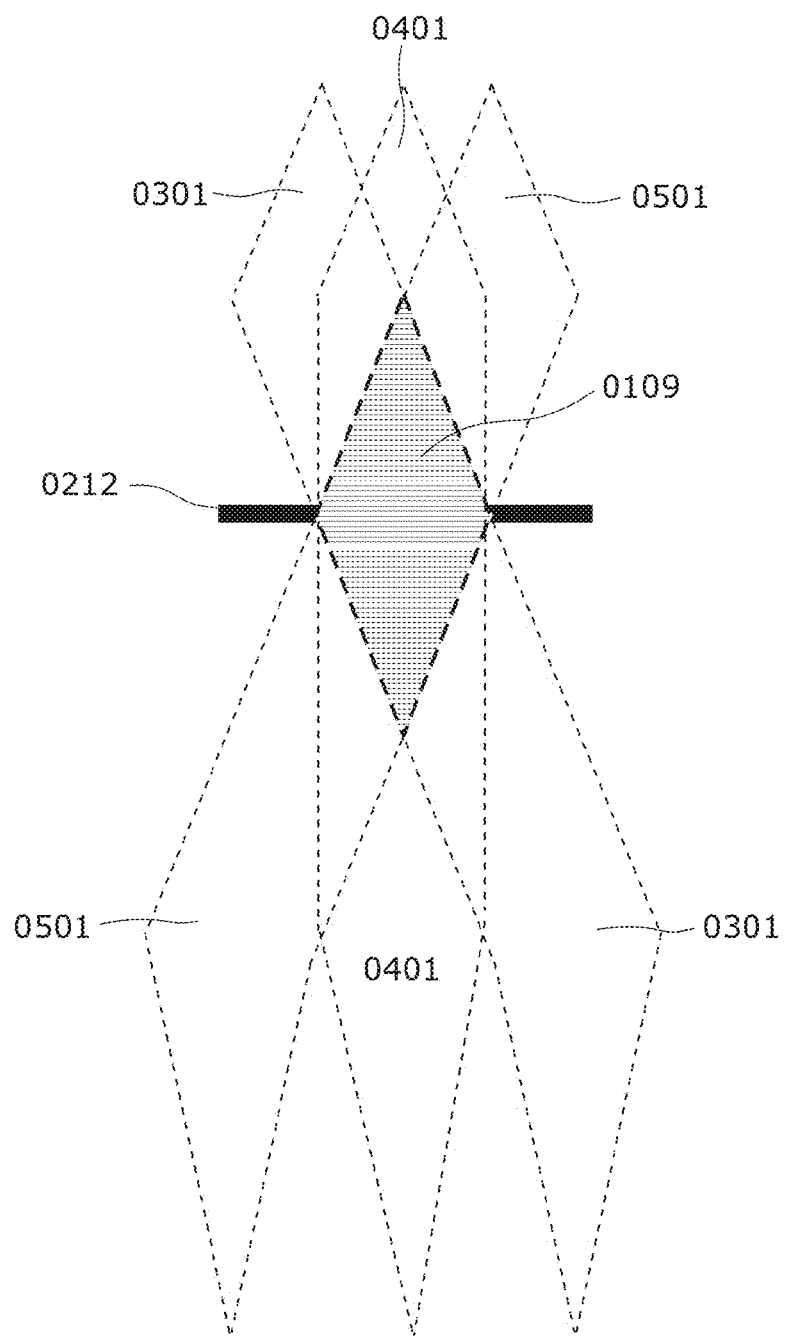
FIG. 6 illustrates an overlap region of bundles of rays which reach the first to third points in an imaging area of the subject, in Embodiment 1.

FIG. 6 illustrates the bundle of rays 0301, 0401, and 0501 at and in the vicinity of the aperture stop 0212. In this manner, Koehler illumination has, at and in the vicinity of the aperture stop 0212, the overlap region 0109 of bundles of illumination rays which reach points in the imaging area of the subject 0100.

The filter group 0184 is disposed in the overlap region 0109 of bundles of illumination rays which reach points in the imaging area of the subject 0100, thereby exerting influence of the filter group 0184 on all the bundles of rays from the light source 0181 which illuminate points in the imaging area of the subject 0100.

Figure 7:
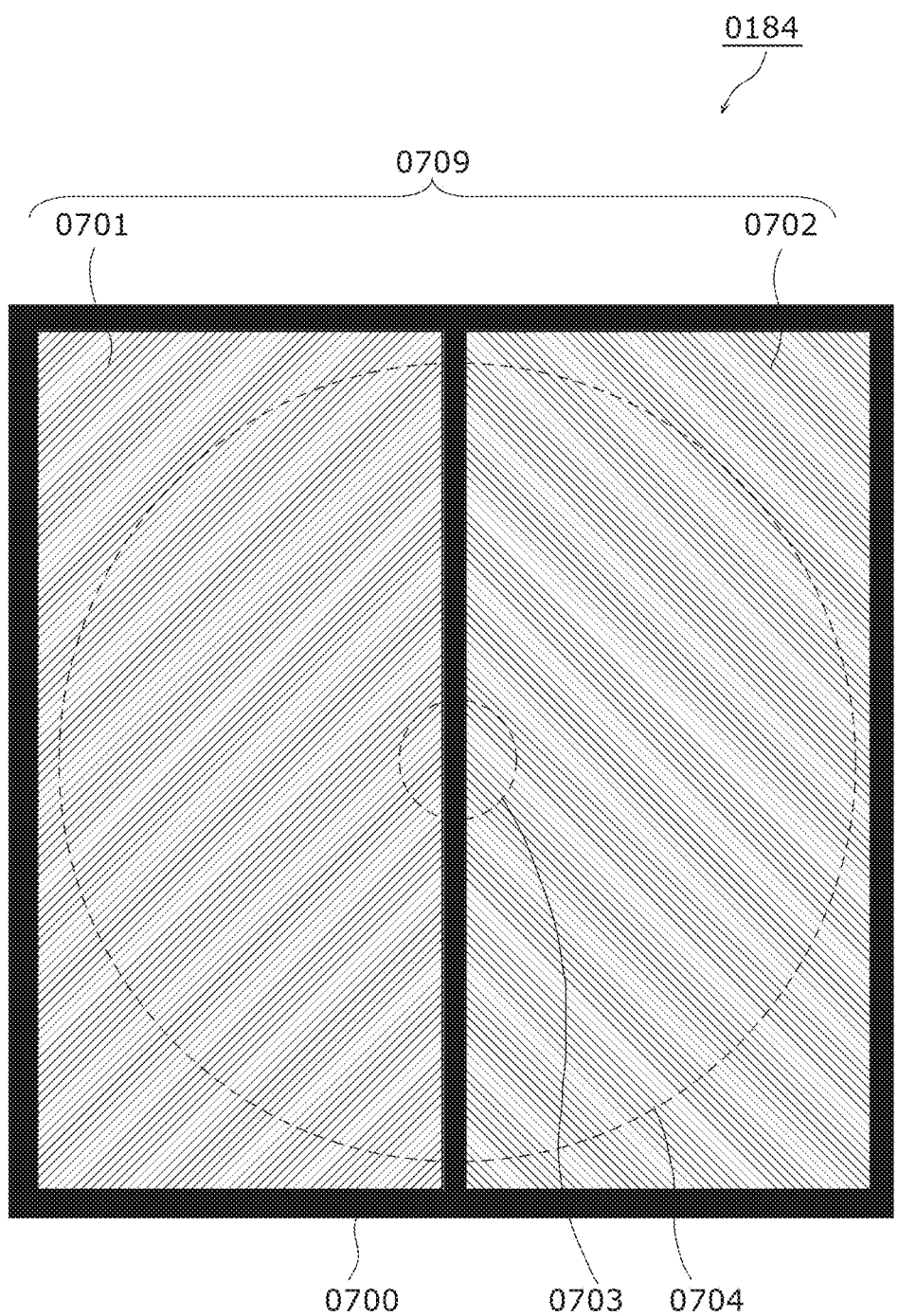
FIG. 7 is a schematic diagram of a filter group in Embodiment 1.

FIG. 7 illustrates an example of a configuration of the filter group 0184. The filter group 0184 includes the plural filters 0709 having different transmission properties in a frame 0700. In the present embodiment, the filter group 0184 includes a first filter 0701 and a second filter 0702. In addition, in the present embodiment, the first filter 0701 and the second filter 0702 are arranged on the same plane.

It should be noted that the frame 0700 is not necessarily included. A structure may be adopted in which the plural filters 0709 are directly attached rather than using the frame 0700. Alternatively, a structure may be adopted in which although the frame 0700 is used, the frame is not included between the plural filters 0709, and only an outer frame holds the plural filters 0709.

The number of filters included in the filter group 0184 and transmission properties of the filters are selected such that bundles of rays which have passed through the filter group 0184 have spectral characteristics to be used for multispectral imaging.

For example, as the first filter 0701, a filter is selected which has a characteristic that transmits components in a wavelength range of 440 to 450 nm, and furthermore substantially blocks components in a range of other wavelengths. In addition, as the second filter 0702, a filter is selected which has a characteristic that transmits components in a wavelength range of 590 to 600 nm, and furthermore substantially blocks components in a range of other wavelengths.

At this time, a bundle of rays which has passed through the first filter 0701 has a first spectral characteristic in a limited wavelength range of 440 to 450 nm. A bundle of rays which has passed through the second filter 0702 has a second spectral characteristic in a limited wavelength range of 590 to 600 nm. This allows imaging (multispectral imaging) using two types of spectra.

As described above, the use of plural filters having different transmission properties allows the illumination optical system 0180 to irradiate the subject 0100 with bundles of rays having different spectral characteristics. Although at least one filter is necessary for one spectral characteristic, plural filters may be assigned to a single spectral characteristic.

In the present embodiment, bundles of illumination rays are limited to be in a range of light which can be taken in by the imaging optical system 0190. In a microscope optical system, imaging is generally performed at various imaging magnifications while changing the magnification of an objective lens to another. At this time, the range of light which can be taken in by the imaging optical system 0190 changes depending on the numerical aperture of the objective lens.

On the filter group 0184, the greater a numerical aperture of the imaging optical system 0190 is, the greater an overlap of bundles of illumination rays is which can be taken in by the imaging optical system 0190. As an example, FIG. 7 illustrates an overlap 0703 of bundles of illumination rays at 0.1 numerical aperture of an objective lens, and an overlap 0704 of bundles of illumination rays at 0.9 numerical aperture of an objective lens.

Even if the numerical aperture of an objective lens changes due to switching objective lenses as described above, the filters 0709 may be disposed such that the number of filters included in an overlap of bundles of illumination rays is not changed, and correspondence between light which has passed through the filters and light receiving elements where that light enters does not change. Specifically, the filter group 0184 may be disposed at a position where bundles of rays which have passed through the first filter 0701 and the second filter 0702 enter the first light receiving elements and the second light receiving elements, respectively, even if the numerical aperture of an objective lens changes. More preferably, the filters 0709 are disposed such that regions on the filters 0709 through which bundles of rays that are to enter an objective lens pass have substantially similar shapes at numerical apertures.

For example, filters may be disposed such that boundaries extend radially about an intersection of the medial axis of bundles of illumination rays and the boundary between the filters 0709. Specifically, the filter group 0184 may be disposed at a position where the boundary between the first filter 0701 and the second filter 0702 intersects the optical axis of the illumination optical system 0180.

Of course, the filter group 0184 may be suitably exchanged according to the numerical aperture of an objective lens used for multispectral imaging.

Bundles of rays which have passed through the filters 0709 included in the filter group 0184 each have a spectral characteristic corresponding to the transmission property of one of the filters through which the bundle of rays has passed. Specifically, bundles of rays emitted by the light source 0181 are converted into a group of bundles of rays that includes plural bundles of rays having different spectral characteristics.

Figure 8:
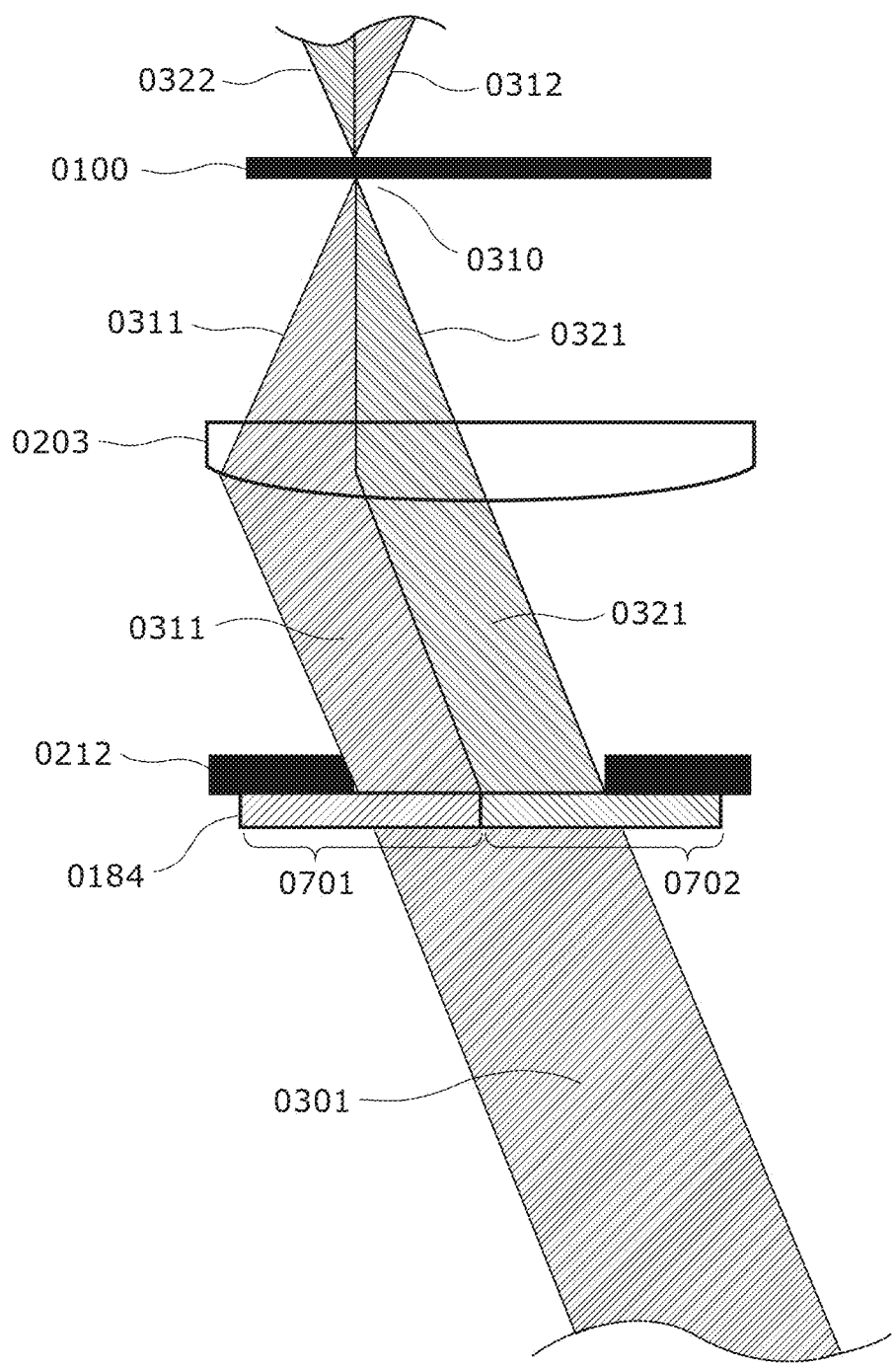
FIG. 8 illustrates optical paths of bundles of rays which pass through first and second filters, and are condensed at the first point within the subject, in Embodiment 1.
Figure 9:
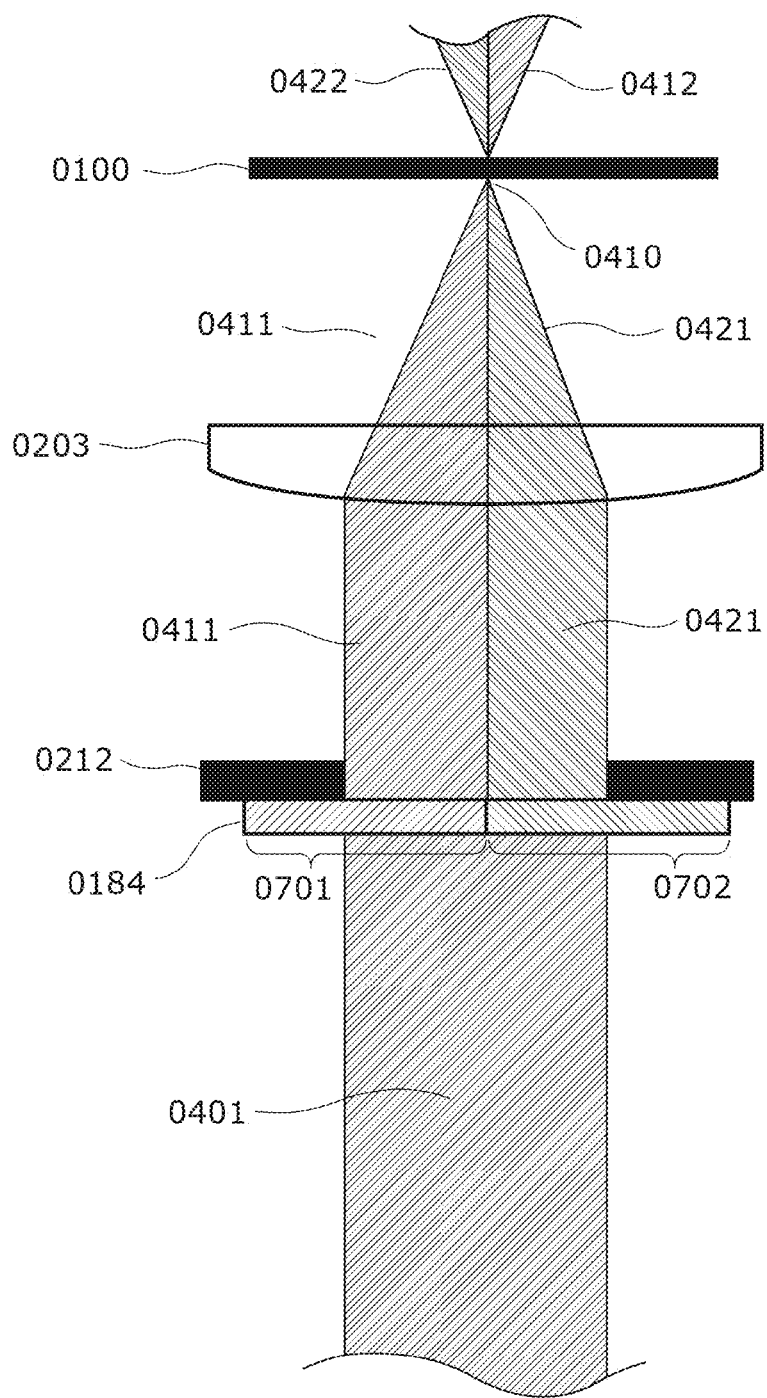
FIG. 9 illustrates optical paths of bundles of rays which have passed through the first and second filters, and are condensed at the second point within the subject, in Embodiment 1.
Figure 10:
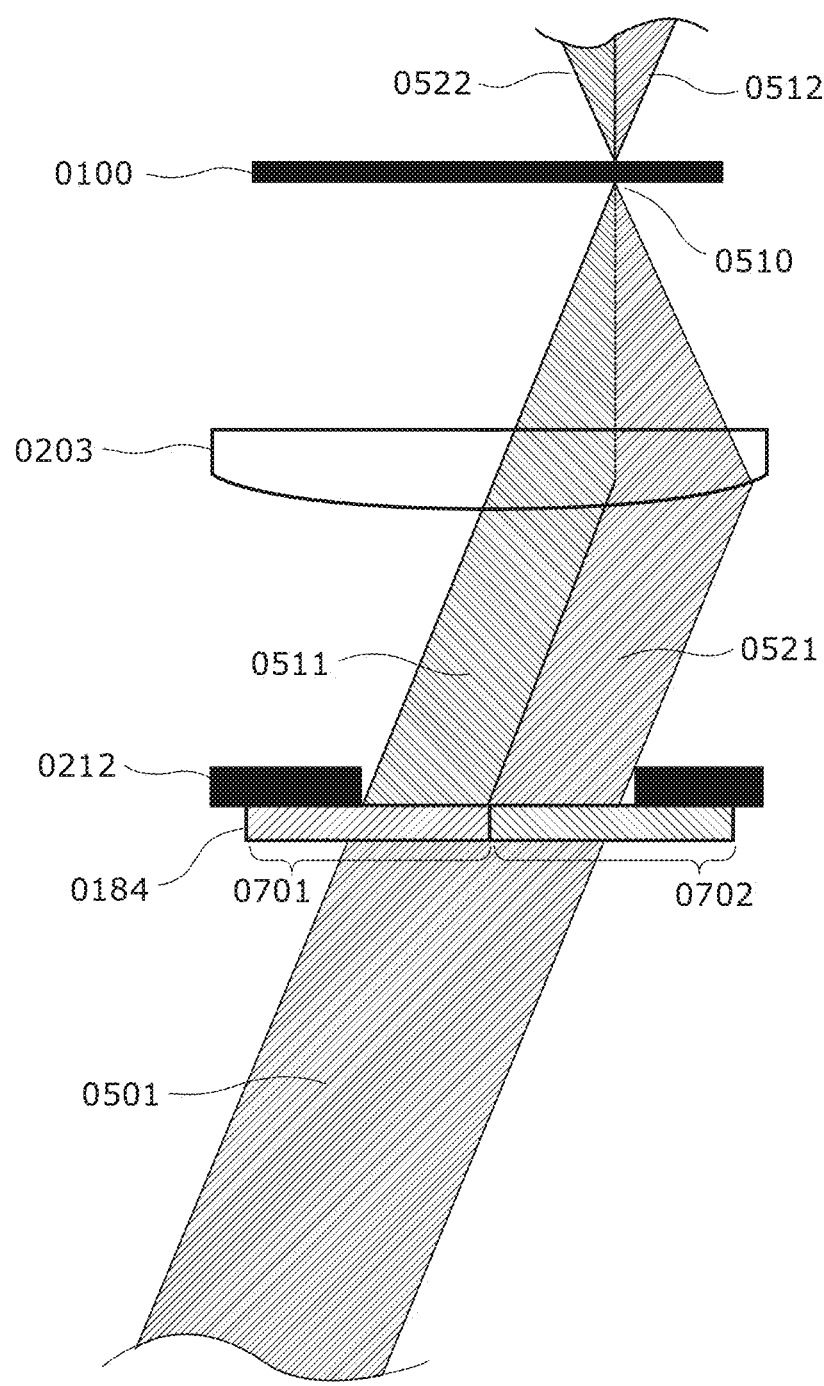
FIG. 10 illustrates optical paths of bundles of rays which have passed through the first and second filters, and are condensed at the third point within the subject, in Embodiment 1.

FIGS. 8 to 10 illustrate optical paths of the bundles of rays 0301, 0401, and 0501 which pass through the filters 0709 and are condensed at points within the subject 0100.

A bundle of rays 0311 is a portion of the bundle of rays 0301 which has passed through the first filter 0701 in the filter group 0184. Accordingly, the bundle of rays 0311 has the first spectral characteristic. A bundle of rays 0321 is a portion of the bundle of rays 0301 which has passed through the second filter 0702 in the filter group 0184. Accordingly, the bundle of rays 0321 has the second spectral characteristic.

A bundle of rays 0411 is a portion of the bundle of rays 0401 which has passed through the first filter 0701 in the filter group 0184. Accordingly, the bundle of rays 0411 has the first spectral characteristic. A bundle of rays 0421 is a portion of the bundle of rays 0401 which has passed through the second filter 0702 in the filter group 0184. Accordingly, the bundle of rays 0421 has the second spectral characteristic.

A bundle of rays 0511 is a portion of the bundle of rays 0501 which has passed through the first filter 0701 in the filter group 0184. Accordingly, the bundle of rays 0511 has the first spectral characteristic. A bundle of rays 0521 is a portion of the bundle of rays 0501 which has passed through the second filter 0702 in the filter group 0184. Accordingly, the bundle of rays 0521 has the second spectral characteristic.

The bundles of rays 0311 and 0321 are condensed at the same point (the first point 0310) within the subject 0100, due to operation of the condensing lens 0203. It should be noted that the bundle of rays 0311 has the first spectral characteristic, whereas the bundle of rays 0321 has the second spectral characteristic. Specifically, the bundle of rays 0311 having the first spectral characteristic and the bundle of rays 0321 having the second spectral characteristic simultaneously illuminate the first point 0310 within the subject 0100.

The bundles of rays 0411 and 0421 are condensed at the same point (the second point 0410) within the subject 0100, due to operation of the condensing lens 0203. It should be noted that the bundle of rays 0411 has the first spectral characteristic, whereas the bundle of rays 0421 has the second spectral characteristic. In other words, the bundle of rays 0411 having the first spectral characteristic and the bundle of rays 0421 having the second spectral characteristic simultaneously illuminate the second point 0410 within the subject 0100.

The bundles of rays 0511 and 0521 are condensed at the same point (the third point 0510) within the subject 0100, due to operation of the condensing lens 0203. It should be noted that the bundle of rays 0511 has the first spectral characteristic, whereas the bundle of rays 0521 has the second spectral characteristic. In other words, the bundle of rays 0511 having the first spectral characteristic and the bundle of rays 0521 having the second spectral characteristic simultaneously illuminate the third point 0510 within the subject 0100.

It should be noted that here, a description is given of bundles of rays which illuminate three points within the subject 0100. However, it is needless to say that plural bundles of rays having different spectral characteristics corresponding in number to the filters 0709 simultaneously illuminate given points in an illumination area.

As described above, the optical path of a bundle of illumination rays does not depend on the transmission property of the filter group 0184. Thus, the multispectral imaging device can illuminate and image the subject 0100 using light having other spectral characteristics with ease, by merely exchanging the filter group 0184 or the filters 0709 in the filter group 0184.

The following describes the imaging optical system 0190.

Figure 11:
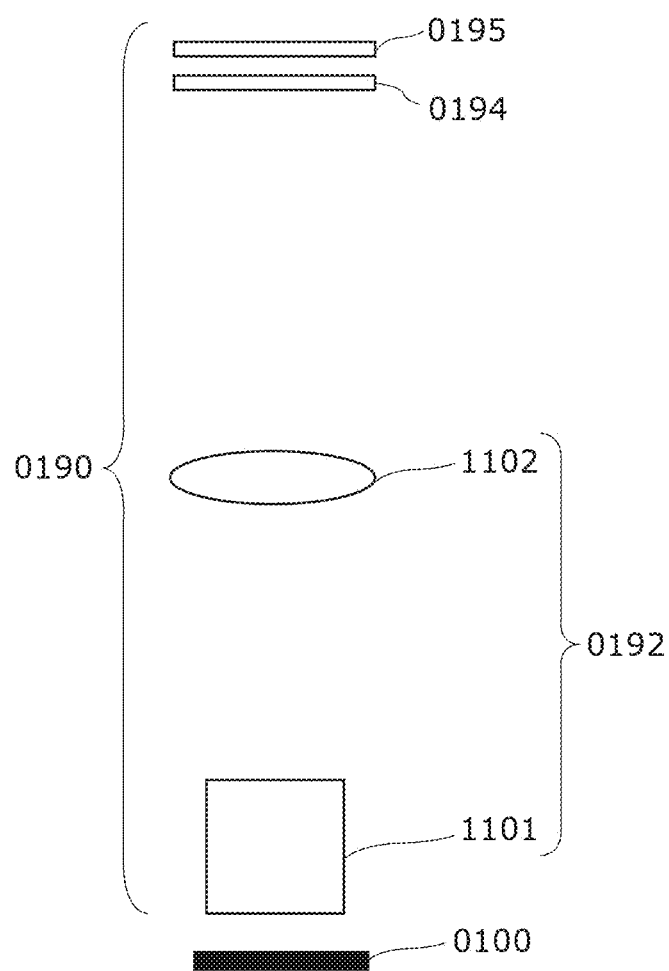
FIG. 11 illustrates an example of a configuration of an imaging optical system according to Embodiment 1.

FIG. 11 illustrates an example of a configuration of the imaging optical system 0190.

The lens group 0192 includes an objective lens 1101 and an imaging lens 1102. A typical objective lens for microscopic observation can be used as the objective lens 1101. A revolver which switches objective lenses may be provided if necessary.

The subject 0100 is located at a front focal point of the objective lens 1101. A combination of the objective lens 1101 and the imaging lens 1102 can form a real image of the subject 0100 in the vicinity of the separation optical element 0194, by disposing the separation optical element 0194 such that the separation optical element 0194 is located conjugate to the subject 0100.

Figure 15:
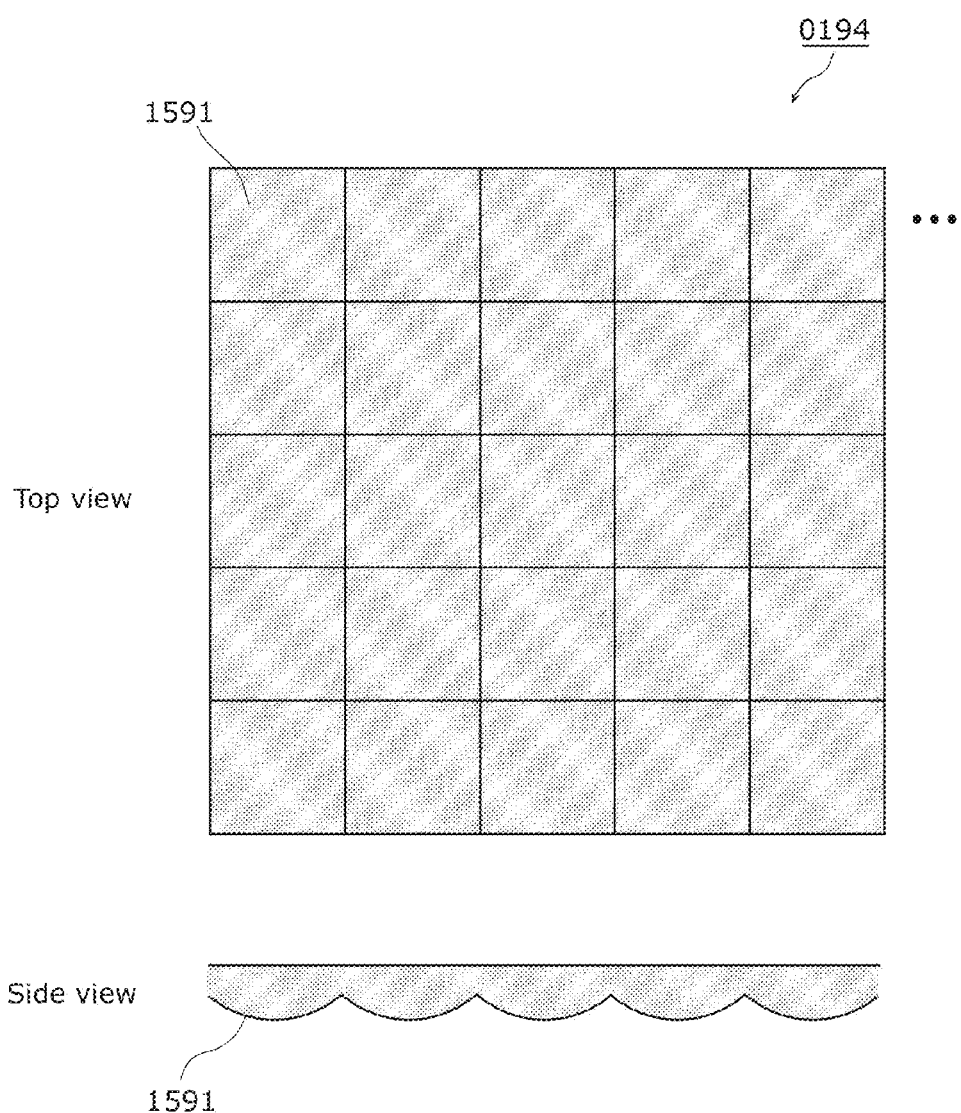
FIG. 15 illustrates an example of a separation optical element in Embodiment 1.

In this example, as the separation optical element 0194, a microlens array is used in which microlenses 1591 are two-dimensionally arranged as shown in FIG. 15. The two-dimensional light receiving element array 0195 is disposed in the vicinity of a position where the two-dimensional light receiving element array 0195 is conjugate to the filter group 0184 due to the lens functionality of the lens group 0182 of the illumination optical system 0180, the lens group 0192 of the imaging optical system 0190, and the microlenses 1591. If the illumination optical system 0180 is a Koehler illumination system, the two-dimensional light receiving element array 0195 is disposed at a focal position of the microlenses 1591.

Figure 12:
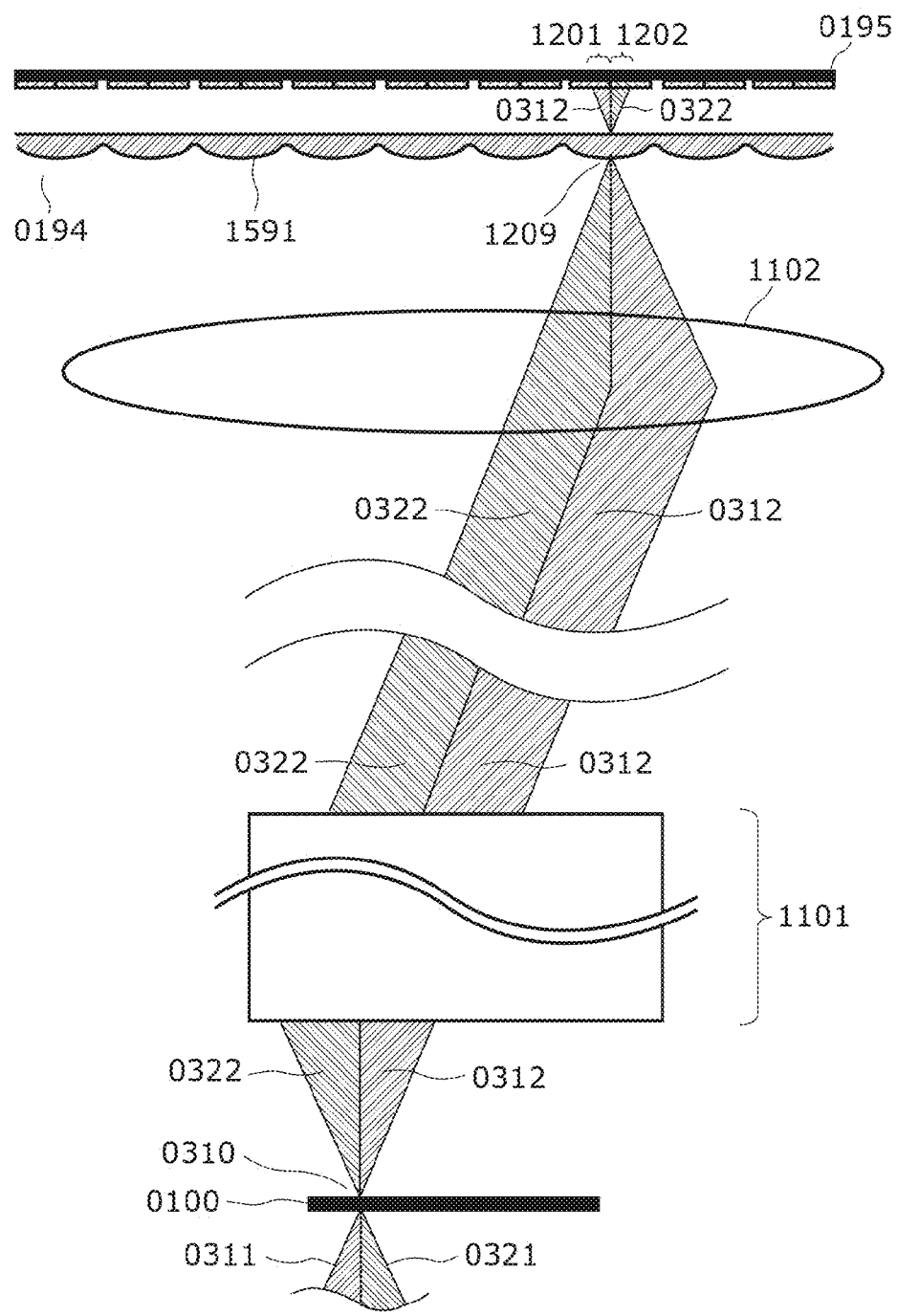
FIG. 12 illustrates optical paths of bundles of rays which have passed through the first point within the subject in Embodiment 1.
Figure 13:
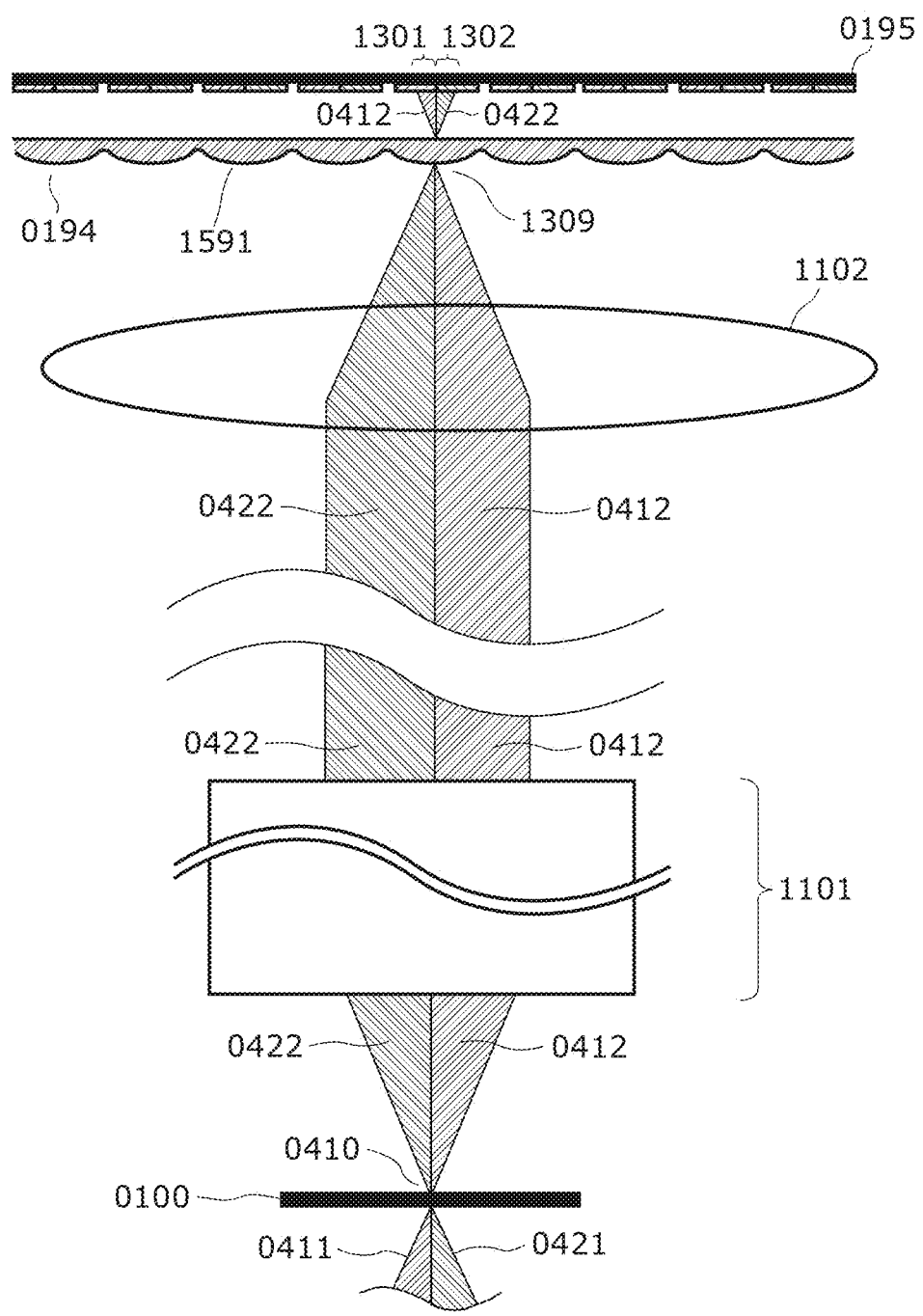
FIG. 13 illustrates optical paths of bundles of rays which have passed through the second point within the subject in Embodiment 1.
Figure 14:
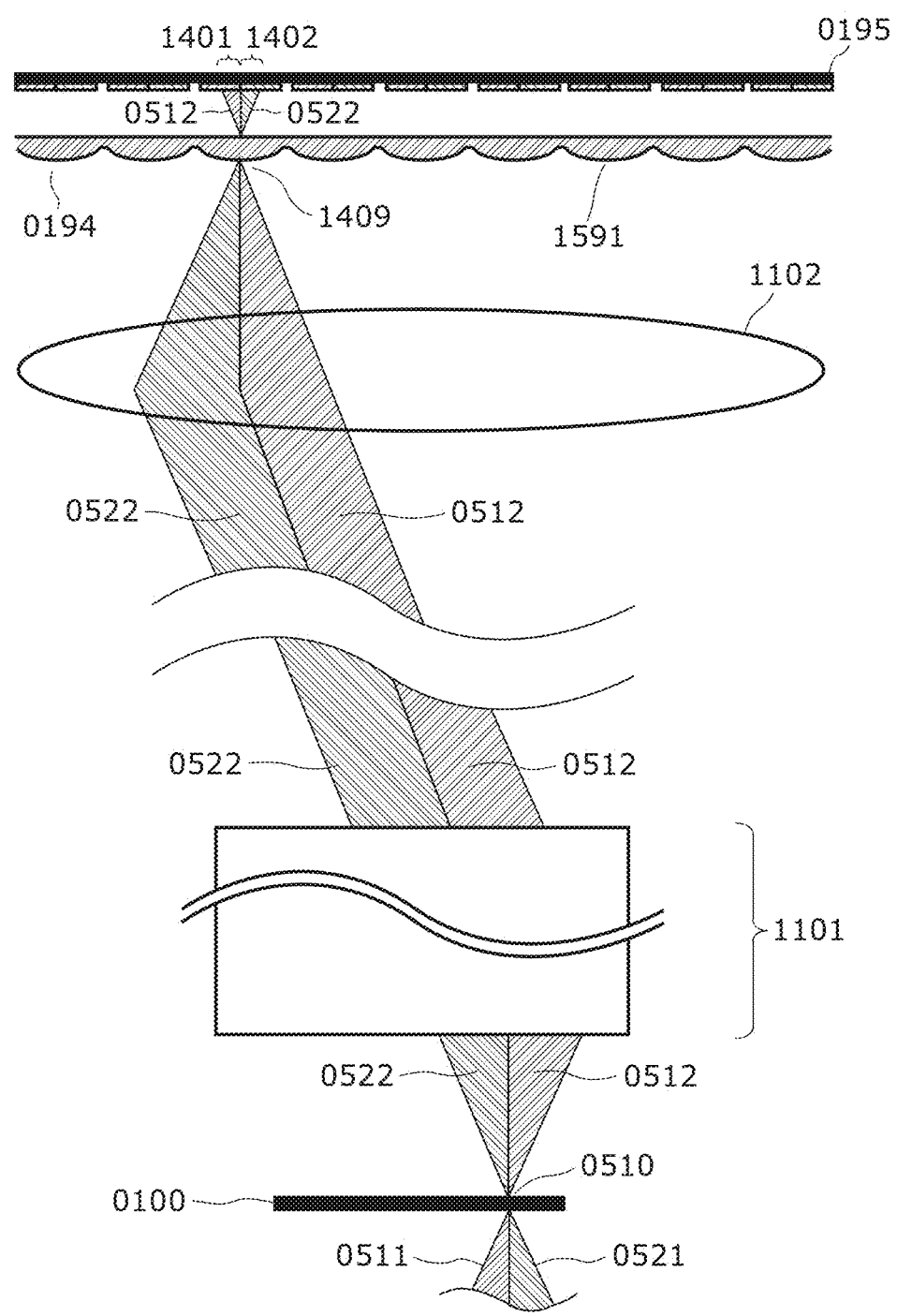
FIG. 14 illustrates optical paths of bundles of rays which have passed through the third point within the subject in Embodiment 1.

A description is given of an optical path in the imaging optical system according to this example configuration, with reference to FIGS. 12 to 14.

A bundle of rays 0312 is a portion of the bundle of rays 0311 which has passed through the first point 0310 and the vicinity thereof within the subject 0100 without being scattered. The characteristic of the bundle of rays 0312 reflects a transmission property for the first spectrum at and in the vicinity of the first point 0310 within the subject 0100. A bundle of rays 0322 is a portion of the bundle of rays 0321 which has passed through the first point 0310 and the vicinity thereof within the subject 0100 without being scattered. The characteristic of the bundle of rays 0322 reflects a transmission property for the second spectrum at and in the vicinity of the first point 0310 within the subject 0100.

A bundle of rays 0412 is a portion of the bundle of rays 0411 which has passed through the second point 0410 and the vicinity thereof within the subject 0100 without being scattered. The characteristic of the bundle of rays 0412 reflects a transmission property for the first spectrum at and in the vicinity of the second point 0410 within the subject 0100. A bundle of rays 0422 is a portion of the bundle of rays 0421 which has passed through the second point 0410 and the vicinity thereof within the subject 0100 without being scattered. The characteristic of the bundle of rays 0422 reflects a transmission property for the second spectrum at and in the vicinity of the second point 0410 within the subject 0100.

A bundle of rays 0512 is a portion of the bundle of rays 0511 which has passed through the third point 0510 and the vicinity thereof within the subject 0100 without being scattered. The characteristic of the bundle of rays 0512 reflects a transmission property for the first spectrum at and in the vicinity of the third point 0510 within the subject 0100. A bundle of rays 0522 is a portion of the bundle of rays 0521 which has passed through the third point 0510 and the vicinity thereof within the subject 0100 without being scattered. The characteristic of the bundle of rays 0522 reflects a transmission property for the second spectrum at and in the vicinity of the third point 0510 within the subject 0100.

The bundles of rays 0312, 0322, 0412, 0422, 0512, and 0522 are each condensed by the objective lens 1101, and enter the imaging lens 1102.

Due to operation of the imaging lens 1102, a real image of the subject 0100 is formed in the vicinity of the separation optical element 0194. Compared with the size of the subject 0100, this real image is enlarged by the magnification depending on the optical property of the lens group 0192. For example, if the focal length of the objective lens 1101 is 2 mm and the focal length of the imaging lens 1102 is 200 mm, a real image enlarged by 100 times is formed.

Bundles of rays from the same point within the subject 0100 are condensed at the same point on a real image. For example, the bundles of rays 0312 and 0322 from the first point 0310 are condensed at a point 1209. Similarly, the bundles of rays 0412 and 0422 from the second point 0410 are condensed at a point 1309. In addition, the bundles of rays 0511 and 0522 from the third point 0510 are condensed at a point 1409. As described above, points within the real image formed in the vicinity of the separation optical element 0194 correspond to different positions within the subject 0100.

Bundles of rays forming the real image pass through the separation optical element 0194, thus returning to the bundles of spreading rays. Then, the two-dimensional light receiving element array 0195 is irradiated with the bundles of spreading rays. At this time, different areas of the two-dimensional light receiving element array 0195 are irradiated with the bundles of rays from different points within the real image.

For example, an area 1201 in the two-dimensional light receiving element array 0195 is irradiated with the bundle of rays 0312. Similarly, an area 1202 in the two-dimensional light receiving element array 0195 is irradiated with the bundle of rays 0322. Similarly, an area 1301 in the two-dimensional light receiving element array 0195 is irradiated with the bundle of rays 0412. Similarly, an area 1302 in the two-dimensional light receiving element array 0195 is irradiated with the bundle of rays 0422. Similarly, an area 1401 in the two-dimensional light receiving element array 0195 is irradiated with the bundle of rays 0512. Similarly, an area 1402 in the two-dimensional light receiving element array 0195 is irradiated with the bundle of rays 0522.

The irradiation areas on the two-dimensional light receiving element array 0195 irradiated with the bundles of rays depend on the optical properties, the physical sizes, and the relative positional relationship of the illumination optical system 0180 and the imaging optical system 0190.

Bundles of rays which have passed through sufficiently near two points within a real image have an overlap in the irradiation areas on the two-dimensional light receiving element array 0195. In contrast, bundles of rays which have passed through sufficiently distant two points within a real image do not have an overlap in the irradiation areas on the two-dimensional light receiving element array 0195.

The bundles of rays having irradiation areas not overlapping on the two-dimensional light receiving element array 0195 can be applied to different light receiving pixels 1711 in the two-dimensional light receiving element array 0195, and thus can be distinguished. Thus, the multispectral imaging device according to the present embodiment can capture a multispectral image of the subject 0100 at spatial resolutions limited by the overlap of the irradiation areas.

How distant points need to be within a real image so as not to have an overlap depends on optical properties, physical sizes, and a relative positional relationship of the illumination optical system 0180 and the imaging optical system 0190.

A description is given of the case where the separation optical element 0194 is a set of the microlenses 1591 as illustrated in FIG. 15. If the distance between the separation optical element 0194 and the two-dimensional light receiving element array 0195 is sufficiently shorter than the focal length of the microlenses 1591 included in the lens group 0192, bundles of rays which have passed through the individual microlenses 1591 do not overlap. Thus, a spatial resolution about the size of the microlenses 1591 can be obtained in this case.

Figure 16:
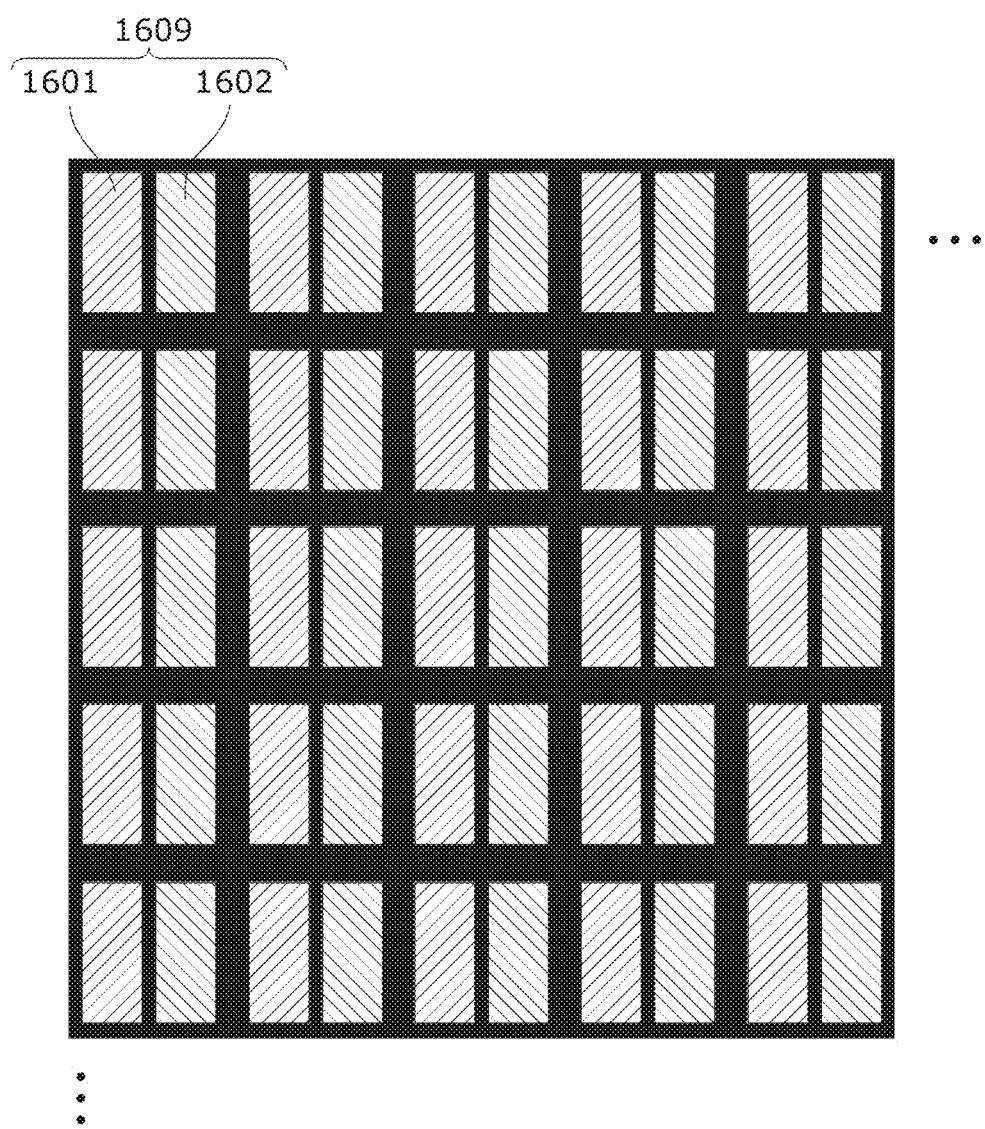
FIG. 16 illustrates a real image of a filter group projected on an imaging surface in Embodiment 1.

In addition, the lens group 0192 and the microlenses 1591 in the separation optical element 0194 form real images 1609 of the filter group 0184 on the two-dimensional light receiving element array 0195 (FIG. 16). The number of the real images 1609 is equal to the number of the microlenses 1591 in the separation optical element 0194.

In each of the real images 1609, a real image 1601 of the first filter and a real image 1602 of the second filter are respectively formed by bundles of rays which have passed through the first filter 0701 and the second filter 0702, and through the subject 0100. In other words, the real image 1601 and the real image 1602 are respectively obtained by light having the first spectral characteristic and light having the second spectral characteristic illuminating the subject 0100. In addition, although images are of the same first filter 0701, images formed by different microlenses 1591 are formed by bundles of rays which have passed through the subject 0100 at different positions.

Figure 17:
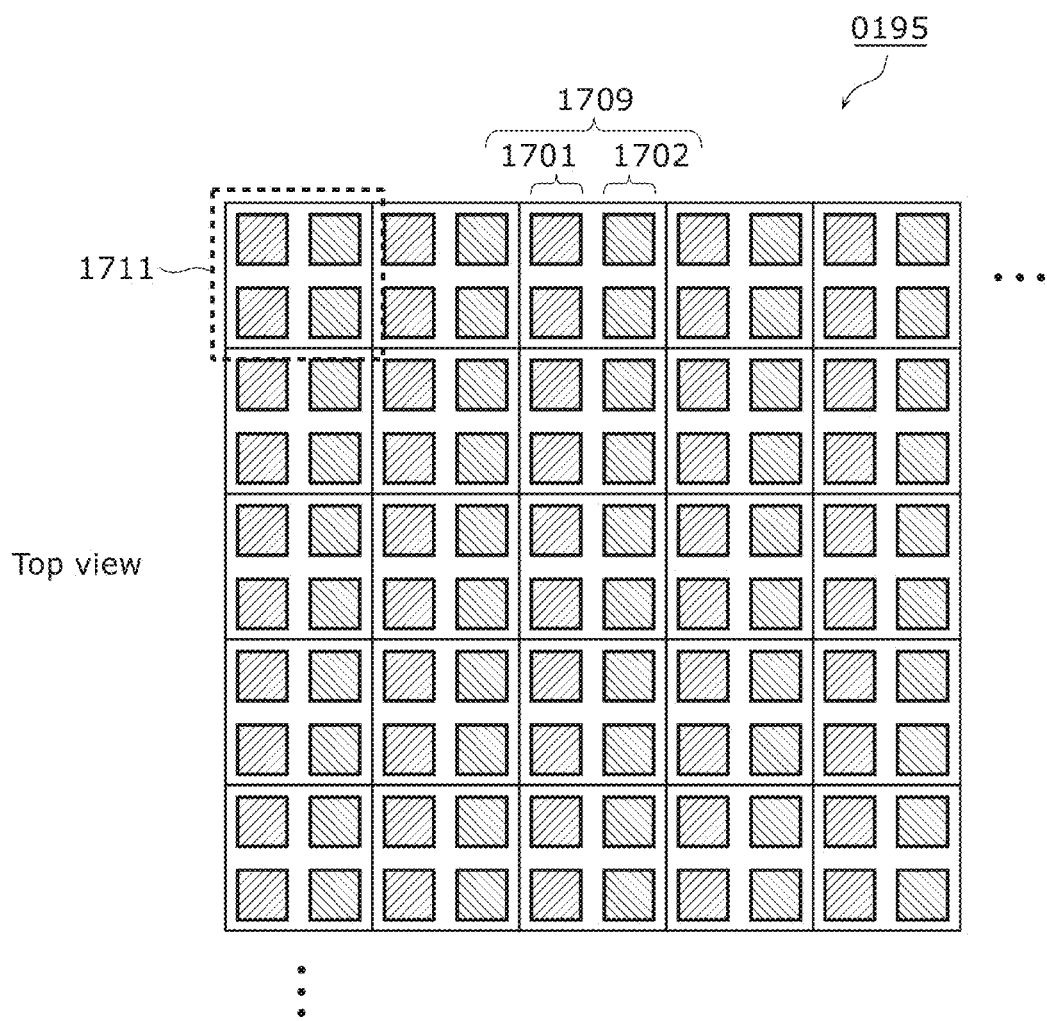
FIG. 17 is a schematic diagram of a two-dimensional light receiving element array in Embodiment 1.

FIG. 17 is a schematic diagram of the two-dimensional light receiving element array 0195. The two-dimensional light receiving element array 0195 in this example includes the light receiving pixels 1711 having almost the same size as and equivalent in number to the microlens 1591. Plural light receiving elements 1709 are disposed in each of the light receiving pixels 1711. In this example, four light receiving elements 1709 are disposed in each of the light receiving pixels 1711.

At this time, if the light receiving elements 1709 are disposed so as to each overlap a real image of one filter only, the microlenses 1591 can guide bundles of rays which have passed through different filters to different light receiving elements.

If only information on light receiving elements in the light receiving pixels 1711 corresponding to the same spectral characteristic is collected, an image of the subject 0100 captured using light having the spectral characteristic can be formed. According to the method according to the present embodiment, images of the subject 0100 can be captured simultaneously, which correspond to the filters 0709 in number.

In other words, if signals of only, among the light receiving pixels 1711, the first light receiving elements 1701 that overlap the real images 1601 of the first filter are collected, an image of the subject 0100 captured using light having the first spectral characteristic can be obtained. Similarly, if signals of only, among the light receiving pixels 1711, the second light receiving elements 1702 that overlap the real images 1602 of the second filter are collected, an image of the subject 0100 captured using light having the second spectral characteristic can be obtained.

As described above, this configuration allows a microscope optical system to capture a multispectral image of the subject 0100.

It should be noted that the multispectral imaging device can capture with ease a multispectral image which includes three or more images, by changing the number of the filters 0709 in the filter group 0184 and the number of the light receiving elements 1709 in each of the light receiving pixels 1711 included in the two-dimensional light receiving element array 0195.

In the case of the multispectral imaging device according to Embodiment 1, the filter group 0184 or the individual filters 0709 may be exchanged to a filter group or filters having the same physical size and different transmission properties. In this manner, the multispectral imaging device can capture with ease plural multispectral images having different characteristics.

In the above example, the light receiving pixels 1711 each include two light receiving elements 1709 which receive light which has passed through the filters 0709. However, the number of the filters and the number of the light receiving elements are not limited to these. For example, each light receiving element may receive light which has passed through a different one of the filters 0709. Conversely, five or more light receiving elements may be disposed in each light receiving pixel. Disposing many light receiving elements achieves an increase in flexibility of the number of the filters 0709. In addition, depending on the alignment of the axes of an optical system and the alignment accuracy, the two-dimensional light receiving element array 0195 may have a spot simultaneously irradiated with bundles of rays which have passed through the filters 0709. Even in such a case, if sufficient light receiving elements 1709 are disposed in each light receiving pixel 1711, a signal from the light receiving element 1709 which is irradiated with bundles of rays which have passed through the filters 0709 is eliminated, and only a signal from the light receiving element 1709 irradiated with light which has passed through a single filter is used, to obtain a multispectral image.

A description is given of examples of multispectral imaging and effects thereof, with reference to FIGS. 18 to 21. A subject is cancer tissue stained with eosin, hematoxylin, and an immunostain with Ki-67 antibodies. Eosin has a property of staining cytoplasm, whereas hematoxylin has a property of staining all the vesicular nuclei. An immunostain with Ki-67 antibodies stains a nucleus having a Ki-67 antigen. It is known that calculating a proportion of nuclei having Ki-67 antigens of all the nuclei is useful for cancer treatment.

Figure 18:
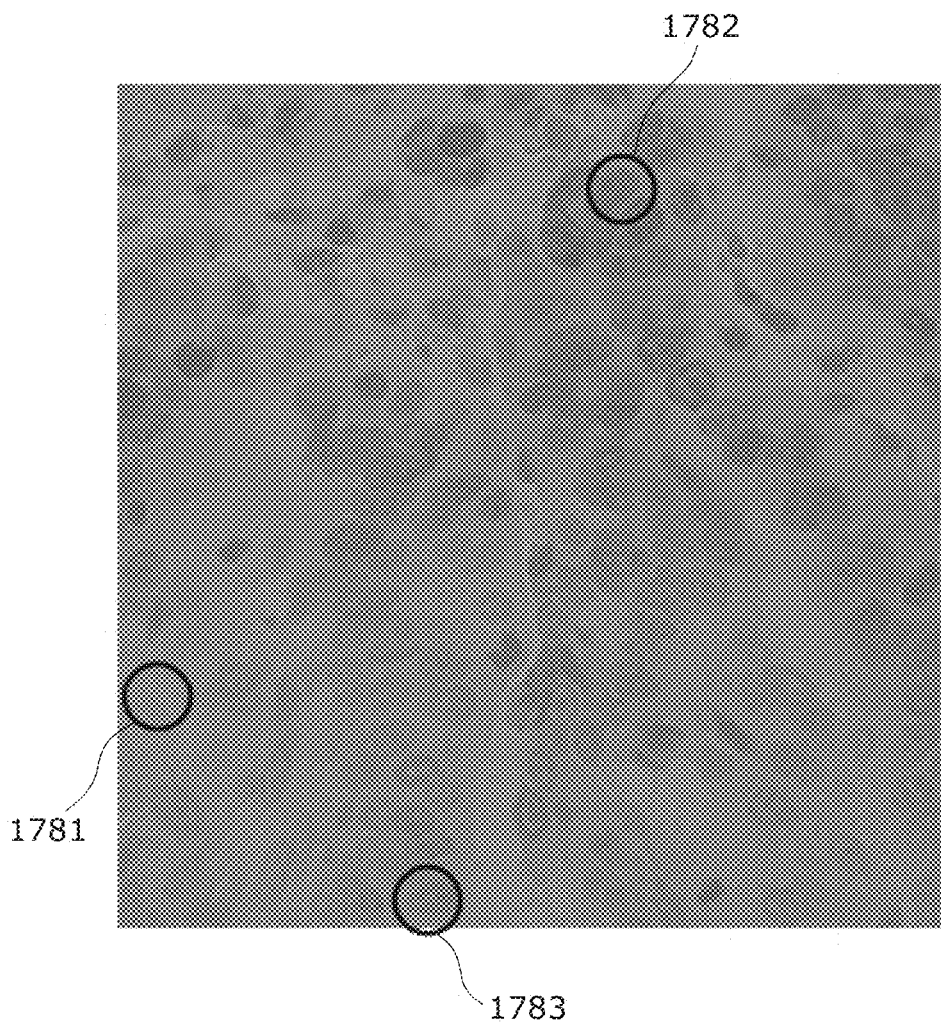
FIG. 18 is a picture of cancer tissues captured without limiting a spectrum.

FIG. 18 is an image captured without limiting a spectrum from 420 nm to 700 nm. FIG. 18 shows a small difference in contrast between cytoplasm 1781, an immunostained nucleus 1782, and a nucleus 1783 not immunostained. Accordingly, it is difficult to identify the cytoplasm 1781, the immunostained nucleus 1782, and the nucleus 1783 not immunostained. It should be noted that only typical nuclei are circled, although many nuclei are shown in FIG. 18.

Figure 19:
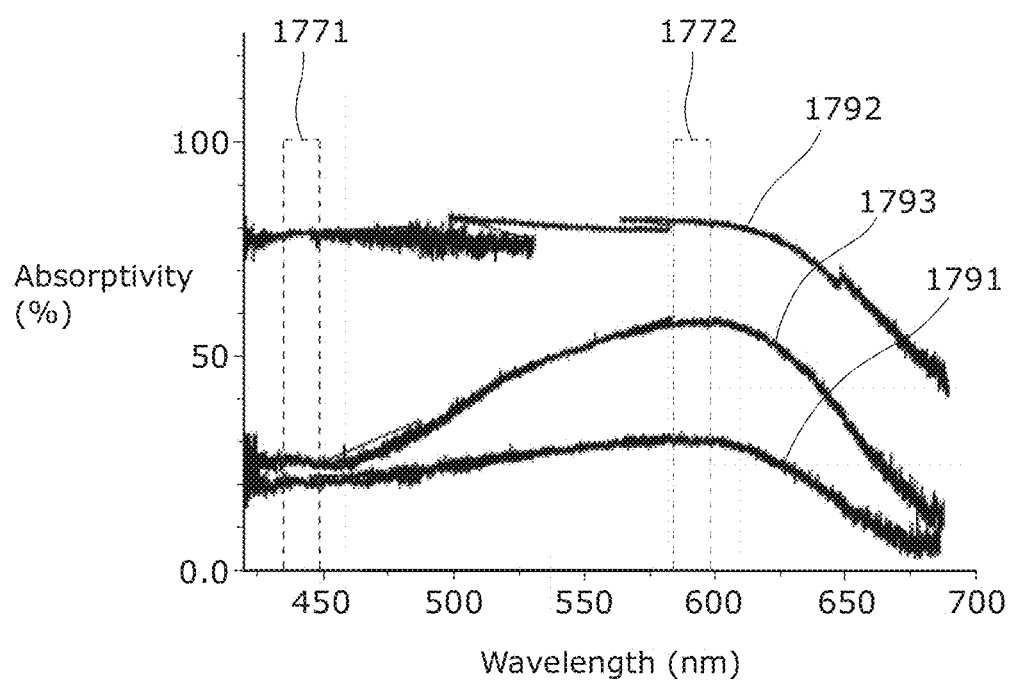
FIG. 19 is a graph showing absorption spectra of tissues.

FIG. 19 is a graph showing an absorption spectrum 1791 of the cytoplasm 1781, an absorption spectrum 1792 of the immunostained nucleus 1782, and an absorption spectrum 1793 of the nucleus 1783 not immunostained. The graph shows that only the immunostained nucleus 1782 has a high absorptivity in a range from 420 to 450 nm. In contrast, in a range from 475 to 675 nm, all the nuclei which is a combination of the immunostained nucleus 1782 and the nucleus 1783 not K immunostained have a higher absorptivity than the cytoplasm 1781, and the difference in the absorptivity of all the nuclei and the cytoplasm 1781 is large at about 600 nm, in particular.

Figure 20:
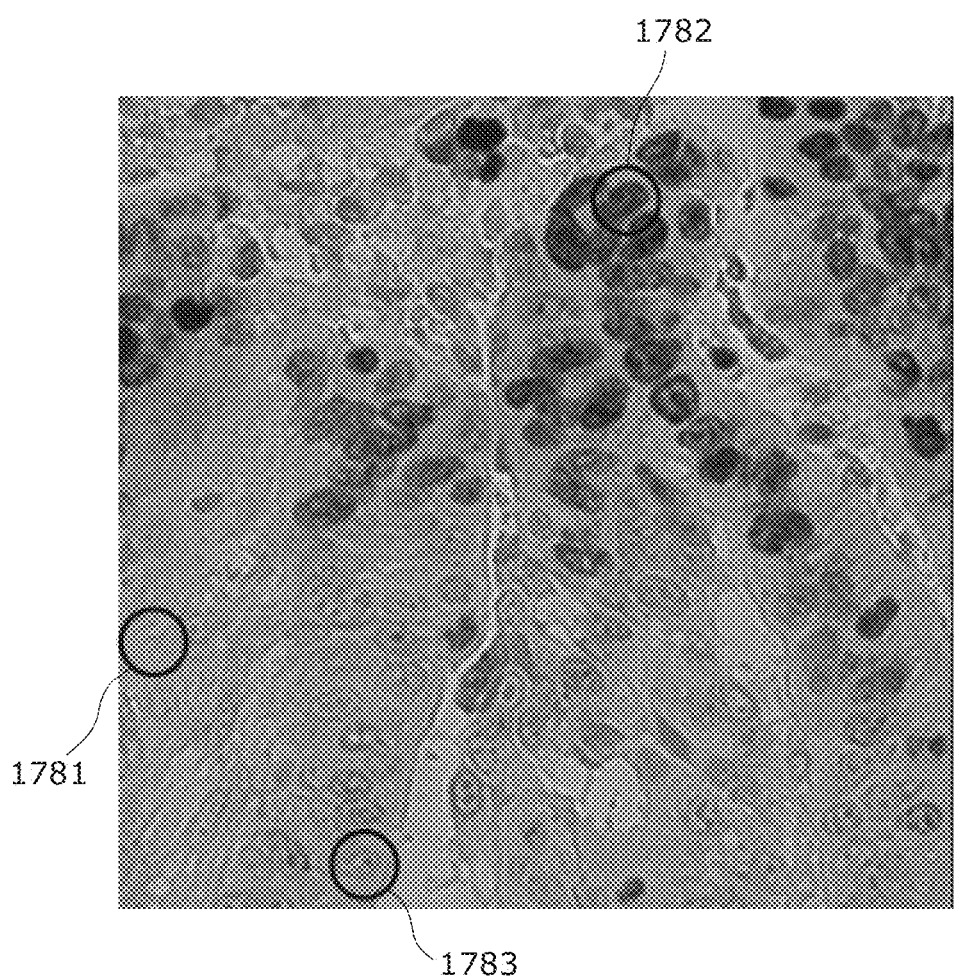
FIG. 20 is a picture of cancer tissues captured with a first spectral characteristic in Embodiment 1.

FIG. 20 is an image captured using light having a wavelength corresponding to the first spectral characteristic 1771. In addition, FIG. 21 is an image captured using light having a wavelength corresponding to the second spectral characteristic 1772.

In FIG. 20, only the immunostained nucleus 1782 is captured in black. This is because the stain used for immunostaining has a high absorptivity when light has the first spectral characteristic. Imaging with the light having the first spectral characteristic is suitable for counting the number of the immunostained nucleus 1782.

Figure 21:
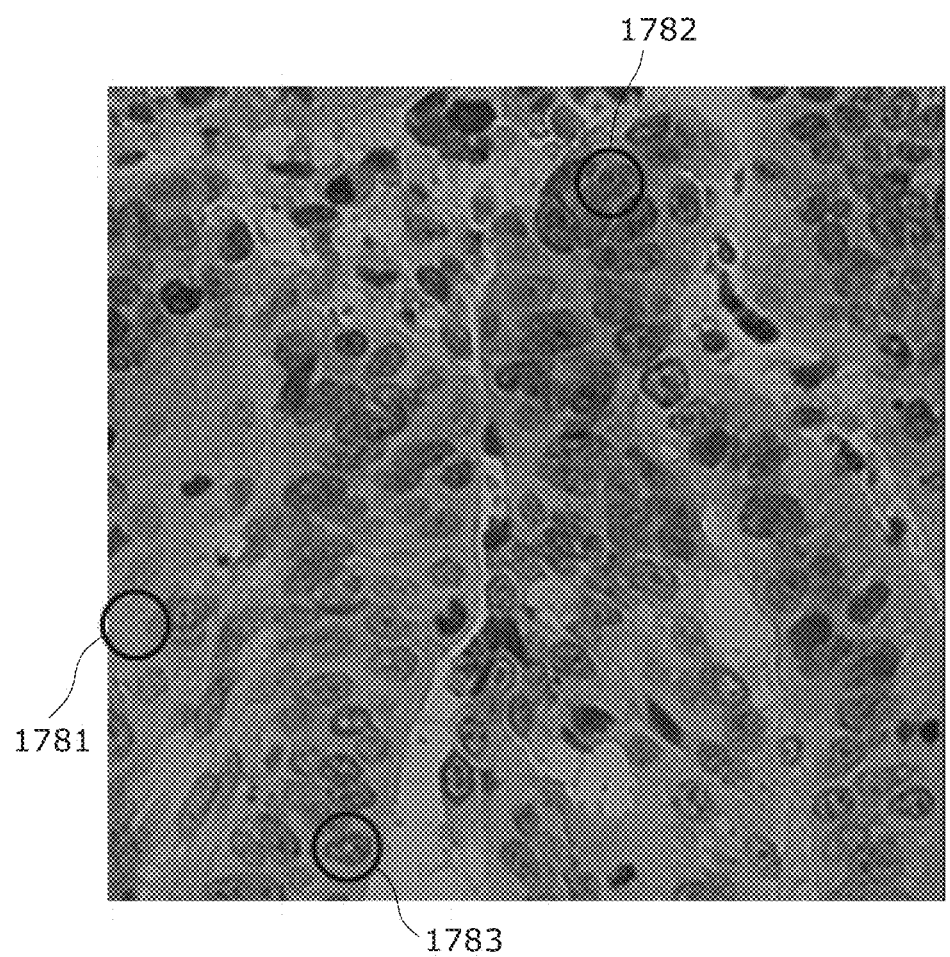
FIG. 21 is a picture of cancer tissues captured with a second spectral characteristic in Embodiment 1.

In FIG. 21, however, the immunostained nucleus 1782 and the nucleus 1783 not immunostained are both captured in black. This is because the stain used for immunostaining and hematoxylin used for nuclear non-specific staining both have a high absorptivity in the wavelength range corresponding to the second spectral characteristic. In addition, another reason is that eosin for staining cytoplasm does not have a high absorptivity in the wavelength range corresponding to the second spectral characteristic. Imaging with light having the second spectral characteristic is suitable for counting a total number of nuclei.

Consequently, if the number of immunostained nuclei is counted using an image captured with light having the first spectral characteristic, and a total number of nuclei is counted using an image captured with light having the second spectral characteristic, a proportion of the immunostained nuclei of all the nuclei can be calculated with sufficient accuracy.

In the above manner, according to the multispectral imaging device according to the present embodiment, transmission properties of filters are selected such that illumination light passes through a subject stained using stains having absorption spectra, the illumination light having spectral characteristics which cause the stains to show different absorption. Consequently, imaging can be performed which allows stained regions to be distinguished more clearly. In other words, the filter group that includes the first filter which transmits light having a first wavelength at which a first stain included in the stains shows a unique absorption spectrum, and the second filter which transmits light having a second wavelength at which a second stain included in the stains shows a unique absorption spectrum is disposed in the illumination optical system, thus allowing a subject stained using the stains having absorption spectra to be observed appropriately.

According to the multispectral imaging device according to the present embodiment, the filter group 0184 and the filters 0709 can be exchanged, and thus spectral characteristics of illumination light can be changed with ease. Therefore, according to a method of staining the subject 0100, imaging is performed while exchanging the filter group 0184 or the filters 0709 to an appropriate filter group 0184 or appropriate filters 0709. As a result, a multispectral image suitable for observation of the subject can be captured.

Embodiment 2

In Embodiment 2, a description is given of, with reference to FIGS. 22 to 34, a reflective illumination multispectral imaging device mainly used for capturing reflected images of opaque samples such as metal and semiconductor samples.

Figure 22:
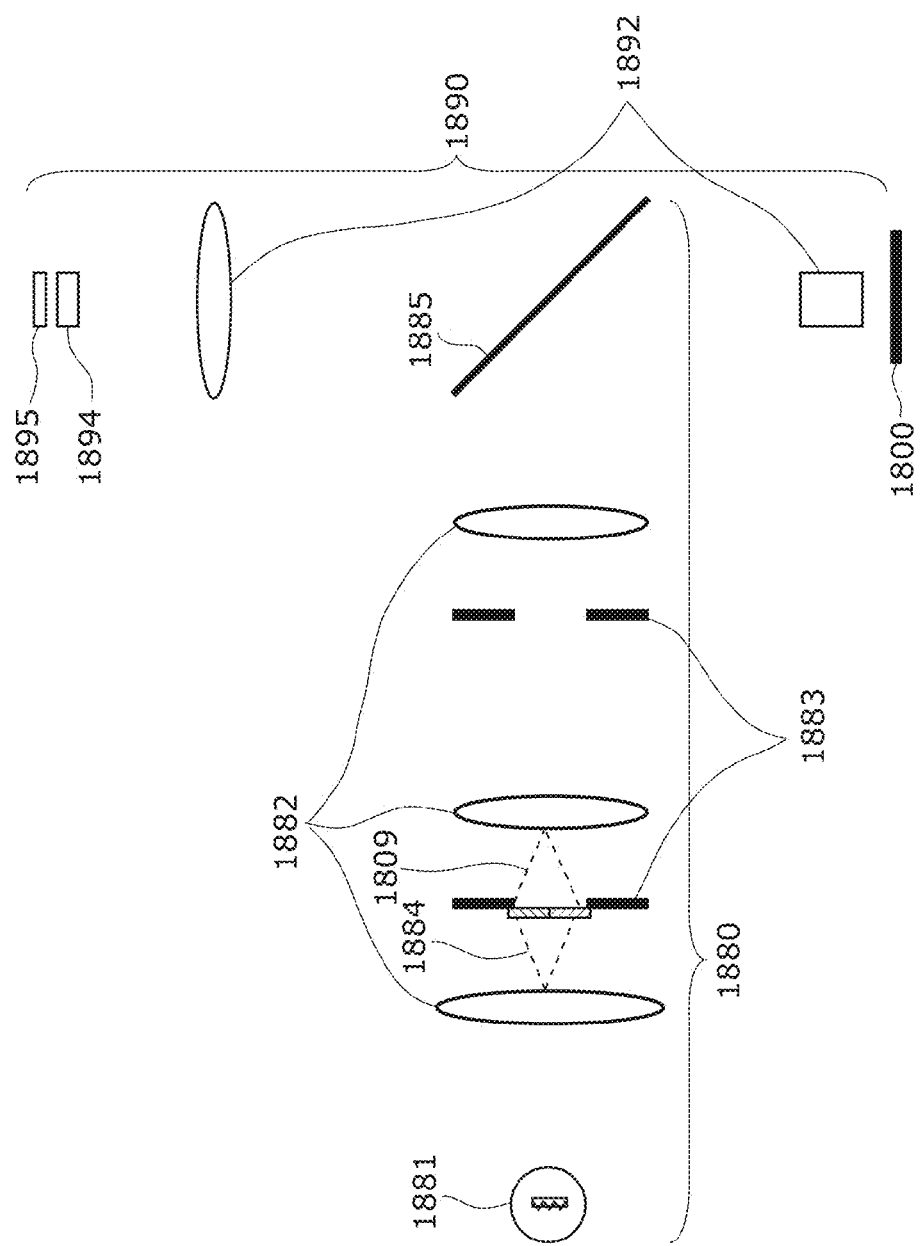
FIG. 22 illustrates an example of a configuration of a multispectral imaging device according to Embodiment 2.

FIG. 22 illustrates an example of a structure of a multispectral imaging device according to Embodiment 2. A multispectral imaging device according to the present embodiment includes an illumination optical system 1880 and an imaging optical system 1890, and captures a multi-spectrum image of a subject 1800. It should be noted that unlike the trans-illumination multispectral imaging device according to Embodiment 1, a bundle of rays travels back and forth in the area from a half mirror 1885 to the subject 1800. In this specification, constituent elements from a light source 1881 to the half mirror 1885 belong to the illumination optical system 1880, and other constituent elements belong to the imaging optical system 1890, for convenience. In other words, the constituent elements located between the half mirror 1885 and the subject 1800 belong to the imaging optical system 1890.

The illumination optical system 1880 includes the light source 1881, a lens group 1882, a stop group 1883, a filter group 1884, and the half mirror 1885. The imaging optical system 1890 includes a lens group 1892, a separation optical element 1894, and a two-dimensional light receiving element array (image sensor) 1895. The following describes constituent elements of the illumination optical system 1880 and the imaging optical system 1890.

The light source 1881 generates bundles of illumination rays. The light source 1881 is the same as the light source 0181 according to Embodiment 1, and thus a detailed description thereof is omitted. Here, a description is given of, as an example, the case where a xenon light source having a distribution of components in a range from 300 nm to 1100 nm is used as the light source 1881.

The lens group 1882 bends the path of light emitted by the light source 1881. The lens group 1882 may include a refractive lens, a reflective lens, or a combination of such lenses.

The stop group 1883 limits the optical path of light emitted by the light source 1881. The stop group 1883 may include aperture adjustable stops or fixed stops.

The filter group 1884 is disposed in an overlap region 0809 of bundles of illumination rays which reach points in an imaging area of the subject 1800. In addition, the filter group 1884 includes plural filters having different transmission properties (first to fourth filters in the present embodiment). The filter group 1884 generates bundles of illumination rays having spectra necessary for multispectral imaging. The filter group 1884 is exchanged when necessary. In other words, the filter group 1884 is attached to the illumination optical system 1880 exchangeably. Thus, the filter group 1884 is detachable. It should be noted that the filter group 1884 may be fixed to the illumination optical system 0180 unexchangeably.

The half mirror 1885 reflects a portion of a bundle of illumination rays emitted by the light source 1881, and the reflected light illuminates the subject 1800. In addition, the half mirror 1885 transmits a portion of light reflected off the subject 1800, and causes the portion of the light to enter the separation optical element 1894. The half mirror 1885 is a constituent element typically used for a metallurgical microscope. As the half mirror 1885, a metalized glass plate or the like is used, for example.

The lens group 1892 controls the optical path of the bundle of rays reflected off the subject 1800, and forms a real image of the subject 1800 in the vicinity of the separation optical element 1894.

For each part of the real image of the subject 1800 formed by the lens group 1892, the separation optical element 1894 guides bundles of rays which have passed through the filters of the filter group 1884 to different light receiving elements on the two-dimensional light receiving element array 1895. In other words, the separation optical element 1894 guides light which has passed through the first to fourth filters to corresponding light receiving elements (first to fourth light receiving elements).

The two-dimensional light receiving element array 1895 is an example of an image sensor, and includes, on its surface, light receiving pixels 3411 corresponding in the number to spatial pixels for imaging. The light receiving pixels 3411 each include a first light receiving element 3401 for imaging with a first spectral characteristic, a second light receiving element 3402 for imaging with a second spectral characteristic, a third light receiving element 3403 for imaging with a third spectral characteristic, and a fourth light receiving element 3404 for imaging with a fourth spectral characteristic. Thus, the two-dimensional light receiving element array 1895 includes, in each of the light receiving pixels 3411, light receiving elements 3409 as many as or more than spectrum images captured simultaneously.

The following describes specific examples of configurations and functions of the illumination optical system 1880 and the imaging optical system 1890.

Figure 23:
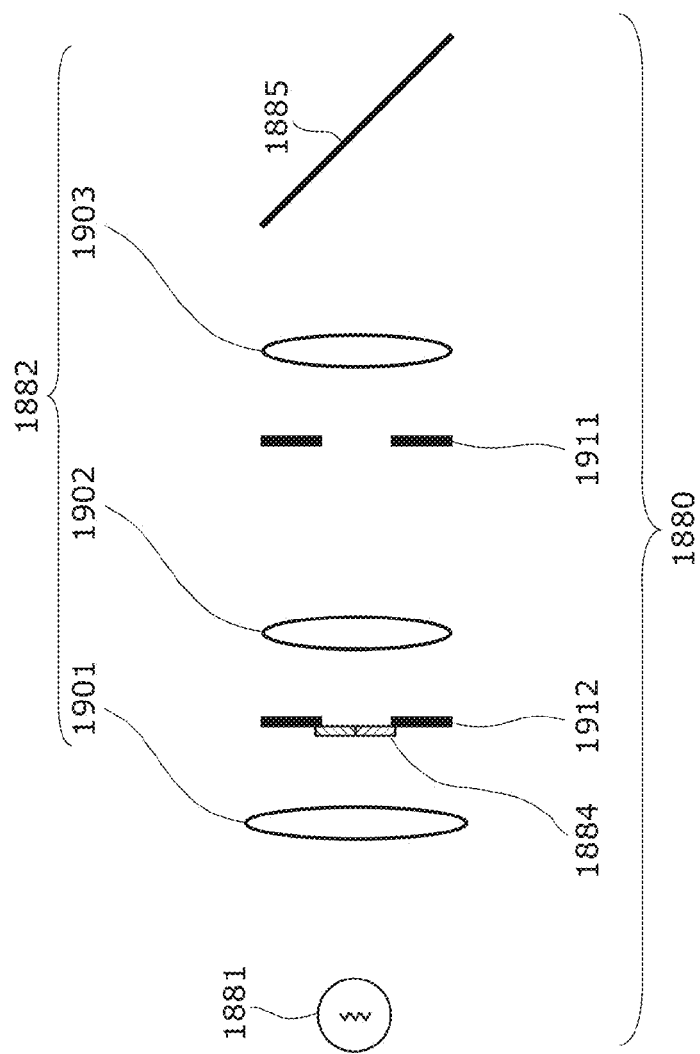
FIG. 23 illustrates an example of a configuration of an illumination optical system according to Embodiment 2.

FIG. 23 illustrates an example of a configuration of the illumination optical system 1880. In the case of this structure, the lens group 1882 includes a collector lens 1901, a first field lens 1902, and a second field lens 1903.

The stop group 1883 of the illumination optical system 1880 includes a field stop 1911 and an aperture stop 1912.

Figure 24:
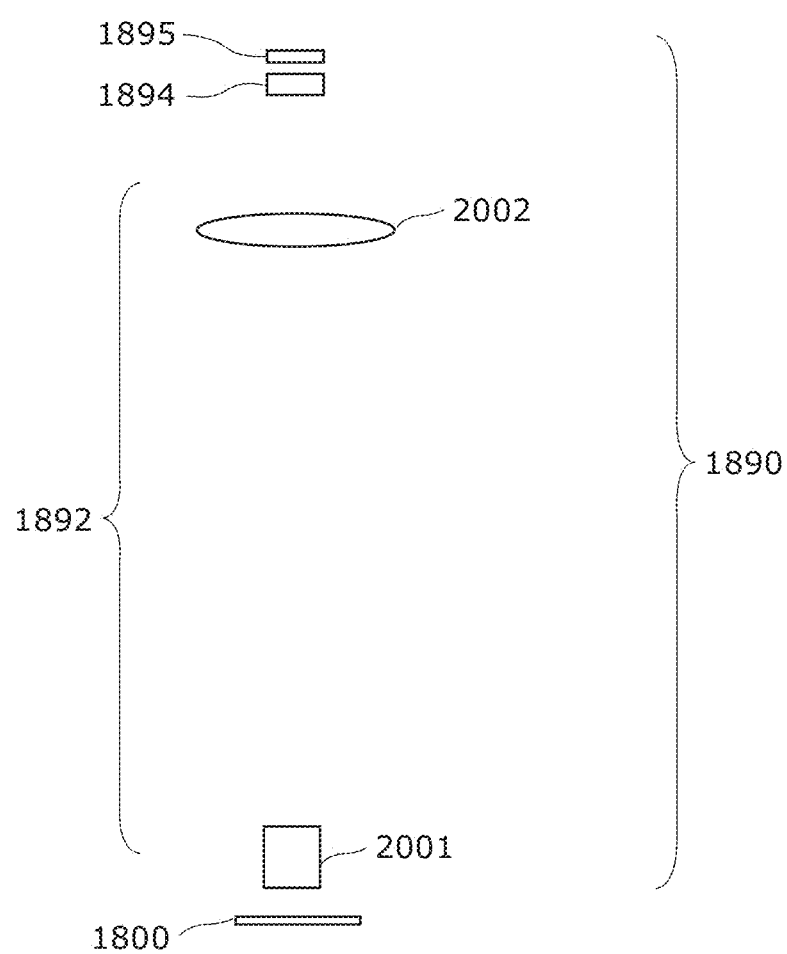
FIG. 24 illustrates an example of a configuration of an imaging optical system according to Embodiment 2.

FIG. 24 illustrates an example of a configuration of the imaging optical system 1890. In the case of this configuration, the lens group 1892 includes an objective lens 2001 and an imaging lens 2002.

The aperture stop 1912 is located conjugate to the light source 1881. The field stop 1911 is located conjugate to the subject 1800. The illumination optical system 1880 having two stops located in this way is called a so-called Koehler epi-illumination. It should be noted that the illumination optical system 1880 is not limited to a Koehler epi-illumination.

A description is given of, with reference to FIGS. 25 to 28, an overlap region 1809 of bundles of illumination rays which reach points in the imaging area of the subject 1800 in the illumination optical system 1880 illustrated in FIG. 23.

Figure 25:
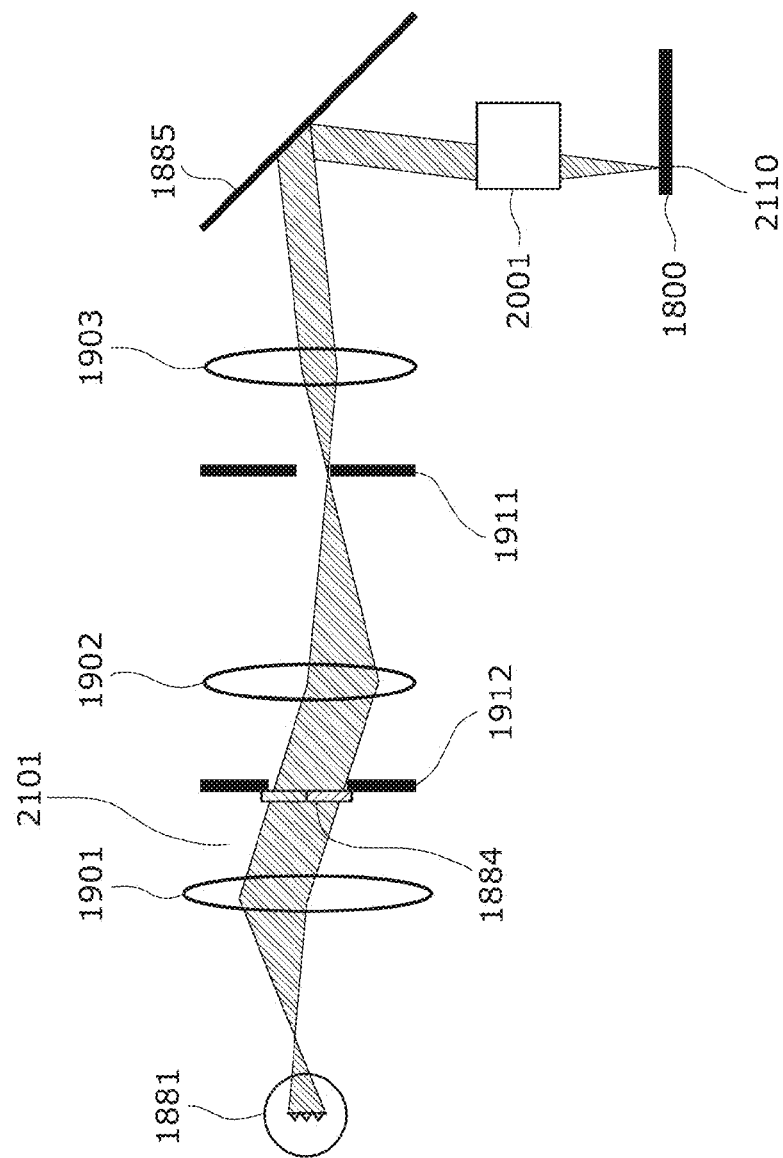
FIG. 25 illustrates an optical path of a bundle of rays condensed at a first point within a subject, in Embodiment 2.

FIG. 25 illustrates a bundle of rays 2101 from the light source 1881 condensed at a first point 2110 within the subject 1800.

Figure 26:
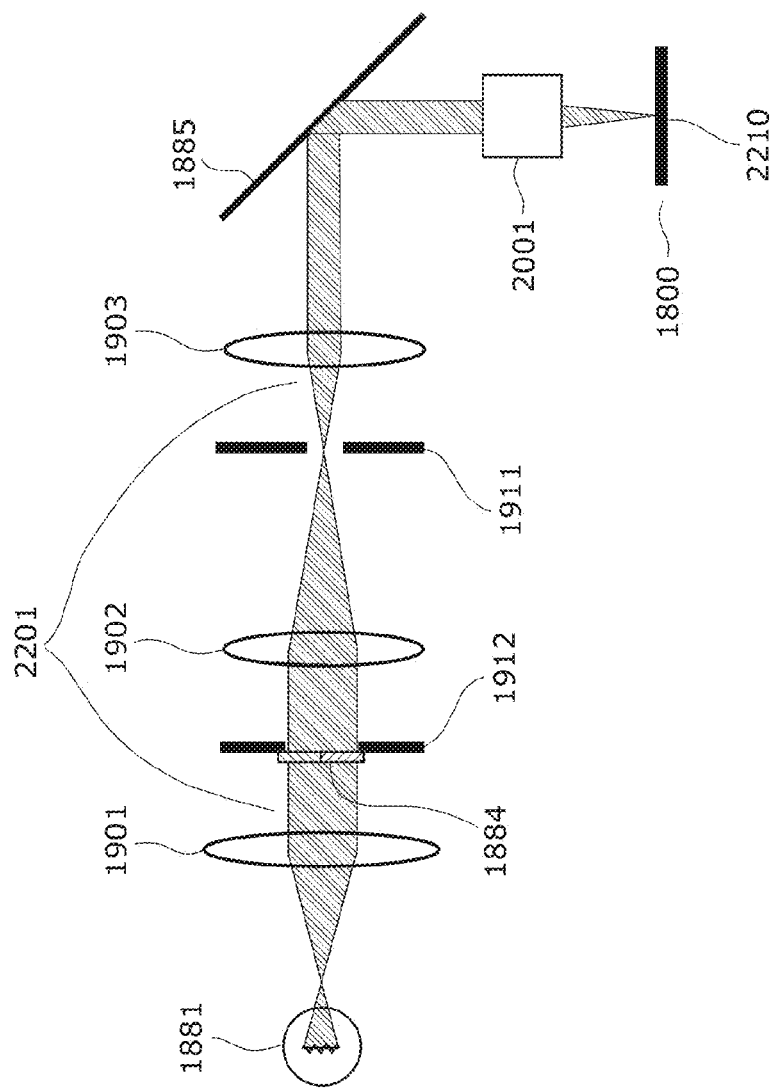
FIG. 26 illustrates an optical path of a bundle of rays condensed at a second point within the subject, in Embodiment 2.

FIG. 26 illustrates a bundle of rays 2201 from the light source 1881 condensed at a second point 2210 within the subject 1800.

Figure 27:
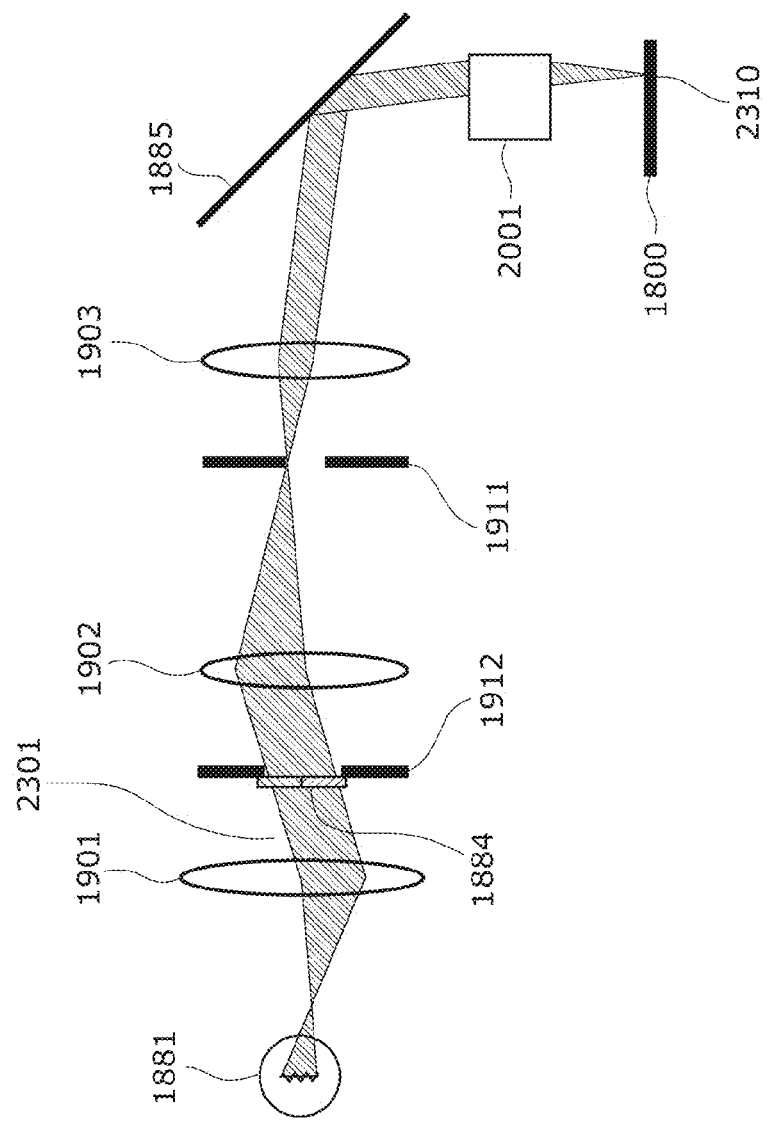
FIG. 27 illustrates an optical path of a bundle of rays condensed at a third point within the subject, in Embodiment 2.

FIG. 27 illustrates a bundle of rays 2301 from the light source 1881 condensed at a third point 2310 within the subject 1800.

The first point 2110 is a point located at an edge of the imaging area of the subject 1800. The third point 2310 is a point located at the other edge of the imaging area of the subject 1800. It should be noted that if a bundle of rays passes through the filter group 1884, the spectral characteristic thereof changes, but the optical path thereof makes no significant change. Thus, FIGS. 25 to 28 give illustration in disregard of a change in the spectral characteristic caused by the filter group 1884.

Figure 28:
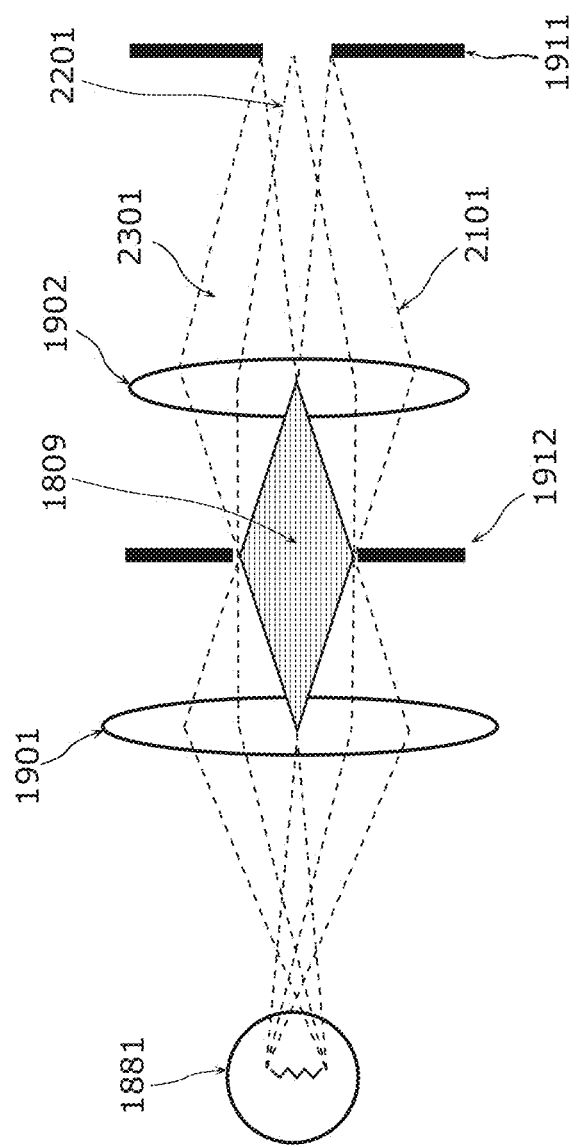
FIG. 28 illustrates an overlap region of bundles of rays which reach the first to third points in an imaging area of the subject, in Embodiment 2.

As illustrated in FIG. 28, the bundles of rays 2101, 2201, and 2301 overlap at and in the vicinity of the aperture stop 1912. Bundles of illumination rays which reach given points, other than the three points mentioned here, in the imaging area of the subject 1800 have the overlap region 1809 of the bundles of illumination rays at and in the vicinity of the aperture stop 1912.

All the bundles of rays from the light source 1881 that illuminate the points in the imaging area of the subject 1800 can be given the influence of the filter group 1884, by disposing the filter group 1884 in the overlap region 1809 of bundles of illumination rays which reach points in the imaging area of the subject 1800 in the above manner.

Figure 29:
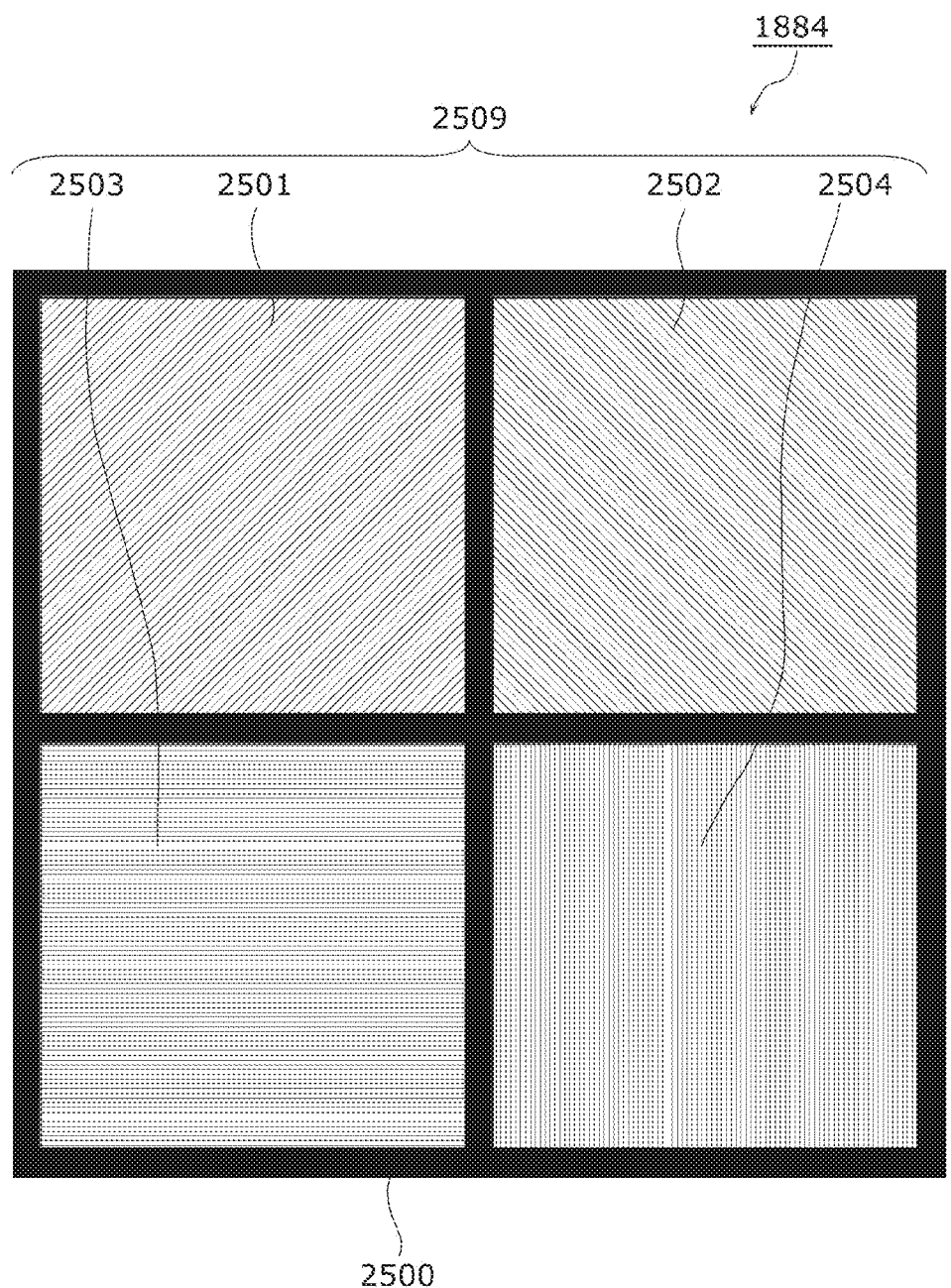
FIG. 29 is a schematic diagram of a filter group in Embodiment 2.

FIG. 29 illustrates an example of a configuration of the filter group 1884.

In this example, the filter group 1884 has four filters 2509 having different transmission properties (specifically, a first filter 2501, a second filter 2502, a third filter 2503, and a fourth filter 2504) in a frame 2500 which blocks light. In the present embodiment, the first filter 2501, the second filter 2502, the third filter 2503, and the fourth filter 2504 are arranged on the same plane.

For example, the following can be used as the transmission properties of the filters.

The first filter 2501 transmits light having a wavelength of 440 to 450 nm, and blocks light having other wavelengths. The second filter 2502 transmits light having a wavelength of 490 to 500 nm, and blocks light having other wavelengths. The third filter 2503 transmits light having a wavelength of 590 to 600 nm, and blocks light having other wavelengths. The fourth filter 2504 transmits light having a wavelength of 690 to 700 nm, and blocks light having other wavelengths.

Bundles of rays which have passed through the filter group 1884 are converted into bundles of rays having spectral characteristics corresponding to the transmission properties of the filters through which the bundles of rays have passed.

In other words, the light which has passed through the first filter 2501 has the first spectral characteristic that indicates a distribution of components only in a wavelength range of 440 to 450 nm. In addition, the light which has passed through the second filter 2502 has a second spectral characteristic that indicates a distribution of components only in a wavelength range of 490 to 500 nm. In addition, the light which has passed through the third filter 2503 has a third spectral characteristic that indicates a distribution of components only in a wavelength range of 590 to 600 nm. In addition, the light which has passed through the fourth filter 2504 has a fourth spectral characteristic that indicates a distribution of components only in a wavelength range of 690 to 700 nm.

The numerical aperture of the imaging optical system 1890 varies the overlap region 1809 of bundles of illumination rays, which is as described in Embodiment 1. Thus, the filters 2509 are preferably disposed such that boundaries extend radiately about an intersection of the medial axis of bundles of illumination rays and the filter group 1884, as described in Embodiment 1.

Figure 30:
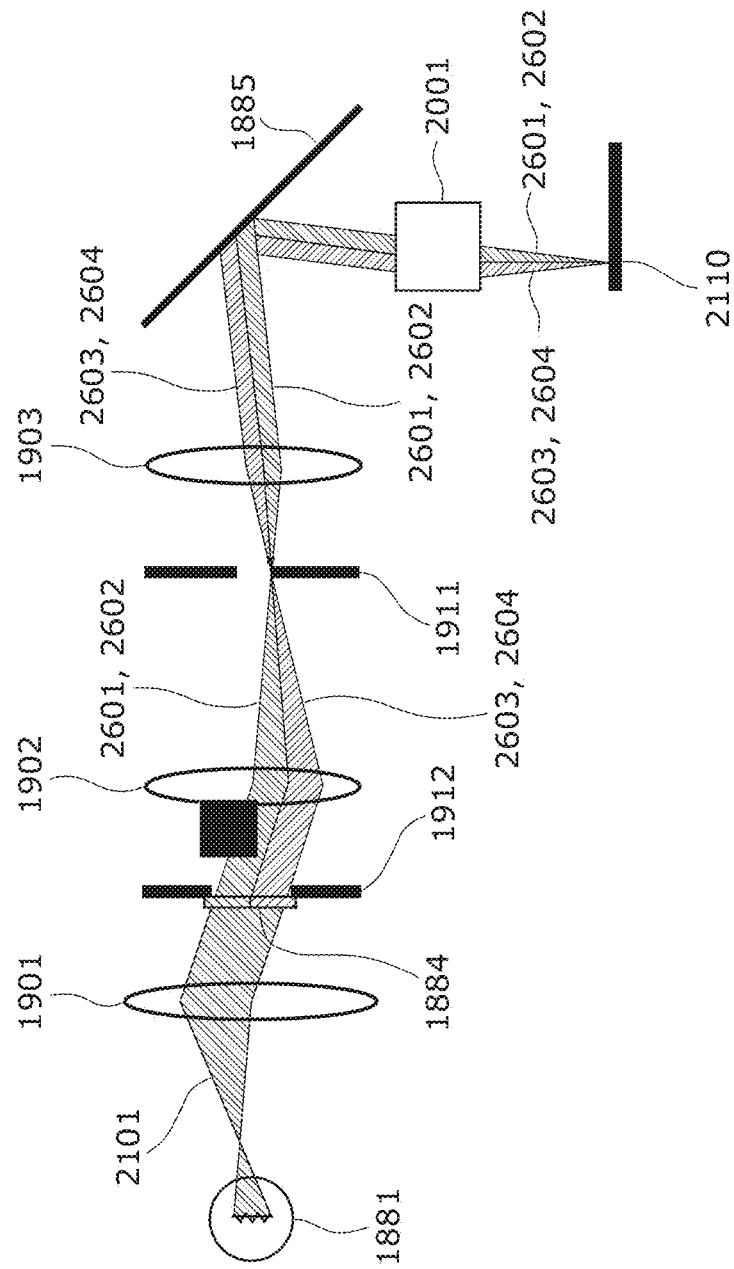
FIG. 30 illustrates optical paths of bundles of rays which have passed through the first to fourth filters and are condensed at the first point within the subject, in Embodiment 2.
Figure 31:
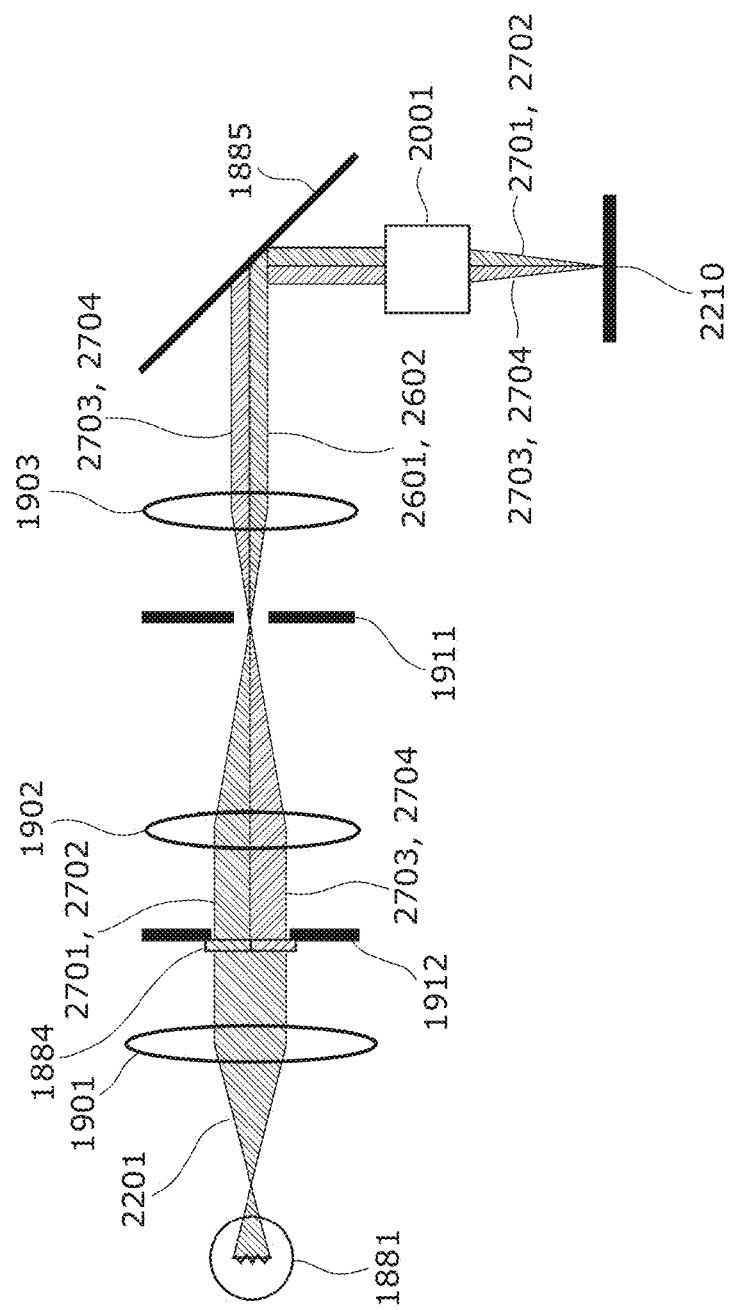
FIG. 31 illustrates optical paths of bundles of rays which have passed through the first to fourth filters and are condensed at the second point within the subject, in Embodiment 2.
Figure 32:
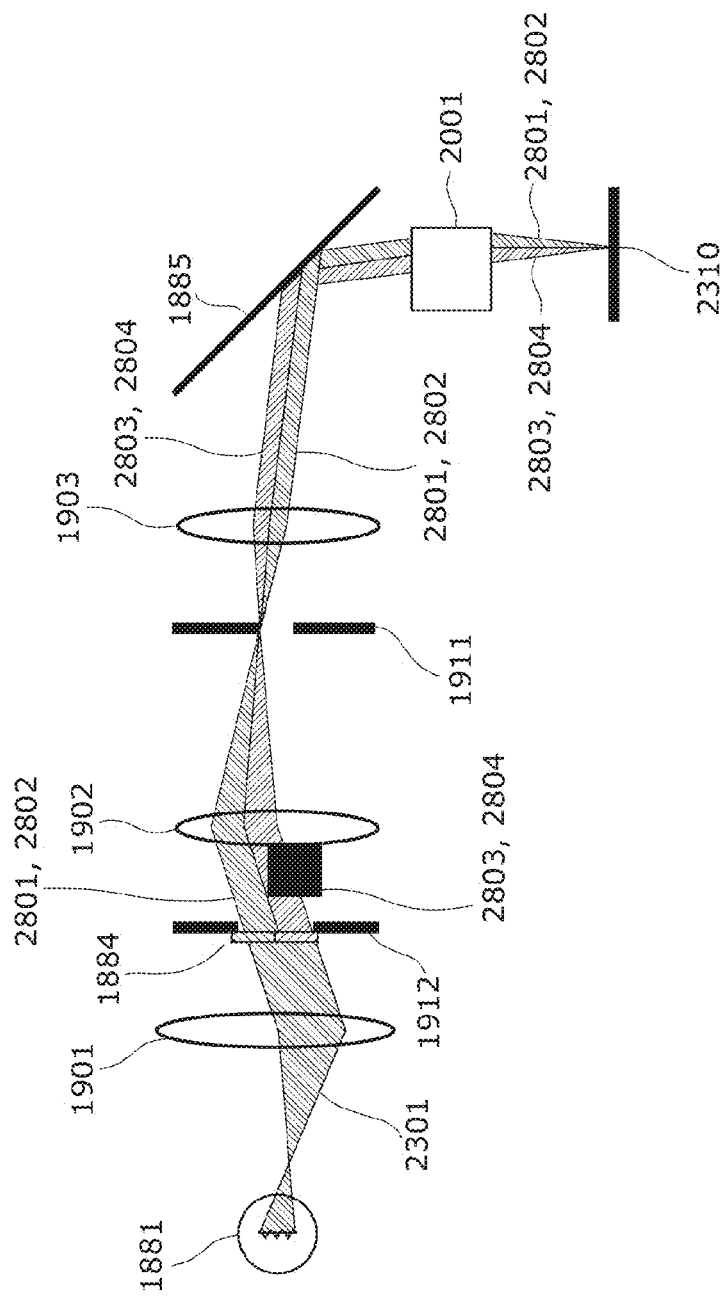
FIG. 32 illustrates optical paths of bundles of rays which have passed through the first to fourth filters and are condensed at the third point within the subject, in Embodiment 2.

FIGS. 30 to 32 illustrate optical paths of the bundles of rays 2101, 2201, and 2301 that pass through the filters 2509 and are condensed at points within the subject 1800. It should be noted that in FIGS. 30 to 32, the first filter 2501 and the second filter 2502 overlap in the depth direction, and the third filter 2503 and the fourth filter 2504 overlap in the depth direction. Thus, the filters cannot be separately illustrated.

A bundle of rays 2601 is a portion of the bundle of rays 2101 which has passed through the first filter 2501 in the filter group 1884. Accordingly, the bundle of rays 2601 has the first spectral characteristic. A bundle of rays 2602 is a portion of the bundle of rays 2101 which has passed through the second filter 2502 in the filter group 1884. Accordingly, the bundle of rays 2602 has the second spectral characteristic. A bundle of rays 2603 is a portion of the bundle of rays 2101 which has passed through the third filter 2503 in the filter group 1884. Accordingly, the bundle of rays 2603 has the third spectral characteristic. A bundle of rays 2604 is a portion of the bundle of rays 2101 which has passed through the fourth filter 2504 in the filter group 1884. Thus, the bundle of rays 2604 has the fourth spectral characteristic.

A bundle of rays 2701 is a portion of the bundle of rays 2201 which has passed through the first filter 2501 in the filter group 1884. Accordingly, the bundle of rays 2701 has the first spectral characteristic. A bundle of rays 2702 is a portion of the bundle of rays 2201 which has passed through the second filter 2502 in the filter group 1884. Accordingly, the bundle of rays 2702 has the second spectral characteristic. A bundle of rays 2703 is a portion of the bundle of rays 2201 which has passed through the third filter 2503 in the filter group 1884. Accordingly, the bundle of rays 2703 has the third spectral characteristic. A bundle of rays 2704 is a portion of the bundle of rays 2201 which has passed through the fourth filter 2504 in the filter group 1884. Accordingly, the bundle of rays 2704 has the fourth spectral characteristic.

A bundle of rays 2801 is a portion of the bundle of rays 2301 which has passed through the first filter 2501 in the filter group 1884. Accordingly, the bundle of rays 2801 has the first spectral characteristic. A bundle of rays 2802 is a portion of the bundle of rays 2301 which has passed through the second filter 2502 in the filter group 1884. Accordingly, the bundle of rays 2802 has the second spectral characteristic. A bundle of rays 2803 is a portion of the bundle of rays 2301 which has passed through the third filter 2503 in the filter group 1884. Accordingly, the bundle of rays 2803 has the third spectral characteristic. A bundle of rays 2804 is a portion of the bundle of rays 2301 which has passed through the fourth filter 2504 in the filter group 1884. Accordingly, the bundle of rays 2804 has the fourth spectral characteristic.

The bundles of rays 2601 to 2604 are condensed by the operation of the objective lens 2001 at the first point 2110 within the subject 1800. It should be noted that the bundle of rays 2601 has the first spectral characteristic, the bundle of rays 2602 has the second spectral characteristic, the bundle of rays 2603 has the third spectral characteristic, and the bundle of rays 2604 has the fourth spectral characteristic. In other words, light having four types of spectral characteristics simultaneously illuminate the first point 2110 within the subject 1800.

The bundles of rays 2701 to 2704 are condensed by the operation of the objective lens 2001 at the second point 2210 within the subject 1800. It should be noted that the bundle of rays 2701 has the first spectral characteristic, the bundle of rays 2702 has the second spectral characteristic, the bundle of rays 2703 has the third spectral characteristic, and the bundle of rays 2704 has the fourth spectral characteristic. Specifically, light having four types of spectral characteristics simultaneously illuminate the second point 2210 within the subject 1800.

The bundles of rays 2801 to 2804 are condensed by the operation of the objective lens 2001 at the third point 2310 within the subject 1800. It should be noted that the bundle of rays 2801 has the first spectral characteristic, the bundle of rays 2802 has the second spectral characteristic, the bundle of rays 2803 has the third spectral characteristic, and the bundle of rays 2804 has the fourth spectral characteristic. Specifically, light having four types of spectral characteristics simultaneously illuminate the third point 2310 within the subject 1800.

It should be noted that although here, a description is given of bundles of rays which illuminate three points within the subject 1800, it is needless to say that plural bundles of rays having different spectral characteristics corresponding in number to the filters 2509 simultaneously illuminate given points in an illumination area.

Unscattered light included in the light which illuminates the subject 1800 is reflected in a direction that satisfies specular conditions. At this time, the light is reflected in proportion influenced by a reflection property of the subject 1800 for an illumination-light spectrum.

Figure 33:
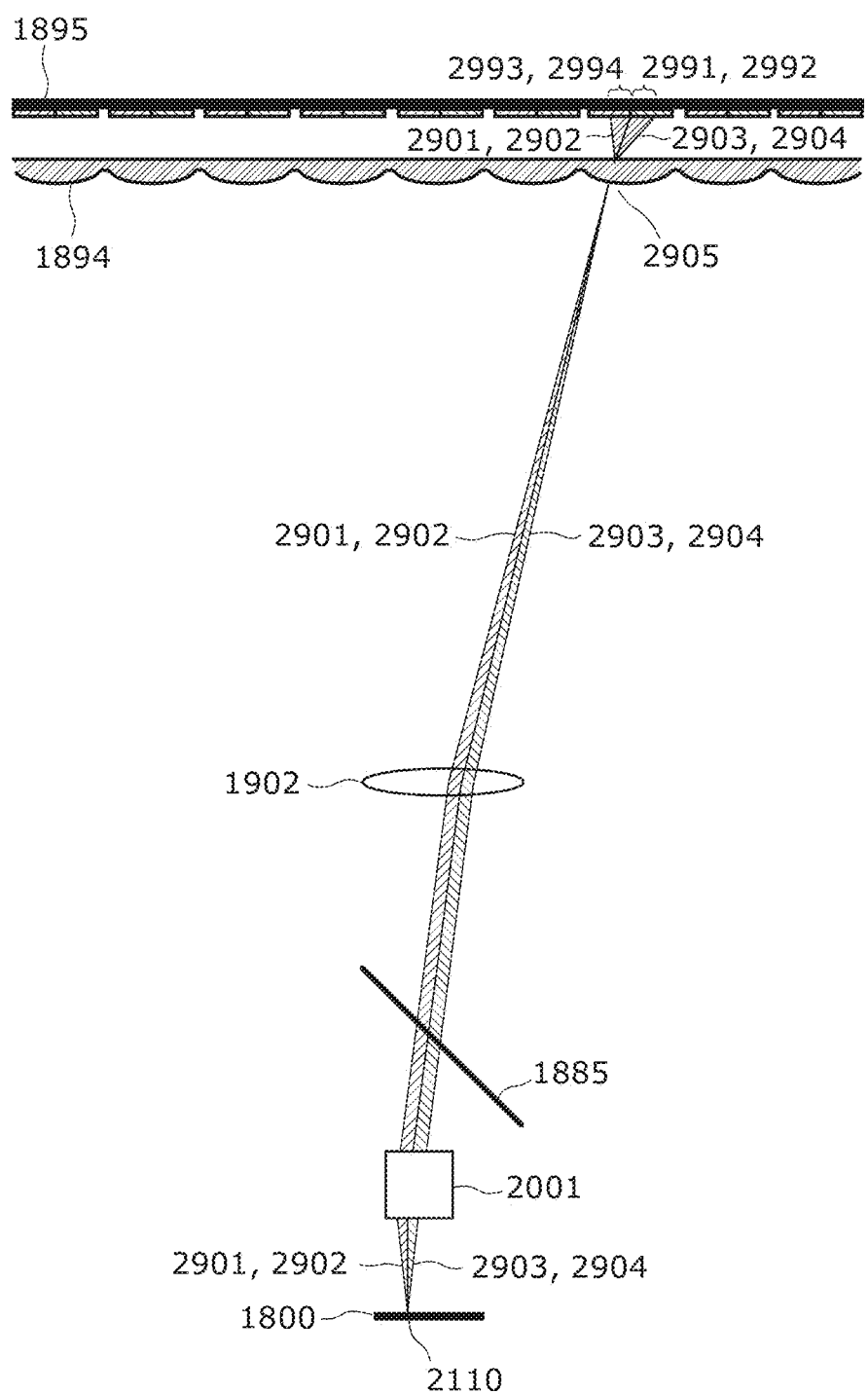
FIG. 33 illustrates optical paths of bundles of rays reflected at the first point within the subject in Embodiment 2.
Figure 34:
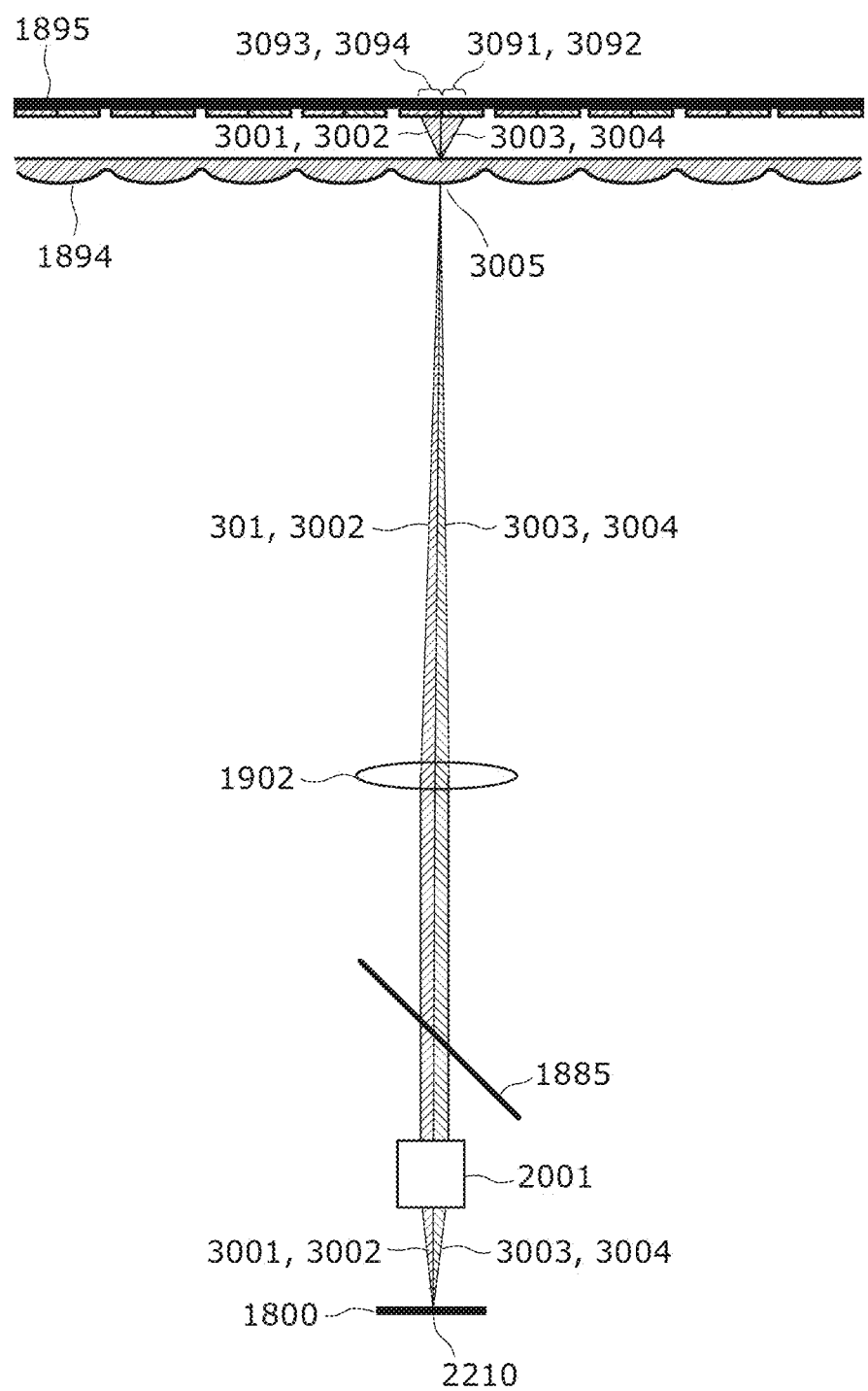
FIG. 34 illustrates optical paths of bundles of rays reflected at the second point within the subject in Embodiment 2.
Figure 35:
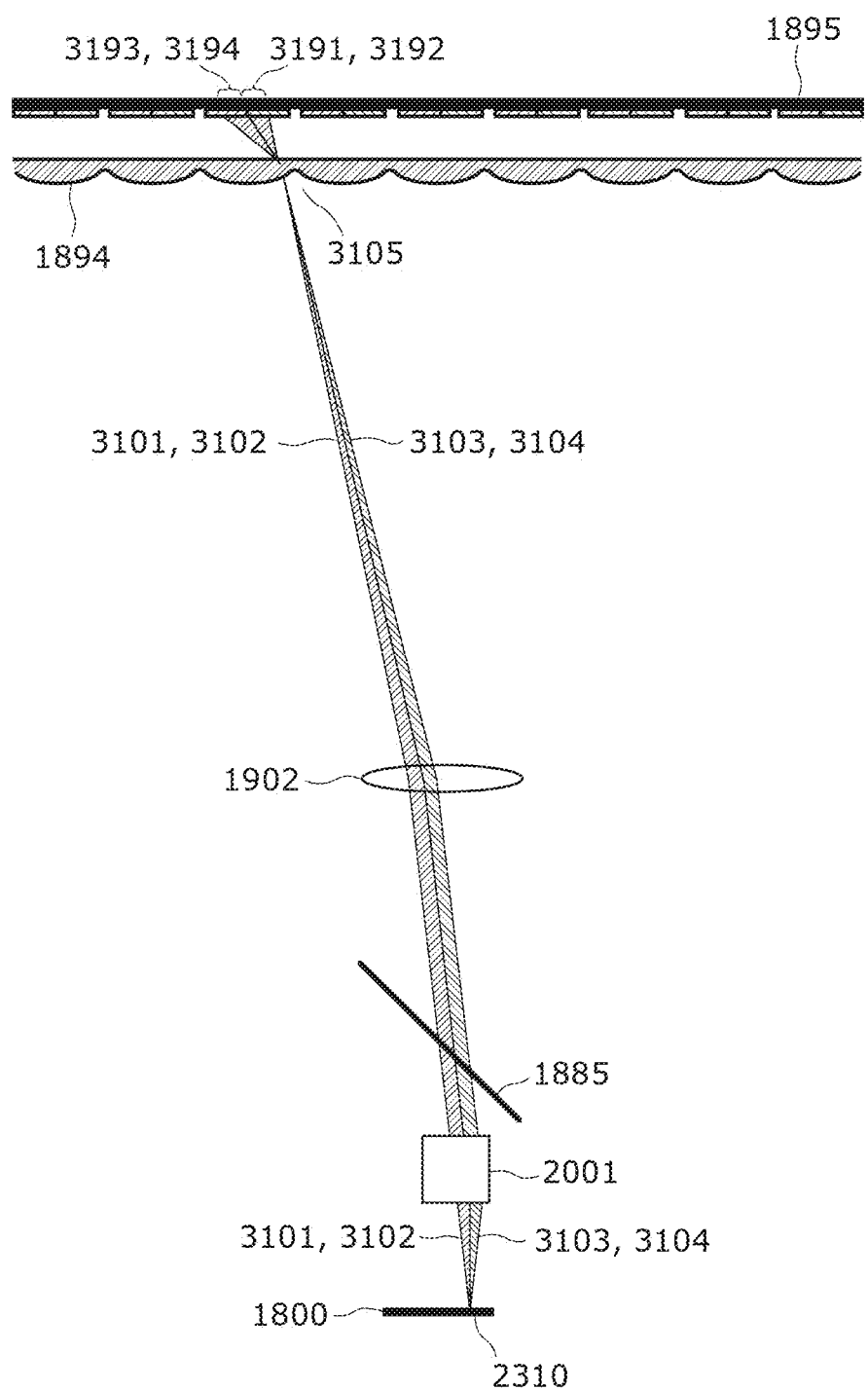
FIG. 35 illustrates optical paths of bundles of rays reflected at the third point within the subject in Embodiment 2.

FIGS. 33 to 35 illustrate paths of reflected light.

A bundle of rays 2901 is the bundle of rays 2601 reflected at the first point 2110 on the subject 1800 in the specular direction. A bundle of rays 2902 is the bundle of rays 2602 reflected at the first point 2110 on the subject 1800 in the specular direction. A bundle of rays 2903 is the bundle of rays 2603 reflected at the first point 2110 on the subject 1800 in the specular direction. A bundle of rays 2904 is the bundle of rays 2604 reflected at the first point 2110 on the subject 1800 in the specular direction. A bundle of rays 3001 is the bundle of rays 2701 reflected at the second point 2210 on the subject 1800 in the specular direction. A bundle of rays 3002 is the bundle of rays 2702 reflected at the second point 2210 on the subject 1800 in the specular direction. A bundle of rays 3003 is the bundle of rays 2703 reflected at the second point 2210 on the subject 1800 in the specular direction. A bundle of rays 3004 is the bundle of rays 2704 reflected at the second point 2210 on the subject 1800 in the specular direction.

A bundle of rays 3101 is the bundle of rays 2801 reflected at the third point 2310 on the subject 1800 in the specular direction. A bundle of rays 3102 is the bundle of rays 2802 reflected at the third point 2310 on the subject 1800 in the specular direction. A bundle of rays 3103 is the bundle of rays 2803 reflected at the third point 2310 on the subject 1800 in the specular direction. A bundle of rays 3104 is the bundle of rays 2804 reflected at the third point 2310 on the subject 1800 in the specular direction.

The bundles of rays 2901 to 2904, 3001 to 3004, and 3101 to 3104 pass through the objective lens 2001 again and are collimated, and then travel to the half mirror 1885. The half mirror 1885 partially reflects the bundles of rays traveling from the objective lens 2001, and transmits the rest of the rays so that those rays travel to the imaging lens 2002. These rays in the bundles form a real image of the subject 1800 in the vicinity of the separation optical element 1894 due to image formation operation of the imaging lens 2002.

This real image is enlarged at a magnification depending on the optical property of the lens group 1892. For example, if the focal length of the objective lens 2001 is 4 mm and the focal length of the imaging lens 2002 is 160 mm, a real image enlarged 40 times is formed.

Bundles of rays from the same point within the subject 1800 are condensed at the same point on a real image. For example, the bundles of rays 2901 to 2904 from the first point 2110 are condensed at a point 2905. Similarly, the bundles of rays 3001 to 3004 from the second point 2210 are condensed at a point 3005. Similarly, the bundles of rays 3101 to 3104 from the third point 2310 are condensed at a point 3105. In this way, points within the real image formed in the vicinity of the separation optical element 1894 correspond to different positions within the subject 1800.

The bundles of rays which form the real image pass through the separation optical element 1894, thus returning to the spreading bundles of rays again. Then, the two-dimensional light receiving element array 1895 is irradiated with the bundles of light. At this time, different areas of the two-dimensional light receiving element array 1895 are irradiated with the bundles of rays at points within the real image.

For example, an area 2991 in the two-dimensional light receiving element array 1895 is irradiated with the bundle of rays 2901. Similarly, an area 2992 in the two-dimensional light receiving element array 1895 is irradiated with the bundle of rays 2902. Similarly, an area 2993 in the two-dimensional light receiving element array 1895 is irradiated with the bundle of rays 2903. Similarly, an area 2994 in the two-dimensional light receiving element array 1895 is irradiated with the bundle of rays 2904.

For example, an area 3091 in the two-dimensional light receiving element array 1895 is irradiated with the bundle of rays 3001. Similarly, an area 3092 in the two-dimensional light receiving element array 1895 is irradiated with the bundle of rays 3002. Similarly, an area 3093 in the two-dimensional light receiving element array 1895 is irradiated with the bundle of rays 3003. Similarly, an area 3094 in the two-dimensional light receiving element array 1895 is irradiated with the bundle of rays 3004.

For example, an area 3191 in the two-dimensional light receiving element array 1895 is irradiated with the bundle of rays 3101. Similarly, an area 3192 in the two-dimensional light receiving element array 1895 is irradiated with the bundle of rays 3102. Similarly, an area 3193 in the two-dimensional light receiving element array 1895 is irradiated with the bundle of rays 3103. Similarly, an area 3194 in the two-dimensional light receiving element array 1895 is irradiated with the bundle of rays 3104.

The irradiation areas on the two-dimensional light receiving element array 1895 irradiated with bundles of rays which have passed through points within a real image depend on optical properties, physical sizes, and a relative positional relationship of the illumination optical system 1880 and the imaging optical system 1890.

Bundles of rays which have passed through two sufficiently near points within a real image have overlapping irradiation areas on the two-dimensional light receiving element array 1895. In contrast, bundles of rays which have passed through two sufficiently distant points within a real image do not have overlapping irradiation areas on the two-dimensional light receiving element array 1895.

Different light receiving pixels 3411 in the two-dimensional light receiving element array 1895 are irradiated with bundles of rays which do not have overlapping irradiation areas on the two-dimensional light receiving element array 1895, and thus such bundles of rays can be distinguished. Thus, a multispectral imaging device can capture a multispectral image of the subject 1800 at a spatial resolution limited by the overlap of the irradiation areas.

How distant two points need to be within a real image so as not to have an overlap depends on optical properties, physical sizes, and a relative positional relationship of the illumination optical system 1880 and the imaging optical system 1890.

Figure 36:
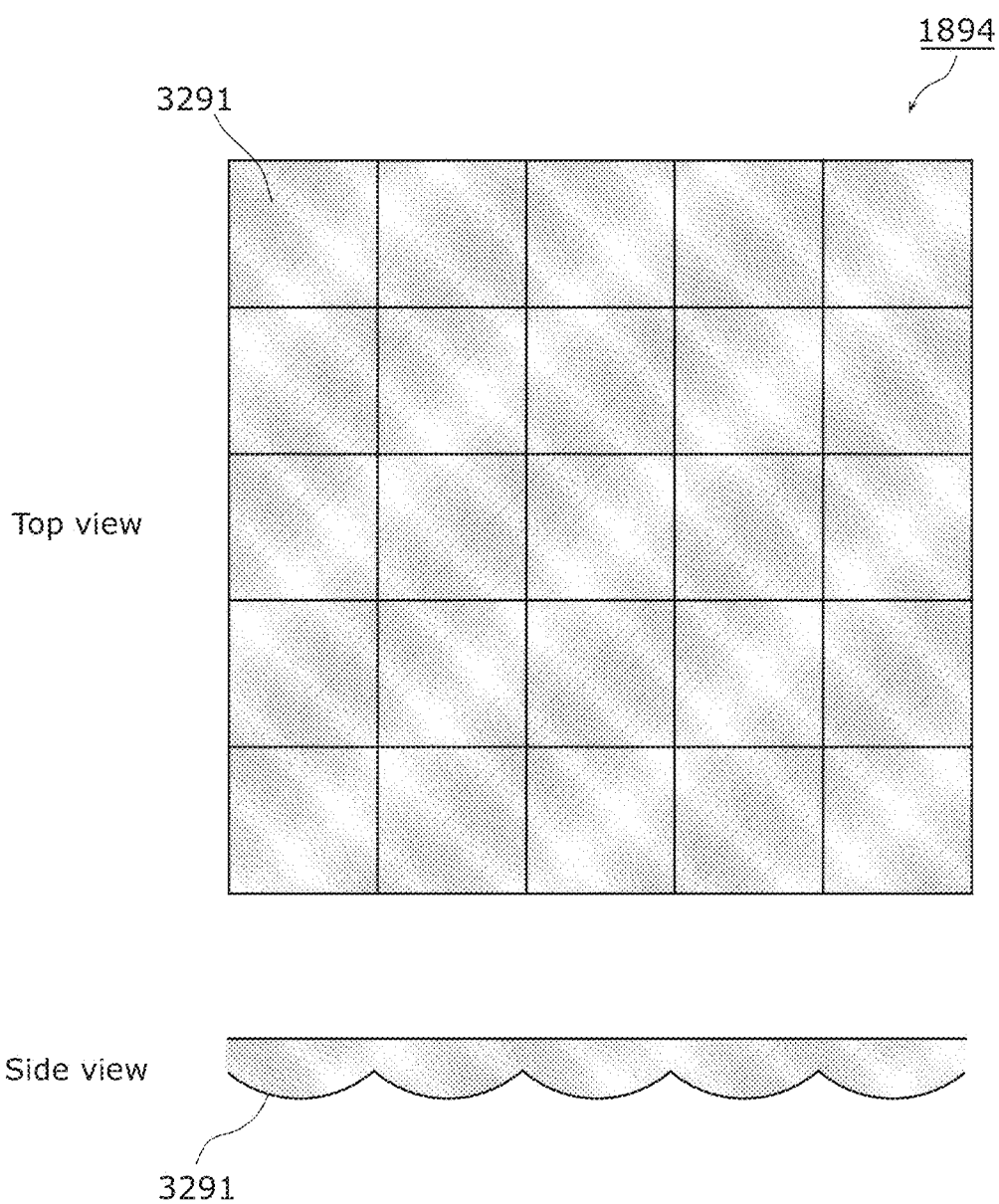
FIG. 36 illustrates an example of a separation optical element in Embodiment 2.

A description is given of the case where the separation optical element 1894 is a set of microlenses 3291, as illustrated in FIG. 36.

If the distance between the separation optical element 1894 and the two-dimensional light receiving element array 1895 is sufficiently shorter than the focal length of each lens included in the lens group 1892, the spatial resolution about the size of the microlenses 3291 can be obtained.

Figure 37:
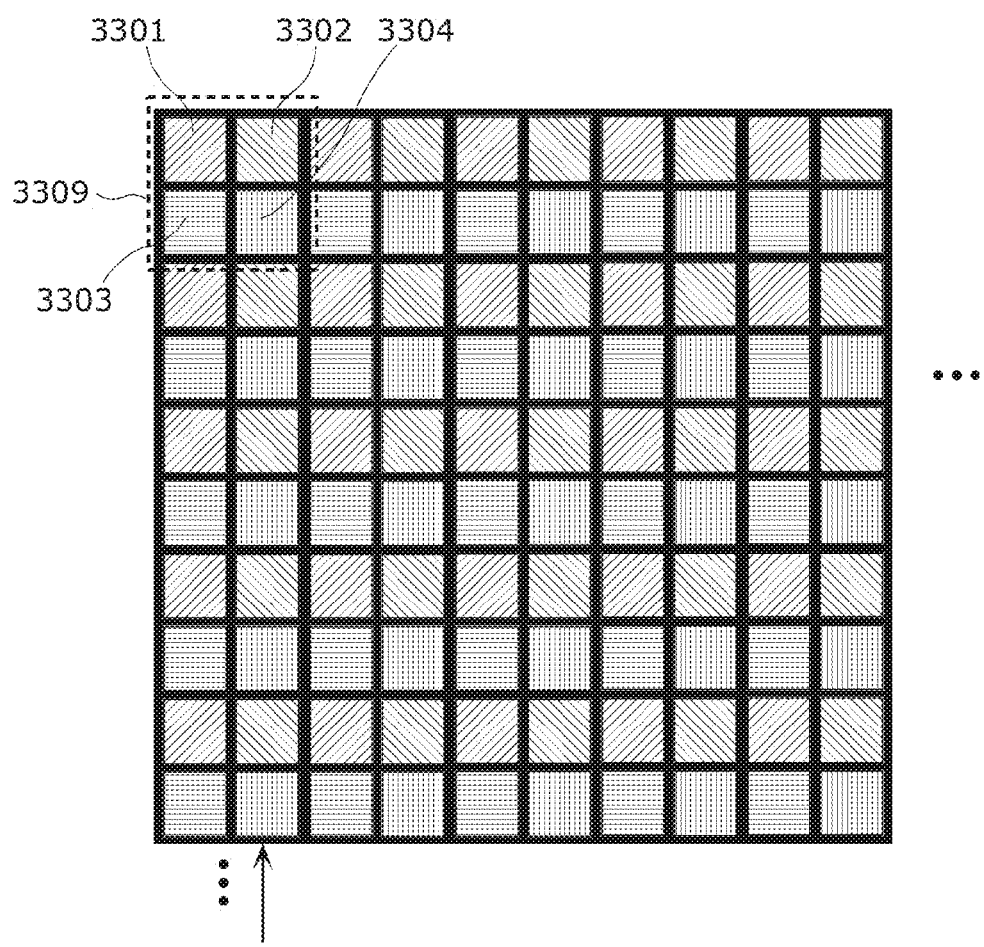
FIG. 37 illustrates a real image of a filter group projected on an imaging surface in Embodiment 2.

In addition, the lens group 1892 and the microlenses 3291 in the separation optical element 1894 form real images 3309 of the filter group 1884 on the two-dimensional light receiving element array 1895 (FIG. 37). The number of the real images 3309 is equal to the number of the microlenses 3291 in the separation optical element 1894.

A real image 3301 of the first filter, a real image 3302 of the second filter, a real image 3303 of the third filter, and a real image 3304 of the fourth filter are respectively formed by corresponding bundles of rays reflected off the subject 1800, which have passed through the first filter 2501, the second filter 2502, the third filter 2503, and the fourth filter 2504. Specifically, the real images 3301, 3302, 3303, and 3304 are respectively obtained by illuminating the subject 1800 with light having the first spectral characteristic, the second spectral characteristic, the third spectral characteristic, and the fourth spectral characteristic.

Figure 38:
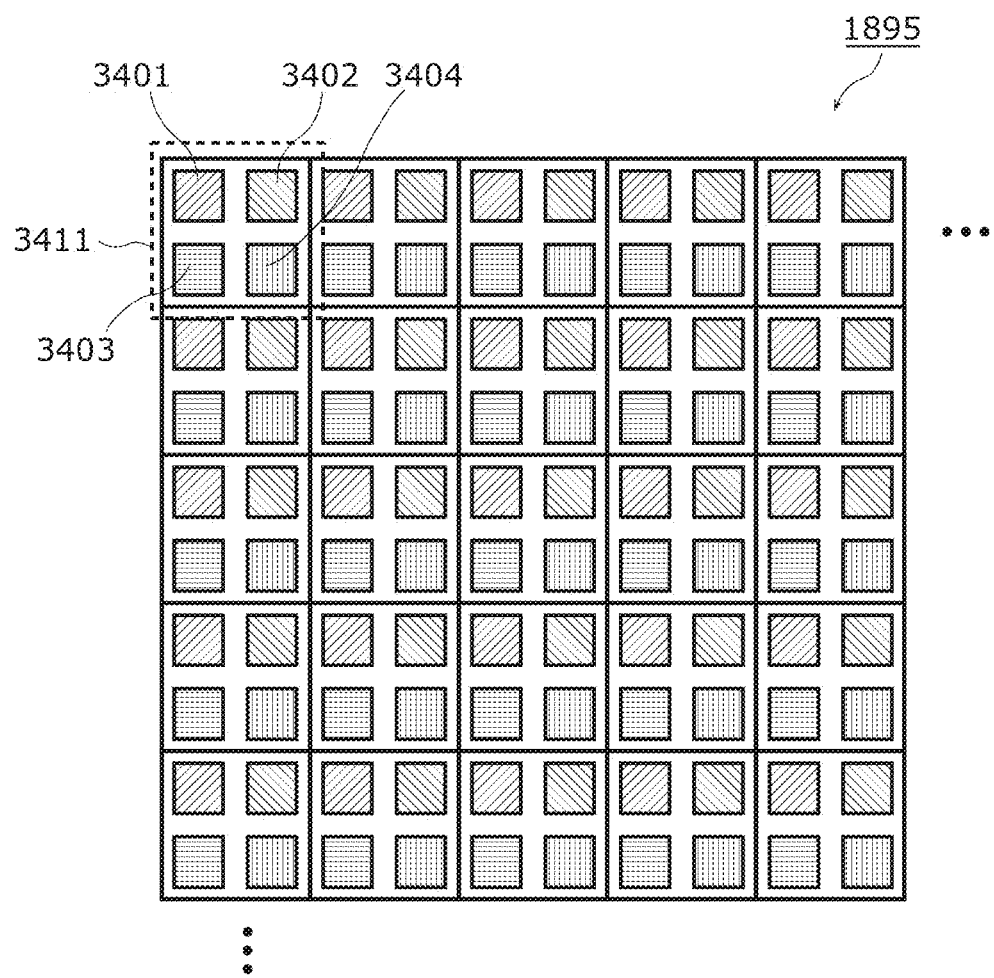
FIG. 38 is a schematic diagram of a two-dimensional light receiving element array in Embodiment 2.

In addition, as illustrated in FIG. 38, first to fourth different light receiving elements 3401 to 3404 are disposed at the positions of the real images 3301, 3302, 3303, and 3304, thus allowing the microlenses 3291 to guide bundles of rays which have passed through different filters to different light receiving elements.

If only information on light receiving elements out of the light receiving pixels 3411 corresponding to light having the same spectral characteristic is collected, an image of the subject 1800 captured using light having that spectral characteristic can be formed. Specifically, the multispectral imaging device can simultaneously capture a multispectral image which includes images of the subject 1800 equal in number to the filters 2509. Thus, according to the configuration of the present embodiment, a reflective illumination microscope optical system can achieve multispectral imaging.

The optical path of a bundle of illumination rays does not depend on the transmission property of a filter also in the present embodiment as with Embodiment 1. Accordingly, by exchanging the filter group 1884 or the individual filters 2509 only, the multispectral imaging device can capture images of a subject using light having different spectral characteristics with ease.

Figure 39:
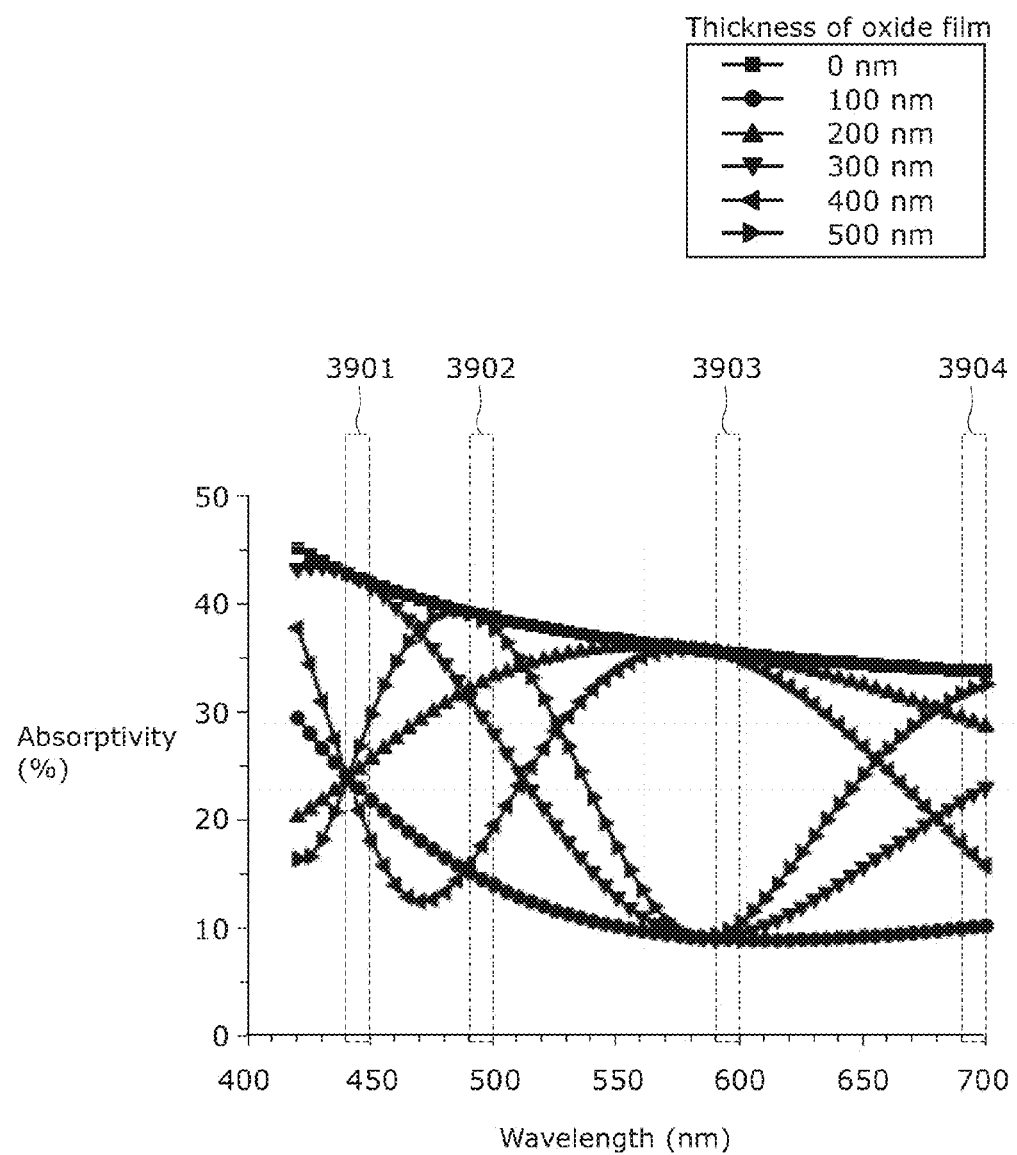
FIG. 39 is a graph showing a reflection spectrum of a silicon substrate having an oxide film.

The results of multispectral imaging according to the present embodiment can be used for determination of a thickness of a thin film on a sample, for example. As an example, FIG. 39 illustrates silicon oxide film thickness dependency of a reflectance of a silicon substrate having a silicon oxide thin film. Reflectance has different wavelength dependency upon a thickness of a thin film, due to cross protection.

In the case of the first spectral characteristic (wavelength range of 440 to 450 nm) used as an example in the present embodiment, reflectance of a sample with an oxide film having a thickness of 0 nm and reflectance of a sample with an oxide film having a thickness of 300 nm are similar. In addition, reflectance of a sample with an oxide film having a thickness of 100 nm and reflectance of a sample with an oxide film having a thickness of 200 nm are similar. Furthermore, reflectance of a sample with an oxide film having a thickness of 400 nm and reflectance of a sample with an oxide film having a thickness of 500 nm are similar. Thus, such samples or regions with oxide films having similar thicknesses cannot be distinguished by imaging using only light having the first spectral characteristic.

However, as is clear from FIG. 35, the six types of samples do not include a sample with an oxide film which has similar reflectance in all the cases of a first spectral characteristic 3901 (440 to 450 nm), a second spectral characteristic 3902 (490 to 500 nm), a third spectral characteristic 3903 (590 to 600 nm), and a fourth spectral characteristics 3904 (690 to 700 nm). In this way, imaging using light having plural spectral characteristics allows samples or regions with thin films having different thicknesses to be distinguished. It should be noted that the intensities of each pixel in images captured using light having the spectra reflect the relative reflectance of the subject. However, the intensities in different spectral images cannot be compared as they are, due to differences in radiant intensities over spectra of the light source 1881 and transmittance of the filters 2509.

However, by making a comparison with a result of imaging, with each of spectral characteristics, a substance whose reflectance is known (such as a silicon substrate and a gold mirror, for example), a result of imaging with each spectrum can be converted into absolute reflectance. After converting into absolute reflectance, comparisons between spectra can be made. A probable film thickness can also be estimated by comparing such a multispectral image converted into absolute reflectance and a theoretical multispectral image when a film has a given thickness calculated by an optical simulator. It should be noted that reflectance of a substance having known reflectance may be measured when capturing a multispectral image of each subject, or measurement results may be stored in the optical simulator, and imaging results may be converted into absolute reflectance using the measurement results.

In this manner, the thickness of an oxide film can be estimated by disposing, in an illumination optical system, a filter group which includes the first filter that transmits light having the first wavelength at which a film thickness and a reflection spectrum show first dependency, and the second filter that transmits light having the second wavelength at which a film thickness and a reflection spectrum show second dependency.

When such an effect is obtained is not only the case of spectral characteristics and film thicknesses described in the above examples. A combination of spectral characteristics which allows identification to be performed with ease differs depending on the types of substrates and thin films, the range of film thickness, and others. Thus, if objects to be identified are limited, the filter 2509 having a transmission property corresponding to spectral characteristics suitable for identification may be used. In addition, in the present embodiment, mere exchange of the filter group 1884 allows imaging using light having different spectral characteristics. Thus, the filter group may be exchanged as appropriate for each object to be identified, to a filter group having a transmission property suitable for the object.

It should be noted that an optical simulator performs processing for calculating reflectance at each wavelength, based on the thickness of a substrate, complex indices of refraction of the substrate at wavelengths, the thicknesses of thin films, complex indices of refraction of the thin films at wavelengths, complex indices of refraction at wavelengths in the atmosphere, and light incident angles. Software for performing such optical simulations is commercially sold.

Embodiment 3

In Embodiment 3, using the reflective illumination multispectral imaging device according to Embodiment 2, a thin film sample (subject) is imaged to determine the thickness of a thin film or detect defects such as foreign matter and wrinkling (overlap).

The wavelength dependency of reflectance of a thin film sample changes due to cross protection, depending on the thickness of a thin film, the presence of foreign matter, and the presence of a defect such as wrinkling. Consequently, an image of a thin film sample can be obtained which is given contrast due to a change in the thickness of a thin film, the presence of foreign matter, and the presence of a defect such as wrinkling, by imaging the thin film sample illuminated with light which includes components in a wavelength range where reflectance changes due to a change in the thickness of a thin film, the presence of foreign matter, and the presence of a defect such as wrinkling. Conversely, an image of a thin film sample can be obtained which is not given contrast due to a change in the thickness of a thin film, the presence of foreign matter, and the presence of a defect such as wrinkling, by imaging the thin film sample illuminated with light in a wavelength range where reflectance does not change due to a change in the thickness of a thin film, the presence of foreign matter, and the presence of a defect such as wrinkling.

In addition, if the wavelength range of illumination light is selected appropriately, it is possible to obtain an image which is given contrast due to a change in the thickness of a thin film and the presence of a defect such as wrinkling, but is not given contrast due to the presence of foreign matter. Imaging using light in such a wavelength range is useful to detect a difference in the thickness of a thin film and a defect such as wrinkling.

Conversely, there may be a wavelength range where contrast is given due to the presence of foreign matter, but not given due to a change in the thickness of a thin film. Imaging using light in such a wavelength range is useful to detect foreign matter.

The wavelength range of light that causes or does no cause a difference in reflectance due to a change in the thickness of a thin film, the presence of foreign matter, and the presence of a defect such as wrinkling depends on the type of a substrate, the type and thickness of a thin film, the type and thickness of foreign matter, or the type of defects. In view of this, in the present embodiment, a filter having transmission property for exposing a subject to light in an appropriate wavelength range is attached to an imaging device according to a subject and the imaging purpose, thus obtaining an image suitable for the imaging purpose.

A wavelength range of illumination light is selected, for example, experimentally. For example, a subject is imaged using light in various wavelength ranges, and it is checked whether contrast occurs depending on the difference in the thickness of a thin film, the presence of foreign matter, and the presence of a defect such as wrinkling. The wavelength range is selected based on the check result, and a filter is selected which has a transmission property corresponding to the selected wavelength range.

Alternatively, the contrast in images obtained when imaging using light in wavelength ranges may be predicted by optical simulations.

Figure 40:
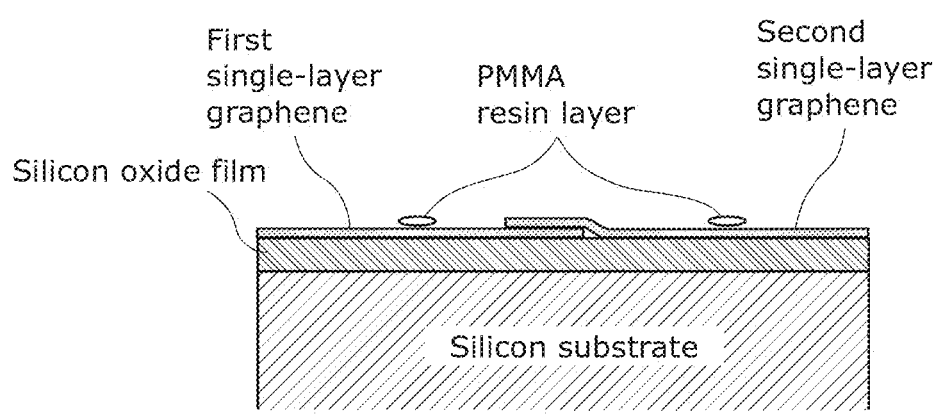
FIG. 40 is a schematic diagram illustrating a cross-sectional structure of a subject in Embodiment 3.

The following describes results of optical simulations (FIGS. 41A and 41B) on a thin film sample illustrated in FIG. 40, and examples of actually imaging a thin film sample using light in various wavelength ranges (FIGS. 42 to 46).

The subject (thin film sample) illustrated in FIG. 40 is obtained by transferring two sheets of single-layer graphene onto a silicon substrate on which a silicon oxide film having a thickness of 295 nm is formed. As illustrated in, for instance, FIG. 42, an imaging field of view includes a ground region (4000) not covered with graphene, a region (4001) where first single-layer graphene is transferred, a region (4002) where second single-layer graphene is transferred, and a region (4003) where the first single-layer graphene and the second single-layer graphene are layered. In both the region (4001) where the first single-layer graphene is transferred and the region (4002) where the second single-layer graphene is transferred, graphene has a thickness of about 0.35 nm, whereas in the region (4003) where the first single-layer graphene and the second single-layer graphene are layered, the layered graphene has a thickness of about 0.7 nm.

Figure 41A:
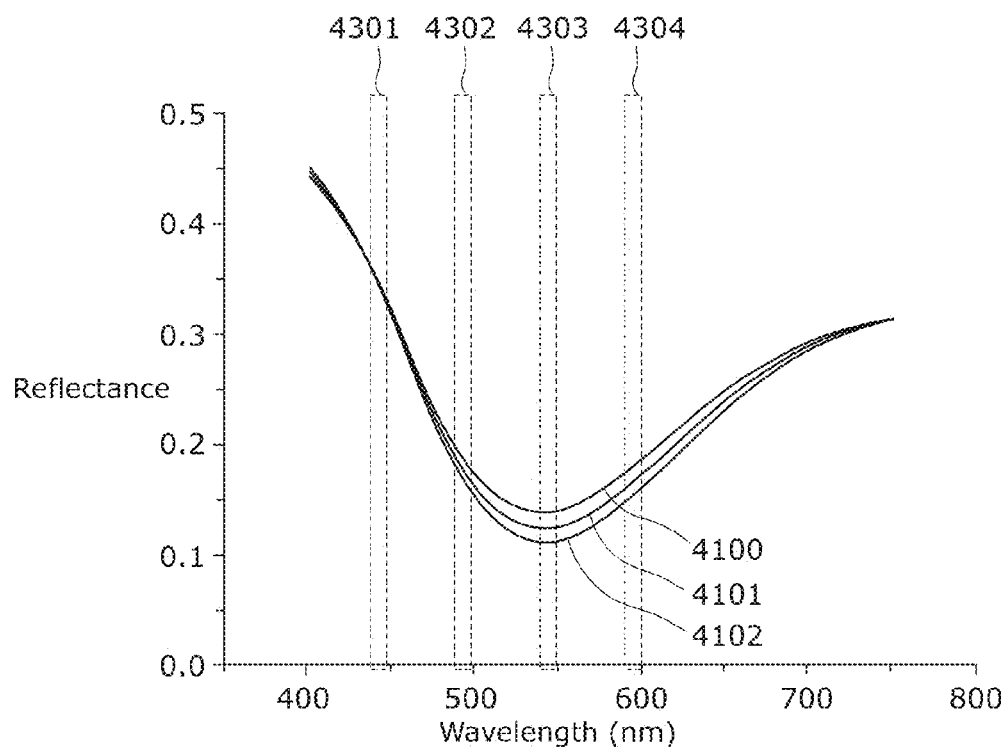
FIG. 41A is a graph showing reflectance obtained by optical simulations while changing the thickness of a graphene layer.

FIG. 41A shows the reflectance of a sample calculated by optical simulations, the sample being a silicon substrate with a silicon oxide film having a thickness of 295 nm, on which a graphene layer is provided. Simulations has been performed in the following cases, namely, the case where a graphene layer has a thickness of 0 nm (4100), which corresponds to the ground region (4000), the case where a graphene layer has a thickness of 0.35 nm, which corresponds to the region (4001) where the first single-layer graphene is transferred and the region (4002) where the second single-layer graphene is transferred (4101), and the case where a graphene layer has a thickness of 0.7 nm, which corresponds to the region (4003) where the first single-layer graphene and the second single-layer graphene are layered (4102). Simulations have been performed assuming that no foreign matter is present other than the substrate and graphene.

Figure 41B:
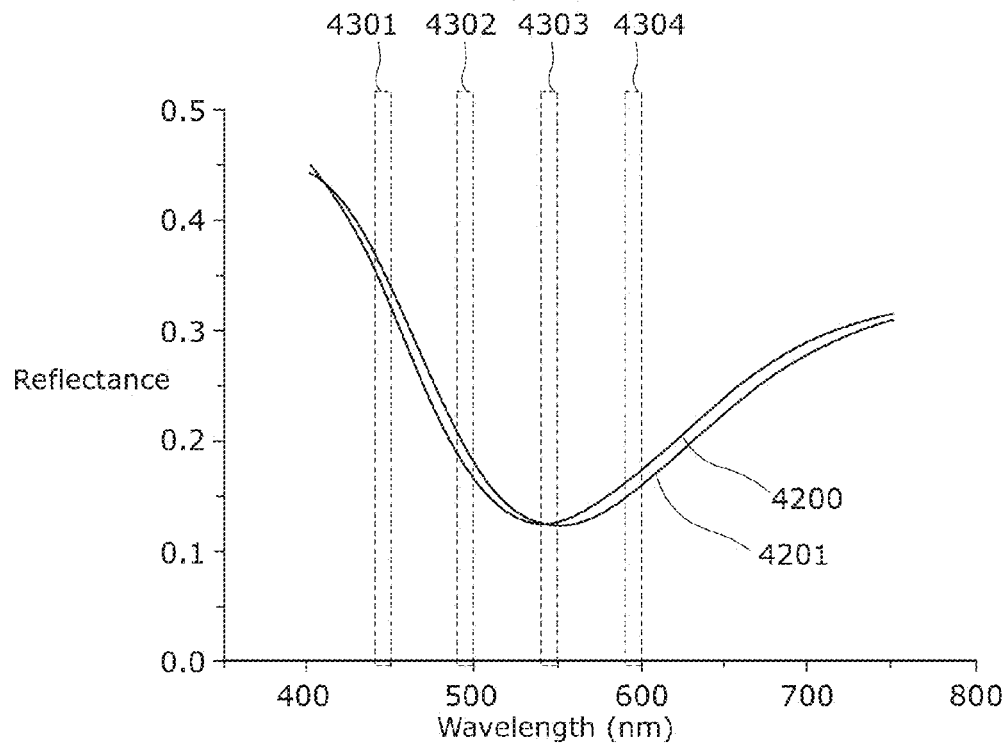
FIG. 41B is a graph showing reflectance obtained by optical simulations while changing the thickness of a polymethyl methacrylate (PMMA) resin layer.

FIG. 41B shows that reflectance of a sample is calculated by optical simulations, the sample being a silicon substrate with a silicon oxide film having a thickness of 295 nm, and including a graphene layer having a thickness of 0.35 nm thereon and furthermore a PMMA resin layer on the graphene layer. The simulations have been performed in the cases, namely, the case where the thickness of the PMMA resin layer is 0 nm (4200), and the case where the thickness of the PMMA resin layer is 5 nm (4201).

Figure 42:
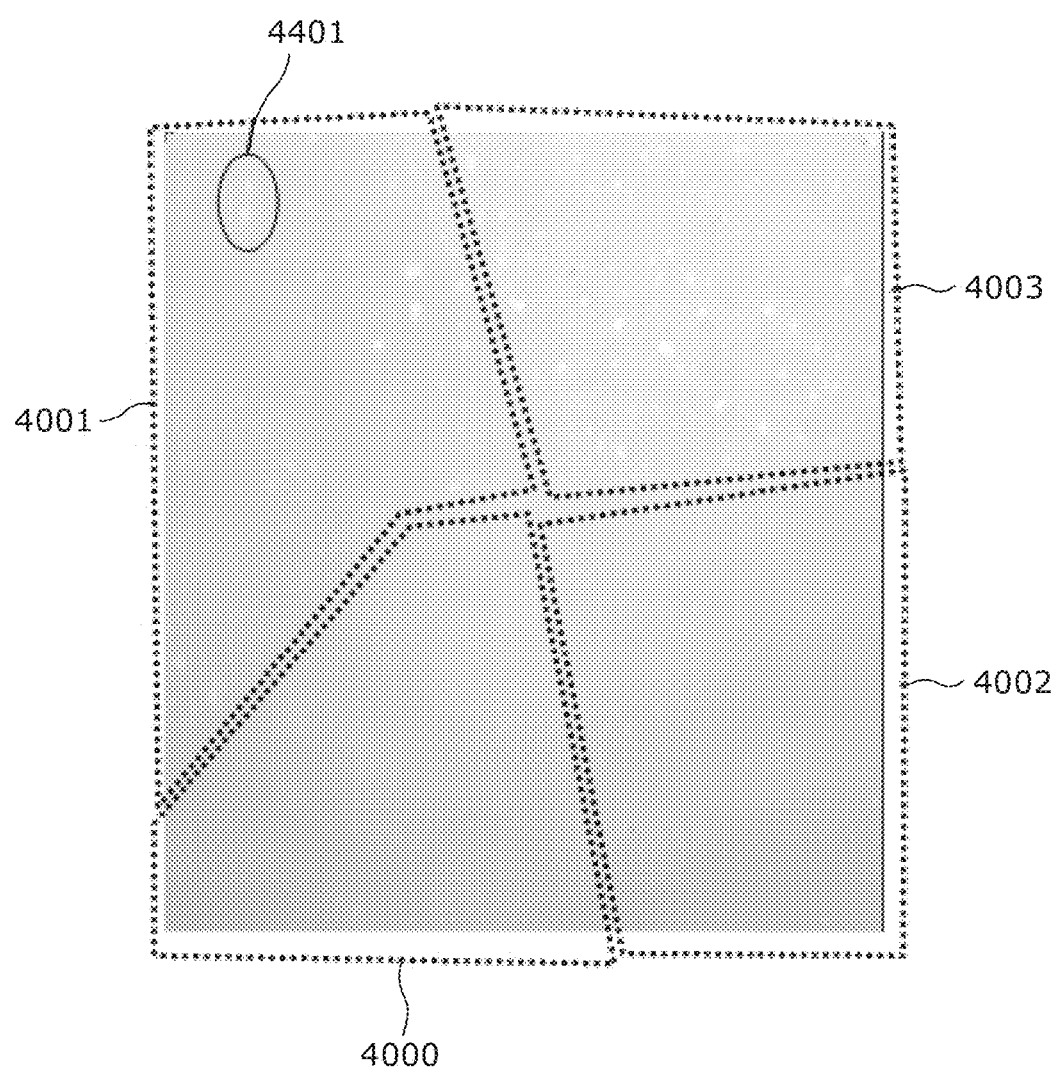
FIG. 42 illustrates an image captured using light having the first spectral characteristic.

As can be seen from FIGS. 41A and 41B, in the case of a first spectral characteristic (4301) that indicates a distribution of components in the wavelength range of 440 to 450 nm, reflectance does not depend on the thickness of the graphene layer, but depends on the thickness of the PMMA resin layer, and a portion where the PMMA resin layer is deposited has higher reflectance. FIG. 42 shows the result of actual imaging with this spectral characteristic.

There is no contrast difference between the ground region (4000) not covered with graphene, the region (4001) where the first single-layer graphene is transferred, the region (4002) where the second single-layer graphene is transferred, the region (4003) where the first single-layer graphene and the second single-layer graphene are layered.

However, as can be seen, fine foreign matter (4401) is imaged as a white region where reflectance is higher than the surrounding region.

Figure 43:
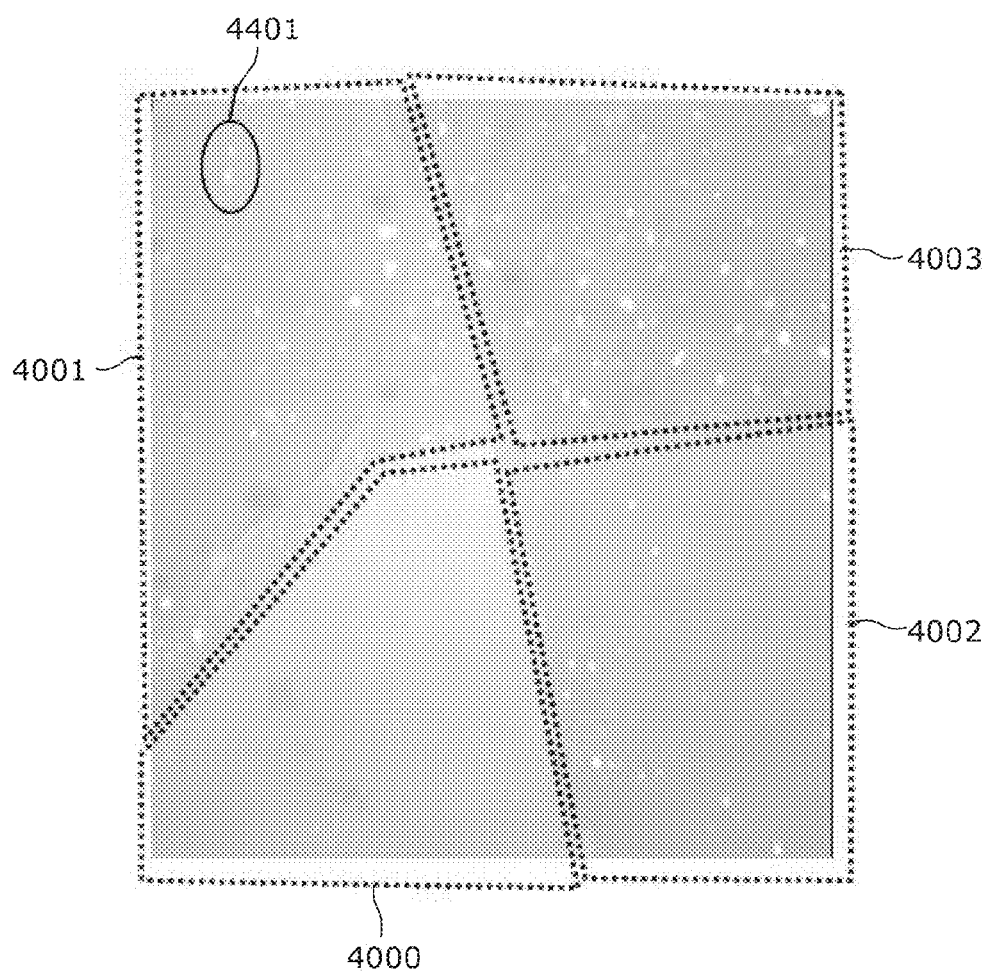
FIG. 43 illustrates an image captured using light having the second spectral characteristic.

As can be seen from FIGS. 41A and 41B, in the case of the second spectral characteristic (4302) that indicates a distribution of components in the wavelength range of 490 to 500 nm, reflectance depends on both the layer thickness of graphene and the thickness of the PMMA resin layer, and a portion where the PMMA resin layer is deposited has higher reflectance. FIG. 43 shows the result of actual imaging with this spectral characteristic.

In the imaging, the ground region (4000) shows the highest reflectance, the region (4001) where the first single-layer graphene is transferred and the region (4002) where the second single-layer graphene is transferred show the same middle reflectance, and the region (4003) where the first single-layer graphene and the second single-layer graphene are layered shows the lowest reflectance. In addition, the fine foreign matter (4401) is imaged as a white region having reflectance higher than the surrounding region in the image.

Figure 44:
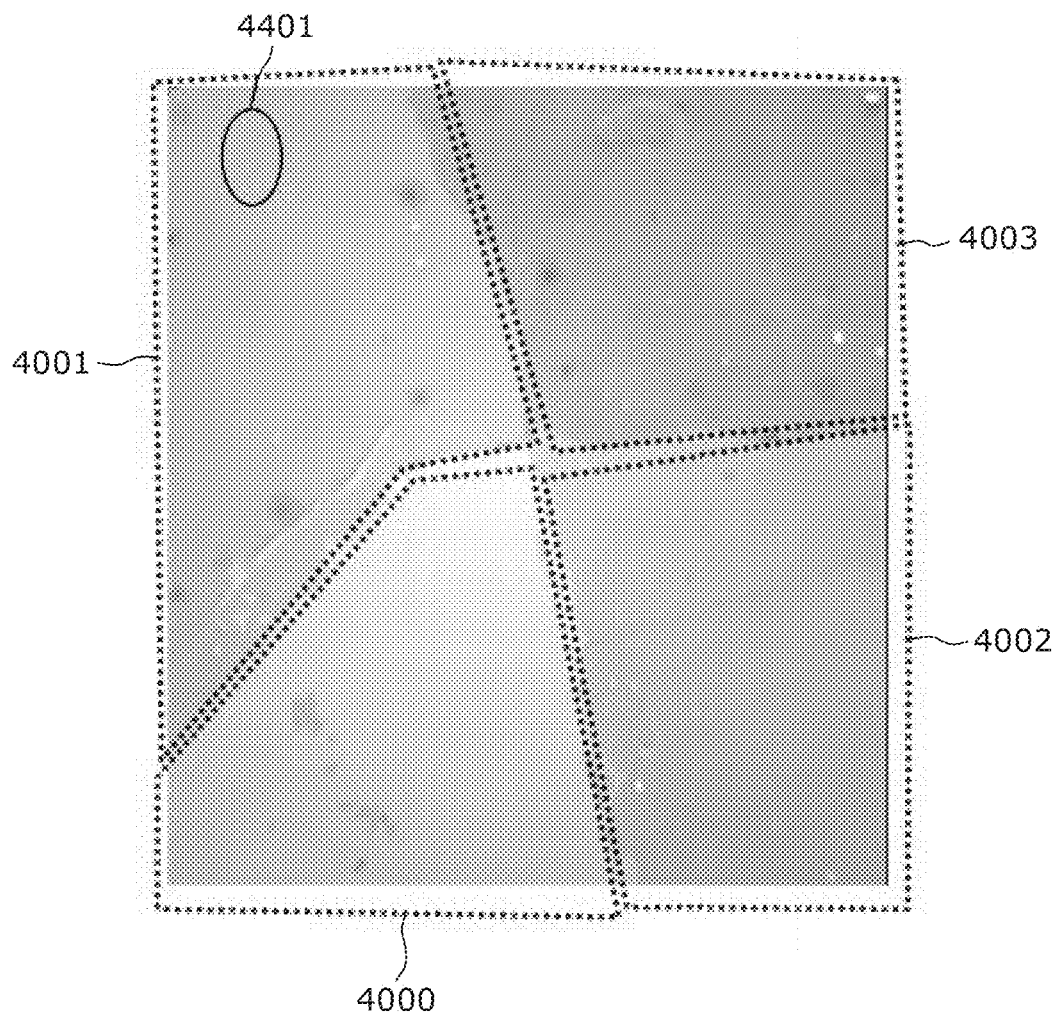
FIG. 44 illustrates an image captured using light having the third spectral characteristic.

As can be seen from FIGS. 41A and 41B, in the case of the third spectral characteristic (4303) that indicates a distribution of components in a wavelength range of 540 to 550 nm, reflectance depends on the layer thickness of graphene, but does not depend on the thickness of the PMMA resin layer. FIG. 44 shows the result of actual imaging with this spectral characteristic.

In the imaging, the ground region (4000) shows the highest reflectance, the region (4001) where the first single-layer graphene is transferred and the region (4002) where the second single-layer graphene is transferred show the same middle reflectance, and the region (4003) where the first single-layer graphene and the second single-layer graphene are layered shows the lowest reflectance. In addition, no fine foreign matter (4401) is recognized in the image.

Figure 45:
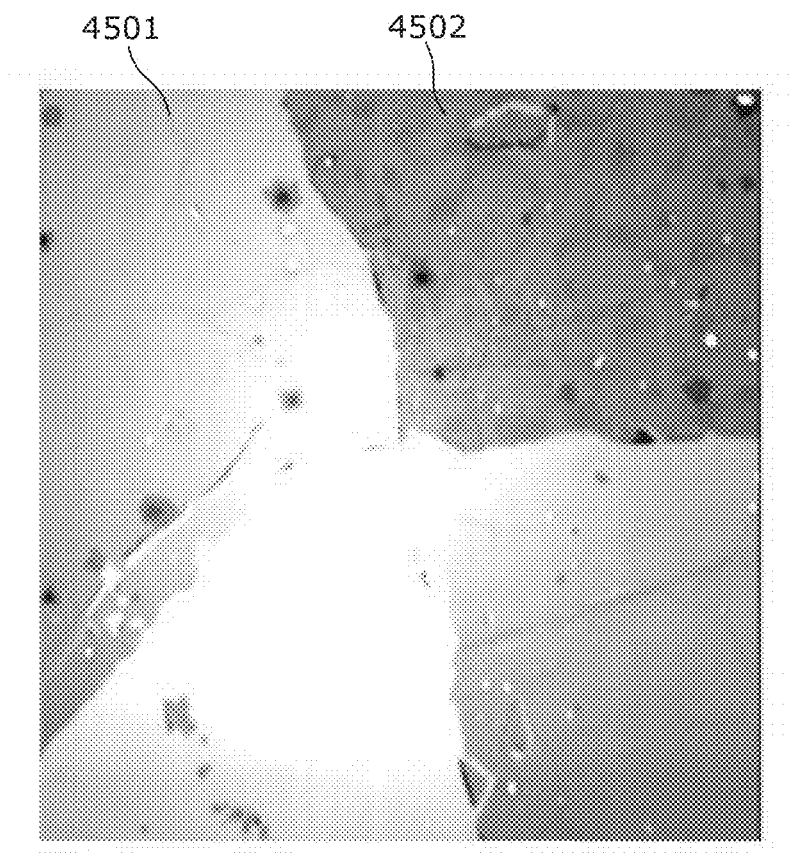
FIG. 45 illustrates an image obtained by adjusting contrast and brightness of an image captured using light having the third spectral characteristic.

In addition, FIG. 45 is an image captured with the third spectral characteristic, whose contrast and brightness have been adjusted. Wrinkling (4501) of graphene and a spotty pattern (4502) in the layered region considered to be caused by dirt are recognized which are not clear in the images captured in other spectral ranges. This spectral characteristic is predicted to be the most sensitive to the difference in the number of graphene layers, and thus it is considered that defects such as the wrinkling (4501) of graphene and the spotty pattern (4502) mentioned above have been visualized.

In this way, a filter group is disposed in an illumination optical system, the filter group including a third filter that transmits light having a wavelength at which a reflection spectrum different from that shown in an unwrinkled region of the graphene layer is shown in a wrinkled region of the graphene layer. This allows the wrinkling of the graphene layer to be visualized.

Figure 46:
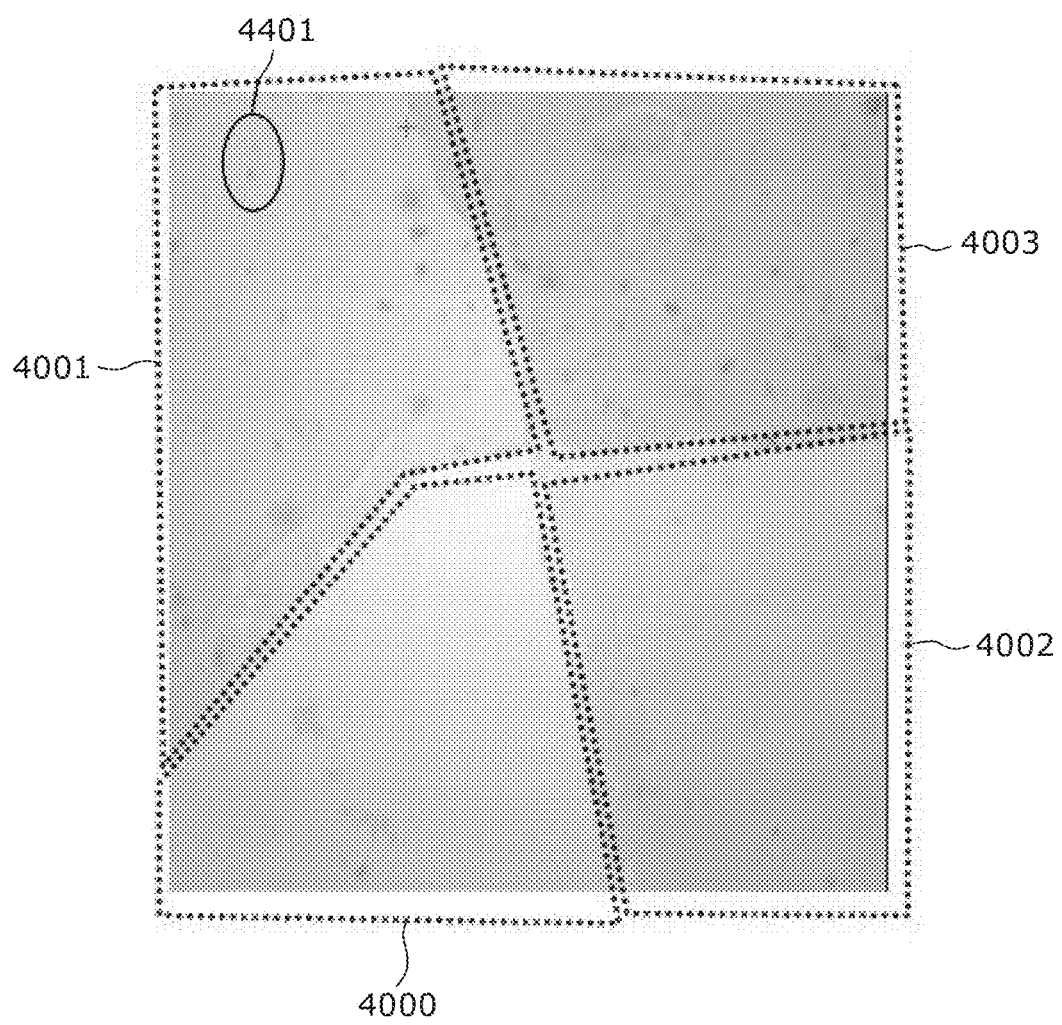
FIG. 46 shows an image captured using light having the fourth spectral characteristic.

As can be seen from FIGS. 41A and 41B, in the case of the fourth spectral characteristic (4304) that indicates a distribution of components in the wavelength range of 590 to 600 nm, reflectance depends on both the layer thickness of graphene and the thickness of the PMMA resin layer. Also, as can be seen from the drawings, the portion in which the PMMA resin layer is deposited has lower reflectance. FIG. 46 shows the result of actual imaging with this spectral characteristic.

In the imaging, the ground region (4000) shows the highest reflectance, the region (4001) where the first single-layer graphene is transferred and the region (4002) where the second single-layer graphene is transferred show the same middle reflectance, and the region (4003) where the first single-layer graphene and the second single-layer graphene are layered shows the lowest reflectance. In addition, the fine foreign matter (4401) is imaged as a black region having reflectance lower than the surrounding region in an image.

As described above, in the case where a substrate is a silicon substrate on which a silicon oxide film having a thickness of about 295 nm is formed and a thin film is graphene having a thickness of about 0 to 0.7 nm, the difference in the layer thickness of graphene can be visualized as a difference in contrast, by imaging using light having the second spectral characteristic (4302) that indicates a distribution of components in the wavelength range of 490 to 500 nm, the third spectral characteristic (4303) that indicates a distribution of components in the wavelength range of 540 to 550 nm, and the fourth spectral characteristic (4304) that indicates a distribution of components in the wavelength range of 590 to 600 nm.

Furthermore, it is possible to visualize the wrinkling (4501) of graphene and the spotty pattern (4502) by imaging using light having the third spectral characteristic (4303) sensitive in particular to the thickness of graphene.

Furthermore, it is possible to visualize the presence of the fine foreign matter (4401) as a difference in contrast, by imaging using light having the first spectral characteristic (4301) in a wavelength of 440 to 450 nm, light having the second spectral characteristic (4302) that indicates a distribution of components in the wavelength range of 490 to 500 nm, and light having the fourth spectral characteristic (4304) that indicates a distribution of components in the wavelength range of 590 to 600 nm. Furthermore, an image captured using light having the first spectral characteristic (4301) and the second spectral characteristic (4302), and an image captured using light having the fourth spectral characteristic (4304) show opposite contrast difference from the surrounding region due to the presence of the fine foreign matter (4401). Accordingly, it can be seen that the foreign matter is on a subject (1800), not the one in an imaging device.

Furthermore, a difference in the thickness of graphene can be distinguished while not influenced by the foreign matter (4401), by imaging using light having spectral characteristics according to which contrast occurs due to the thickness of graphene, but contrast does not occur due to the presence of the fine foreign matter (4401), as with the third spectral characteristic (4303).

In this manner, according to the present embodiment, an image in which the difference in the thickness of a thin film and foreign matter, for instance, can be distinguished can be captured.

It should be noted that if the type of substrate, the type and thickness of a thin film, and the type of foreign matter, for instance, are different, spectral characteristics suitable for detecting a difference in the thickness of a thin film and the presence of foreign matter change.

The following describes an example in the case of a different film thickness.

Figure 47:
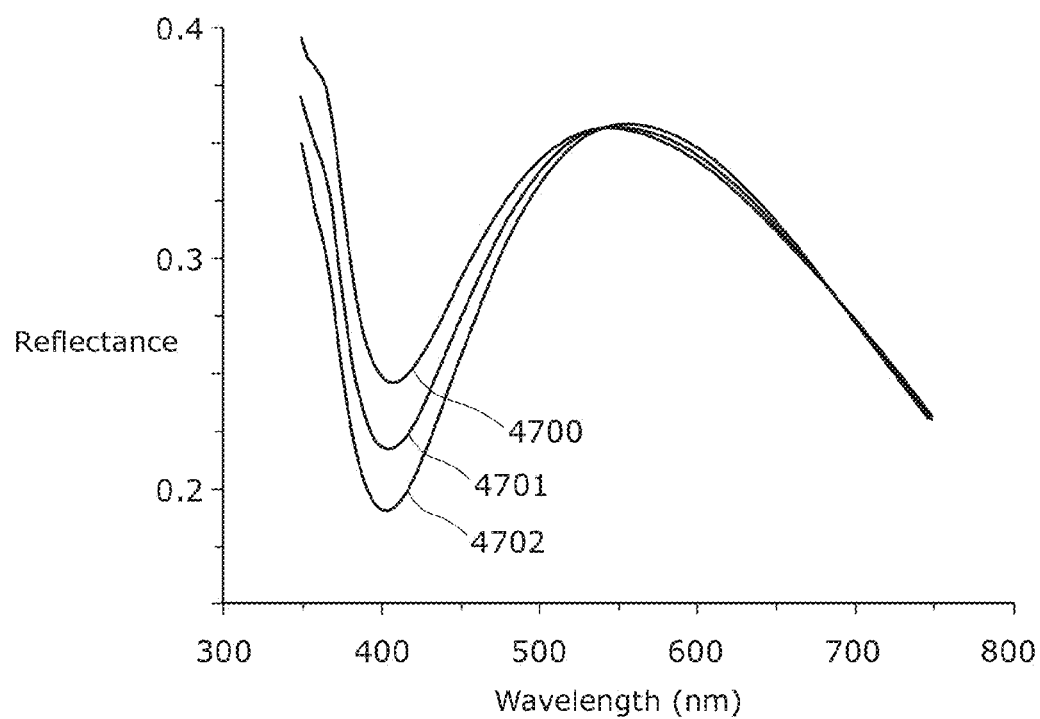
FIG. 47 is a graph showing reflectance obtained by optical simulations while changing the thickness of a graphene layer.
Figure 48:
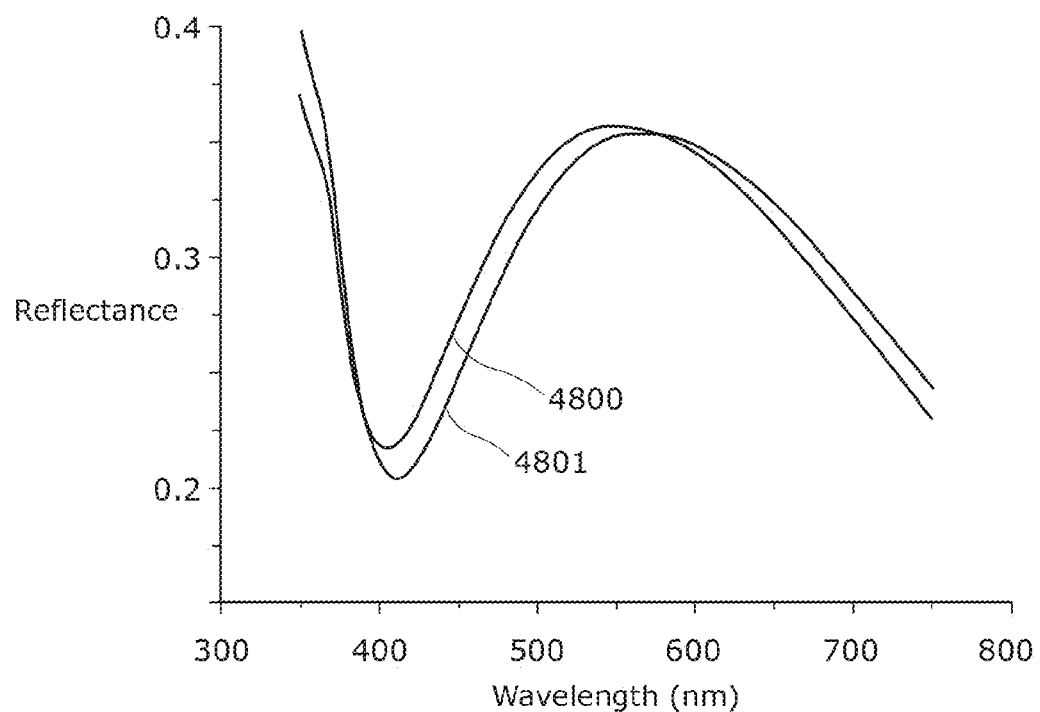
FIG. 48 is a graph showing reflectance obtained by optical simulations while changing the thickness of a PMMA resin layer.

FIGS. 47 and 48 show the results of optical simulations in the case where only the thickness of a silicon oxide film is changed to 210 nm while the material of a substrate and a thin film is the same as in FIG. 40.

FIG. 47 shows that reflectance of a sample which has a graphene layer on a silicon substrate with a silicon oxide film having a thickness of 210 nm is obtained by optical simulations. Simulations have been conducted where: a graphene layer is 0 nm (4700); a graphene layer is 0.35 nm (4701); and a graphene layer is 0.7 nm (4702). It should be noted that 0.35 nm is the layer thickness corresponding to single-layer graphene. In addition, the simulations have been conducted assuming that no foreign matter is present other than the substrate and graphene.

FIG. 48 shows results of optical simulations obtained where no PMMA layer is on graphene having a thickness of 0.35 nm provided on a silicon substrate with a silicon oxide film having a thickness of 210 nm (4800); and where a PMMA layer having a thickness of 5 nm is deposited on graphene having a thickness of 0.35 nm provided on a silicon substrate with a silicon oxide film having a thickness of 210 nm (4801).

In the wavelength range from 370 to 380 nm, reflectance of a silicon oxide film having the above thickness depends on the thickness of graphene, but does not depend on the presence of PMMA. This phenomenon is the same as that with the third spectral characteristic when the thickness of a silicon oxide film is 295 nm (4303). This phenomenon is effective in detecting a change in the number of layers of graphene, and graphene wrinkling, for instance. It should be noted that the wavelength range in which this phenomenon occurs changes from 370 to 380 nm due to a change in the thickness of an oxide film.

Thus, if an evaluation object is a sample which has a graphene layer on a silicon substrate with a silicon oxide film having a thickness of 210 nm, the filter 2509 having the wavelength range from 370 to 380 nm which is a transmission range is preferably included in the filter group 1884.

In the case of the multispectral imaging device according to the present embodiment, merely exchanging the filter group 1884 or the individual filters 2509 allow imaging using light having different wavelength ranges. Accordingly, the multispectral imaging device can capture an appropriate multispectral image by exchanging the filter group 1884 or the individual filters 2509 if a subject is changed. Specifically, even when a thin film sample is changed, the multispectral imaging device can capture an image with contrast or an image without contrast due to a difference in the thickness of a thin film, the presence of foreign matter, and a defect such as wrinkling, by exchanging the filter group 1884 or the individual filters 2509. Then, using a multispectral image captured in this way, a difference in the thickness of a thin film and a defect such as wrinkling can be detected, and foreign matter can be detected.

Although the above is a description of a multispectral device according to one or more aspects based on embodiments, the present invention is not limited to those embodiments. Various modifications to the embodiments that may be conceived by those skilled in the art and combinations of constituent elements in different embodiments may be included within the scope of one or more aspects of the present invention, as long as the modifications and combinations do not depart from the spirit of the present invention.

Figure 49:
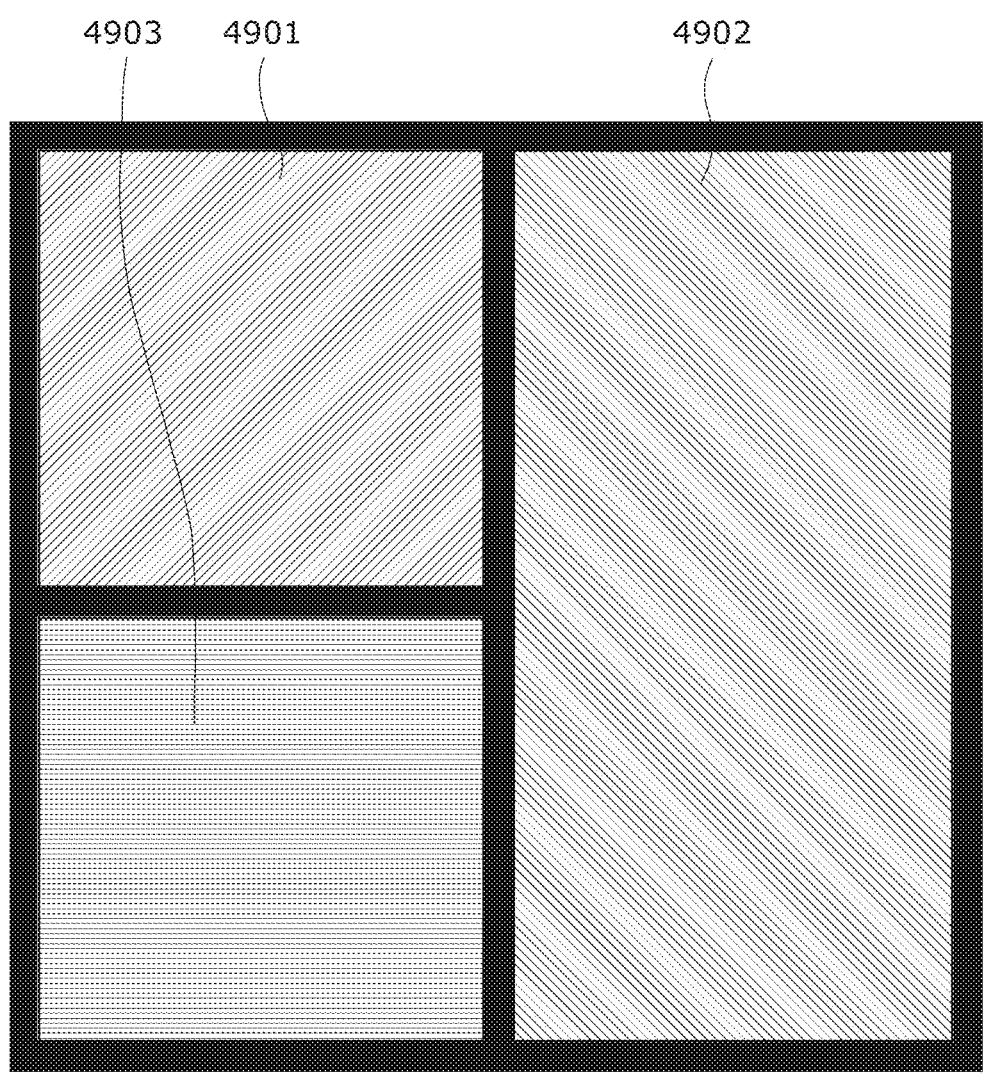
FIG. 49 illustrates a variation of a filter group.

It should be noted that the filter group is not limited to the filter group according to the above embodiments. For example, the areas of the plural filters included in the filter group may not be the same. As shown in FIG. 49, a first filter 4901 and a third filter 4903 may each have a different area from a second filter 4902.

Furthermore, the filters in the filter group may not be rectangular. For example, the filters in the filter group may be circular or polygonal other than rectangular. Furthermore, the filter group may include a restricting portion which restricts the movement thereof when attached to an illumination imaging system (for example, a protrusion, a recess, or the like).

Furthermore, the filters included in the filter group may not limit specific wavelength components. For example, at least one filter may be a polarizing element which changes a polarization direction. Furthermore, for example, at least one filter may be a neutral density (ND) filter. In addition, for example, one filter may transmit light as it is. In other words, the plural filters included in the filter group may have different transmission properties.

It should be noted that in each embodiment above, although the separation optical element is a set of plural microlenses, the separation optical element does not need to be limited to such an optical element. For example, the separation optical element may be a lenticular lens. In this case, two filters may be included in the filter group, and two light receiving elements may be included in each light receiving pixel. In this way, the separation optical element may be any optical element, as long as the separation optical element can guide light which has passed through different filters to different light receiving elements.

It should be noted that in the above embodiments, although the filter group is disposed in the vicinity of the aperture stop, the filter group does not necessarily need to be disposed in the vicinity of the aperture stop. For example, the filter group may be disposed on the subject side of the lens group. In other words, the filter group may be disposed at any position in the illumination optical system, as long as the position is in an overlap region of bundles of illumination rays which reach points in the imaging area of a subject.

INDUSTRIAL APPLICABILITY

The multispectral imaging device according to an aspect of the present invention is useful in a biological field, a medical field, and an industrial field. Furthermore, the multispectral imaging device can be applied to thin film measurement, foreign matter detection, and others.

REFERENCE SIGNS LIST

0100, 1800 Subject
0109, 1809 Overlap region of bundles of illumination rays
0180, 1880 Illumination optical system
0181, 1881 Light source
0182, 1882 Lens group
0183, 1883 Stop group
0184, 1884 Filter group
0190, 1890 Imaging optical system
0192, 1892 Lens group
0194, 1894 Separation optical element
0195, 1895 Two-dimensional light receiving element array (image sensor)
0201, 1901 Collector lens
0202 Field lens
0203 Condensing lens
0211, 1911 Field stop
0212, 1912 Aperture stop
0301, 0311, 0312, 0321, 0322, 0401, 0411, 0412, 0421, 0422, 0501, 0511, 0512, 0521, 0522, 2101, 2201, 2301, 2601, 2602, 2603, 2604, 2701, 2702, 2703, 2704, 2801, 2802, 2803, 2804, 2901, 2902, 2903, 2904, 3001, 3002, 3003, 3004, 3101, 3102, 3103, 3104 Bundle of rays
0310, 2110 First point
0410, 2210 Second point
0510, 2310 Third point
0700, 2500 Frame
0701, 2501, 4901 First filter
0702, 2502, 4902 Second filter
0703, 0704 Overlap of bundles of illumination rays
0709, 2509 Filter 1101 Objective lens
1102 Imaging lens
1201, 1202, 1301, 1302, 1401, 1402 Area
1209, 1309, 1409 Point
1591, 3291 Microlens
1601, 1602, 1609, 3301, 3302, 3303, 3304, 3309 Real image
1701, 3401 First light receiving element
1702, 3402 Second light receiving element
1709, 3409 Light receiving element
1711, 3411 Light receiving pixel
1771, 3901, 4301 First spectral characteristic
1772, 3902, 4302 Second spectral characteristic
1781 Cytoplasm
1782 Immunostained nucleus
1783 Nucleus not immunostained
1791 Absorption spectrum of cytoplasm
1792 Absorption spectrum of immunostained nucleus
1793 Absorption spectrum of nucleus not immunostained
1885 Half mirror
1902 First field lens
1903 Second field lens
2001 Objective lens
2002 Imaging lens
2503, 4903 Third filter
2504 Fourth filter
2905, 3005, 3105 Point
2991, 2992, 2993, 2994, 3091, 3092, 3093, 3094, 3191, 3192, 3193, 3194 Area
3403 Third light receiving element
3404 Fourth light receiving element
3903, 4303 Third spectral characteristic
3904, 4304 Fourth spectral characteristic
4000 Ground region
4001 Region where first single-layer graphene is transferred
4002 Region where second single-layer graphene is transferred
4003 Region where first single-layer graphene and second single-layer graphene are layered
4401 Fine foreign matter
4501 Wrinkling of graphene
4502 Spotty pattern

The invention claimed is:

1. A multispectral imaging device which captures a multispectral image of a subject, the multispectral imaging device comprising:
an illumination optical system which irradiates the subject with light; and
an imaging optical system which images the subject,
wherein the illumination optical system includes:
a lens which collects light from a light source; and
a filter group disposed in an overlap region of bundles of illumination rays which reach points in an imaging area of the subject, and including at least a first filter and a second filter having different transmission properties, the overlap region being a region through which the light collected by the lens passes,
light which has passed through the first filter and light which has passed through the second filter simultaneously illuminate the subject, and
the imaging optical system includes:
an image sensor which includes at least first light receiving elements and second light receiving elements; and
a separation optical lens element which simultaneously guides light which has passed through the first filter to the first light receiving elements, and light which has passed through the second filter to the second light receiving elements.

2. The multispectral imaging device according to claim 1, wherein the illumination optical system is a Koehler illumination system which includes a field stop and an aperture stop, and
the filter group is disposed in vicinity of the aperture stop.

3. The multispectral imaging device according to claim 1, wherein at least one of the first filter or the second filter is exchangeably attached to the illumination optical system.

4. The multispectral imaging device according to claim 1, wherein the imaging optical system further includes an objective lens, and
the filter group is disposed at a position where the light which has passed through the first filter enters the first light receiving elements, and the light which has passed through the second filter enters the second light receiving elements, irrespective of a change of a numerical aperture of the objective lens.

5. The multispectral imaging device according to claim 4, wherein the filter group is disposed at a position where a boundary between the first filter and the second filter intersects an optical axis of the illumination optical system.

6. A filter group for use in the multispectral imaging device according to claim 1.

7. A multispectral imaging method for capturing a multispectral image of a subject using a multispectral imaging device which includes: an illumination optical system which irradiates the subject with light; and an imaging optical system which images the subject, the multispectral imaging method comprising:
(a) utilizing a lens to collect light from a light source;
(b) disposing a filter group which includes at least a first filter and a second filter having different transmission properties, in an overlap region of bundles of illumination rays in the illumination optical system, the overlay region being a region through which the light collected by the lens passes, the bundles of illumination rays reaching points in an imaging area of the subject, and light which has passed through the first filter and light which has passed through the second filter simultaneously illuminate the subject; and
(c) capturing the multispectral image of the subject,
wherein the imaging optical system includes:
an image sensor which includes at least first light receiving elements and second light receiving elements; and
a separation optical lens element which simultaneously guides light which has passed through the first filter to the first light receiving elements, and light which has passed through the second filter to the second light receiving elements.

8. The multispectral imaging method according to claim 7,
wherein the subject is stained using stains having absorption spectra, and
the filter group is disposed in the illumination optical system in step (b), the filter group including the first filter which transmits light having a first wavelength at which a first stain included in the stains shows a unique absorption spectrum, and the second filter which transmits light having a second wavelength at which a second stain included in the stains shows a unique absorption spectrum.

9. The multispectral imaging method according to claim 7,
wherein the subject has, on a surface, an oxide film having a reflection spectrum which differs depending on a thickness of the oxide film, and the filter group is disposed in the illumination optical system in step (b), the filter group including the first filter which transmits light having a first wavelength at which the thickness and the reflection spectrum show first dependency, and the second filter which transmits light having a second wavelength at which the thickness and the reflection spectrum show second dependency.

10. The multispectral imaging method according to claim 7,
wherein the subject has a graphene layer on a surface, and the filter group is disposed in the illumination optical system in step (b), the filter group including the first filter which transmits light having a first wavelength at which a reflection spectrum different from a reflection spectrum shown in an unwrinkled region of the graphene layer is shown in a wrinkled region of the graphene layer.

* * * * *